US 12,555,436 B2

United States Patent
Anbazhagan et al.

(10) Patent No.: US 12,555,436 B2
(45) Date of Patent: Feb. 17, 2026

(54) SYSTEM AND METHOD FOR ENCOURAGING RESPONSIBLE GAMEPLAY AND PREVENTING DETRIMENTAL GAMING ACTIVITY

(71) Applicant: Entain Marketing (UK) Ltd., London (GB)

(72) Inventors: Anthil Anbazhagan, Telangana (IN); Swapneel Jagirdar, Telangana (IN); Sandeep Tiku, Karnataka (IN)

(73) Assignee: ENTAIN MARKETING (UK) LTD., London (GB)

( * ) Notice: Subject to any disclaimer, the term of this patent is extended or adjusted under 35 U.S.C. 154(b) by 371 days.

(21) Appl. No.: 17/894,733

(22) Filed: Aug. 24, 2022

(65) Prior Publication Data
US 2023/0137577 A1    May 4, 2023

Related U.S. Application Data

(60) Provisional application No. 63/276,294, filed on Nov. 5, 2021, provisional application No. 63/273,748, filed on Oct. 29, 2021.

(51) Int. Cl.
*G07F 17/32* (2006.01)
*G06N 20/00* (2019.01)

(52) U.S. Cl.
CPC ......... *G07F 17/3237* (2013.01); *G06N 20/00* (2019.01); *G07F 17/323* (2013.01)

(58) Field of Classification Search
CPC ............... G07F 17/3237; G07F 17/323; G07F 17/3241; G07F 17/3244; G06N 20/00
See application file for complete search history.

(56) References Cited

U.S. PATENT DOCUMENTS

| | | |
|---|---|---|
| 6,508,710 B1 | 1/2003 | Paravia et al. |
| 8,657,677 B2 | 2/2014 | Jahanshahi et al. |
| 9,640,028 B2 | 5/2017 | Ovalle |
| 9,659,460 B2 | 5/2017 | Ovalle |
| 9,734,659 B2 | 8/2017 | Ovalle |
| 10,475,290 B2 | 11/2019 | Ovalle |
| 11,030,860 B2 | 6/2021 | Ovalle |
| 2001/0031663 A1* | 10/2001 | Johnson ............. G06Q 50/34 463/29 |

(Continued)

FOREIGN PATENT DOCUMENTS

| | | |
|---|---|---|
| WO | 2019201405 A1 | 10/2019 |
| WO | 2024161172 | 8/2024 |

OTHER PUBLICATIONS

"International Search Report and Written Opinion for PCT/IB2023/050774, mailed on Aug. 8, 2024".

*Primary Examiner* — Kevin Y Kim
(74) *Attorney, Agent, or Firm* — Dorsey & Whitney LLP

(57) ABSTRACT

A system and method for detecting potentially detrimental gaming activity and initiating action to encourage responsible gameplay or to prevent further detrimental gaming activity. The system and method may provide education (via documents or other materials informing a player of potential risks and tools available to reduce such risks), intervention (prompting player interaction with the system, providing opportunities to implement optional tools to reduce risk), and prevention (automatically preventing a player from engaging in potentially detrimental activity).

20 Claims, 40 Drawing Sheets

(56) References Cited

U.S. PATENT DOCUMENTS

| | | |
|---|---|---|
| 2003/0087701 A1 | 5/2003 | Paravia et al. |
| 2006/0287068 A1* | 12/2006 | Walker .................... G07F 17/32 463/25 |
| 2011/0183732 A1* | 7/2011 | Block .................... G06Q 50/34 463/1 |
| 2014/0295956 A1 | 10/2014 | Katz et al. |
| 2015/0032527 A1 | 1/2015 | Hunt |
| 2015/0133223 A1 | 5/2015 | Carter |
| 2015/0141123 A1 | 5/2015 | Callaway |
| 2016/0321582 A1* | 11/2016 | Broudou ................ G06N 20/00 |
| 2017/0169656 A1* | 6/2017 | Froy, Jr. .................. G07F 9/009 |
| 2017/0250004 A1 | 8/2017 | Ovalle |
| 2020/0202330 A1 | 6/2020 | Novis |
| 2020/0353362 A1 | 11/2020 | Sachson et al. |
| 2021/0362060 A1 | 11/2021 | Sachson et al. |
| 2023/0137728 A1 | 5/2023 | Anbazhagan et al. |
| 2024/0038020 A1 | 2/2024 | Huke et al. |

\* cited by examiner

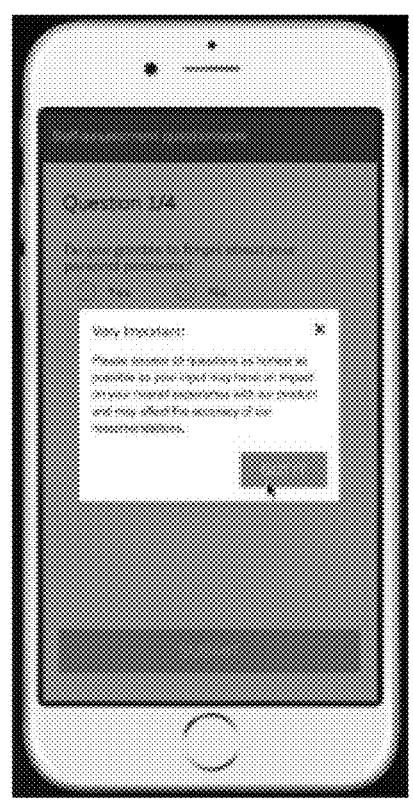
FIG. 23A  FIG. 23B

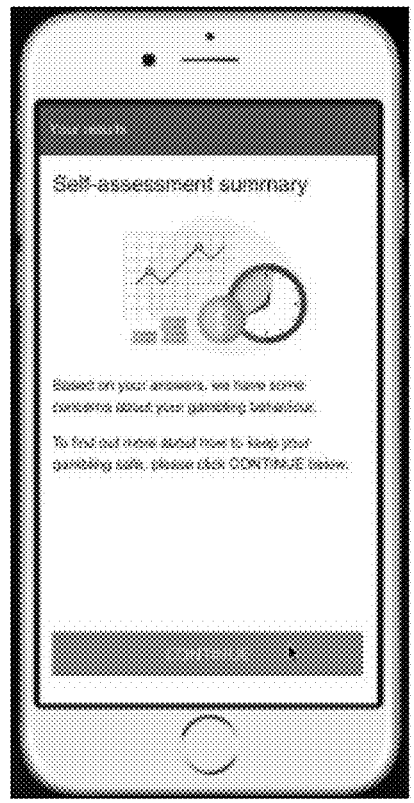
FIG. 27A  FIG. 27B

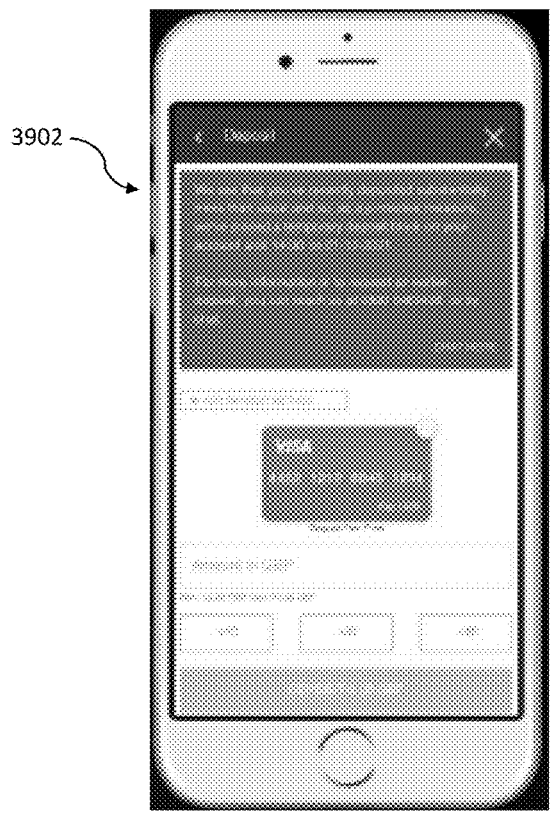
FIG. 38  FIG. 39

SYSTEM AND METHOD FOR ENCOURAGING RESPONSIBLE GAMEPLAY AND PREVENTING DETRIMENTAL GAMING ACTIVITY

PRIORITY

This application claims priority to U.S. Provisional Patent Application No. 63/273,748, filed on Oct. 29, 2021, and entitled, "System and Method for Implementing Single Account and Single Wallet for Distributed Gaming System Across Jurisdictions" and U.S. Provisional Patent Application No. 63/276,294, filed on Nov. 5, 2021, and entitled, "ARC: Advanced Responsibility and Care."

FIELD

The present patent document relates generally to distributed gaming systems and, more particularly, to a system and method for implementing a user experience in which a user maintains a single account and single wallet for distributed gaming systems, including gambling systems, across multiple jurisdictions. The present patent document further relates to a system and method for detecting potentially detrimental gaming activity and encouraging more responsible gameplay and/or preventing further detrimental gaming activity, if necessary.

BACKGROUND

Regulations of gaming and gambling vary across jurisdictions and can be complicated.

Online gaming and gambling have grown rapidly in recent years. Currently, millions of people around the world are able to join virtual gambling or other gaming online, such as betting on sporting events, playing card games (e.g., poker), accessing casino games (e.g., slots) using computers, laptops, phones, and tablets. The availability of these games and gambling opportunities may depend on the regulations of the particular jurisdiction where the user is located, which can present unique challenges.

Various gaming and gambling platforms have been developed previously. For example, U.S. Pat. No. 8,657,677 is directed to a "Client Account Managing Arrangement on an Online Gaming System." This application and related documents describe a client account managing arrangement on an online gaming system, where each client has a permanent account on an accounting system, and an asynchronous communication server system is connected to proxies for each client/game session combination and to the accounting system. The accounting system creates a temporary reservation account for each client/game session combination that is temporarily funded and updated during game sessions. When the client stops participating in the game session, the money is transferred from the temporary reservation account back to the client's permanent account and the temporary reservation account is closed.

U.S. Patent App. Pub. No. 2017/0250004 is directed to a "Single Platform System for Multiple Jurisdiction Lotteries." This application and related documents (e.g., U.S. Pat. Nos. 9,640,028; 9,659,460; 9,734,659; 10,475,290; and 11,030,860) describe a single platform system that can run in a plurality of different jurisdictions from at least one scalable platform. For example, the application and related publications describe a wireless communications system that includes a computer system running on at least one platform on which a plurality of different lottery games for different jurisdictions are supported and from which they are run. Portions of the application and related publications discuss a decentralized and distributed ledger used to record transactions for the lottery transactions. The application and related publications also describe a workflow for different types of lottery game packets from different jurisdictions. The platform described may route lottery transactions to a general account depending on location. The platform also may direct transactions to a state-specific lottery account. The platform also is described as using a "lottery wallet," which can be loaded with value and can be used to purchase scratchers or lottery tickets.

U.S. Patent App. Pub. No. 2003/0087701 is directed to a "Gaming System with Location Verification." This patent application and related publications (e.g., U.S. Pat. No. 6,508,710) describe a system and method for providing an automated gaming service to one or more players in a computer-based environment that allows automated computation of wagers, payouts, and other gaming parameters. This application and related publications describe that players can access the automated gaming system from remote locations, thereby establishing a virtual gaming environment. In the described system, player accounts can be established and players can be granted access to those accounts, which can be set up as debit-type a"ccounts. Players are able to fund and replenish their accounts in advance of wagering using various payment methods. The system also describes using a players location to evaluate and regulate access to players in authorized locations.

Various systems exist to encourage responsible gaming behavior. For example, U.S. Pat. No. 8,696,358 is directed to a "System and Method for Facilitating Responsible Behavior." Embodiments of that system facilitate responsible gambling by comparing the behavior of an entity (e.g., a gambler or gamer, or in other embodiments, a shopper, borrower, spender, or consumer) with a behavior model to determine a category of the behavior and determine appropriate actions. Actions are determined and initiated to help cause the entity to pursue a desired behavior. Such actions may include activities meant to influence behavior such as changing one or more operating parameters of a facility the entity is engaged with or activating limits, blocks or triggers related to the entity and its activity.

U.S. Patent App. Pub. No. 2019/0005844 is directed to a "System and Method for Identifying and Modifying Behavior." This application describes a system that receives information about a user's behavior, analyzes that behavior to identify associated risk indicators that indicate a statistically significant change in the user's behavior. When the behavioral risk indicators meet a predefined criteria of the system, it initiates actions to change the user's behavior. The system may also detect risk indicators associated with a second user by comparing the behavior of the first user with that of the second user.

U.S. Patent App. Pub. No. 2022/0028213A1 and its corresponding International Patent Publication No. WO2019/201405 are directed to "Detection of Possible Problem Gambling Behaviour." This application describes a system and method for identifying possible problematic behaviour in gambling, particularly gambling involving monetary transactions. According to one embodiment, a computer-implemented method detects possibly problematic gaming behavior of a subject engaged in up to five games involving monetary transactions. The method obtains information concerning a subject's transactions over time and analyzes the subject against a model employing artificial intelligence to predict or detect potentially problematic gambling behavior. The system may be trained based on the behavior of one or more other subjects/targets.

None of the prior systems, however, provide a user with a consistent experience and access to the user's account information and stored value across multiple jurisdictions while allowing the user to have a consistent experience across those jurisdictions. And none of the prior systems have the sophistication needed to subtly prod a user or target to change behaviors and to slowly escalate the system's response to the user or target, depending on preset thresholds and responsive actions.

SUMMARY

A system and method for implementing a user experience in which a user maintains a single account and single wallet for distributed gaming systems, including gambling systems, across multiple jurisdictions is provided. The system and method described herein is a distributed and secure system for replicating functionality across a number of geographically distinct data centers. The system and method therefore provide users with functionality specific to each user's location, and provide a user access to his or her account and wallet, including all financial, bonus, and promotional materials associated with that user seamlessly regardless of where the user is located at the time.

A system and method for detecting potentially detrimental gaming activity and initiating action to encourage responsible gameplay or to prevent further detrimental gaming activity. The system and method may provide education (via documents or other materials informing a player of potential risks and tools available to reduce such risks), intervention (prompting player interaction with the system, providing opportunities to implement optional tools to reduce risk), and prevention (automatically preventing a player from engaging in potentially detrimental activity).

Embodiments described herein include a distributed gaming system that has a plurality of databases, each of which is associated with one of a plurality of geographic locations, and each database being physically located in the geographic location with which it is associated. Account information associated with a user of the system is stored in each of the plurality of databases, and a geolocation service is configured to detect a geographic location of a user device associated with the user. Wallet information is also associated with the user and stored in a database, of the plurality of databases, that is physically located in the same geographic location in which the user device is located, and the wallet information includes a balance associated with the user. The distributed gaming system may include a universal database in communication with each database of the plurality of databases, and the account information associated with the user and the wallet information associated with the user is stored in the universal database. The system includes a geolocation service, which detects a geographic location of the user device, and the system is configured to place the user device into communication with a database located in the same geographic location in which the user device is located. The system may also be configured to detect movement of the user device from a first geographic location having physically located therein a first database, of the plurality of databases, to a second geographic location having physically located therein a second database, of the plurality of databases, and transferring a balance from wallet information associated with the user and stored in the first database to wallet information associated with the user and stored in the second database. The account information associated with the user may include information concerning bonuses, rewards, or promotions associated with the user. The account information associated with the user may also include information concerning gaming limits associated with the user.

According to embodiments, a method is provided that includes the steps of detecting the geographic location of a user device associated with a user, receiving activity information associated with the user from the user device, and updating a balance associated with the user based on the activity information, wherein the balance is stored in a first database that is physically located in a first geographic location in which the user device is located, and upon detecting movement of the user device from the first geographic location to a second geographic location, transferring the balance stored in the first database to a second database that is physically located in the second geographic location. The activity information can comprise information concerning the user's participation in a gaming activity or a deposit from an external bank account or a withdrawal to an external bank account.

According to embodiments, a method is provided that includes the steps of receiving registration information from a user; determining whether registration information has previously been received from the user; if registration information has not previously been received from the user, storing account information associated with the user in a universal database; synchronizing account information associated with the user and stored in the universal database with a plurality of local databases, each of which is associated with one of a plurality of geographic locations, and each of which is physically located in the geographic location with which it is associated; detecting a geographic location of a user device associated with the user; placing the user device into communication with a local database that is physically located in the same geographic location in which the user device is located; and serving content to the user device based on account information associated with the user and stored in the local database that is physically located in the same geographic location in which the user device is located. The method can also further comprise the step of detecting movement of the user device from a first geographic location having physically located therein a first local database to a second geographic location having physically located therein a second local database; and transferring a balance from wallet information associated with the user and stored in the first database to wallet information associated with the user and stored in the second database. According to embodiments, wallet information associated with the user is maintained in the databases, such as the first local database in the first geographic location and the second database in the second geographic location. According to alternative embodiments, wallet information associated with the user may be stored in the universal database. The account information associated with the user can include information concerning bonuses, rewards, or promotions associated with the user, and/or can include information concerning gaming limits associated with the user.

According to an embodiment a distributed gaming system configured to encourage responsible gameplay is provided that includes a database configured to store information about a user; a database configured to store information about responsible gaming risk and information about tools to reduce gaming risk; a machine learning component configured to detect risks associated with a user of the gaming system based on the stored information about responsible gaming and providing the use access to one or more tools to reduce gaming risk; and a server for providing the user access to the functionality of one or more tools to reduce gaming risk. According to embodiments, the machine learning component can be configured to determine a level of gaming risk associated with the user. This may be accomplished by determining that the user is one of: a low risk user, a medium risk user, a high risk user, and a particularly high risk user. According to an embodiment, the machine learning component may determine that a user is a low risk user and the server may be configured to notify a user of the availability of gambling tools and to provide the user options for accessing and controlling those gambling tools. According to another embodiment, the machine learning component may determine that a user is a medium risk user and the server may be configured to present the user with a questionnaire and to determine the level of concern associated with the user's responses to the questionnaire, and the system may take appropriate action based on that determination. According to an embodiment, the level of concern associated with the user's responses to the questionnaire may be one of: no concern, low concern, medium concern, and high concern. According to an embodiment, the machine learning component may determine that a user is a high risk user and the server may be configured to present the user with a gambling control tool. According to another embodiment, the machine learning component may determine that a user is a particularly high risk user and the server may be configured to place a restriction on the user's account. The distributed gaming system's server may be configured to provide the user with the ability to communicate with an agent via a communication channel. The machine learning component may be configured to determine certain warning signs, such that a user is depositing amounts that are greater than usual for the user, or that a is playing for a longer time than usual by a pre-determined amount.

According to an embodiment, a method for encouraging responsible gameplay in a distributed gaming system is provided, which includes comparing user activity with historical activity of the user and risk profiles for user activity; assessing a level of risk associated with the user's activity while using the system; and taking action in response to the level of risk associated with the user's activity while using the system, including providing the use access to a tool to reduce gaming risk. Based on the level of risk associated with the user's activity while using the system, the user is determined to be one of: a low risk user, a medium risk user, a high risk user, and a particularly high risk user. According to an embodiment, the user may be determined to be a low risk user and, the method further includes notifying a user of the availability of gambling tools and to provide the user options for accessing and controlling those gambling tools. According to another embodiment, the user may be determined to be a medium risk user and, the method further includes presenting the user with a questionnaire; and determining the level of concern associated with the user's responses to the questionnaire, and the system takes appropriate action based on that determination. The level of concern associated with the user's responses to the questionnaire are one of: no concern, low concern, medium concern, and high concern. According to another embodiment, the user may be determined to be a high risk user, and the further includes presenting the user with a gambling control tool. According to another embodiment, the user may be determined to be a particularly high risk user, and the method further includes placing a restriction on the user's account. The method may also provide the user with the ability to communicate with an agent via a communication channels. The method may also include detection of warning signs, such as determining that a user is depositing amounts that are greater than usual for the user or determining that a user is playing for a longer time than usual by a pre-determined amount.

BRIEF DESCRIPTION OF THE DRAWINGS

The accompanying drawings, which are included as part of the present specification, illustrate the presently preferred embodiments and, together with the general description given above and the detailed description given below, serve to explain and teach the principles of the systems and methods described herein.

FIGS. 23A and 23B show a diagram of exemplary interfaces including information and instructions for completing a questionnaire.

FIGS. 27A and 27B show diagrams of exemplary interfaces via which a user is informed that the user's questionnaire responses raise concerns and providing access to gambling control tools, such as by setting a temporary deposit limit and providing a user options for communicating with an agent.

FIG. 38 shows a diagram of an exemplary interface in which the user is informed of unusual deposit activity and provided with the option to cancel or continue with a current attempted deposit.

FIG. 39 shows a diagram of an exemplary interface in which the user is informed that deposits will not be allowed for a predetermined time period due to unusual deposit activity, and is provided with options for communicating with an agent.

The figures are only intended to facilitate the description of the various embodiments described herein. The figures do not describe every aspect of the teachings disclosed herein and do not limit the scope of the claims.

DETAILED DESCRIPTION

The following description is presented to enable any person skilled in the art to create and use systems and methods for implementing a user experience in which a user maintains a single account and single wallet for distributed gaming, including gambling, across multiple jurisdictions.

Figure 1:
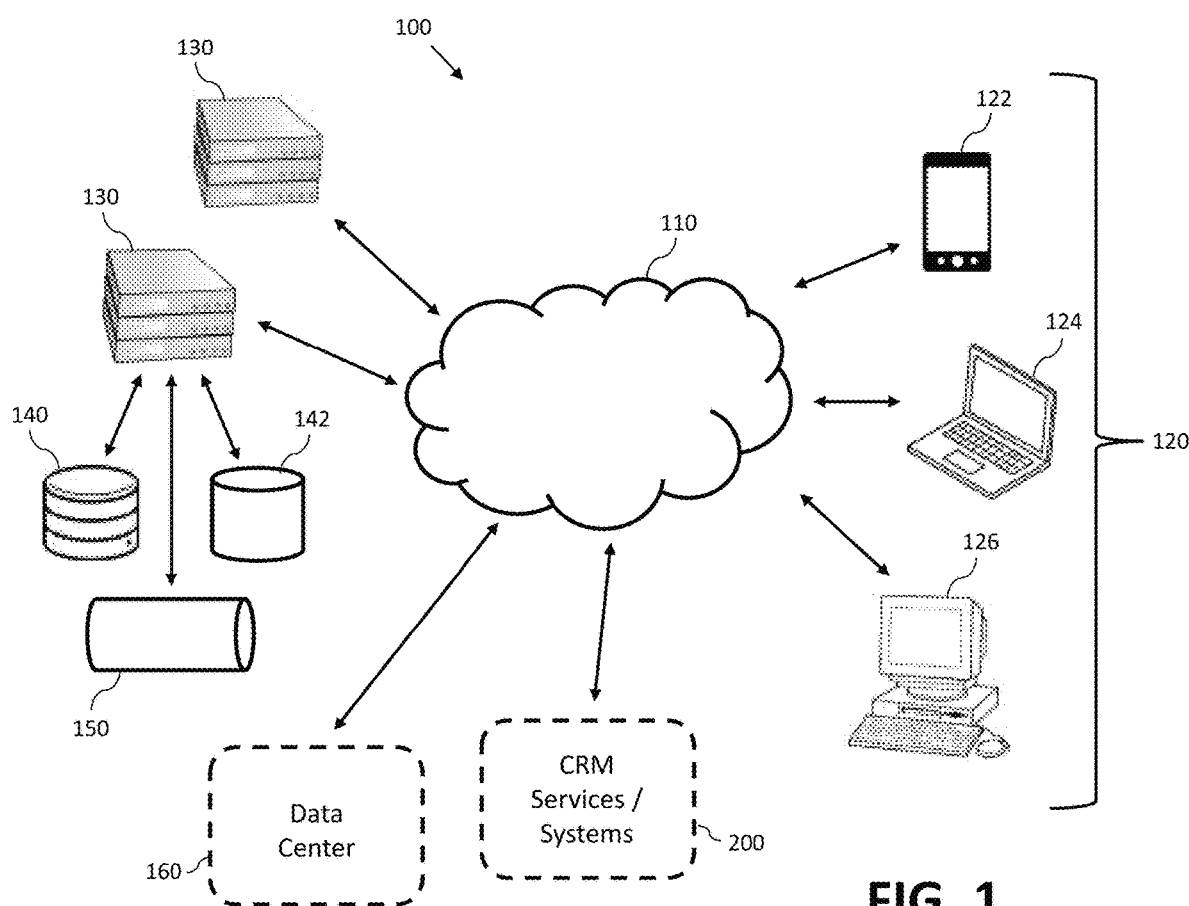
FIG. 1 shows an overview of a system and various components thereof in accordance with embodiments of the invention.

FIG. 1 shows an overview of a system 100 that allows users to participate in distributed gaming and gambling while remotely accessing user accounts and/or wallets for use in that system in accordance with embodiments of the invention. Because the system 100 shown in FIG. 1 allows users of the system (e.g., players, gamers, etc.) to participate in distributed gaming and gambling, according to embodiments, it will be referred to at times as a gaming system 100 or a gambling system 100. But regardless of how the system 100 is referred to herein, it should be understood that the principles described herein, and the functionality provided by the system 100 can be applied in a number of different contexts. For example, the system 100 may provide gambling, gaming that is similar to gambling and games of chance, or other types of gaming such as esports or other video games.

The users access services provided by way of the system 100 via the Internet or other network 110 using a variety of user devices 120. For example, users may use a variety of user devices 120, including mobile devices 122 such as cellular phones, tablets, personal data assistants, a laptop 124, a desktop computer 126, or other user device 120 suitable for accessing the network 110 and using the services provided by the system 100. The mobile devices 122 may include operating system software such as iOS, Android, or other mobile operating system software capable of accessing the network 110 and using the services provided by the system 100. Laptop computers 124, and desktop computers 126 may include operating system software such as Windows, Linux, Mac OS, or other suitable operating system software capable of accessing the network 110 and using the services provided by the system 100. A user of the system may access information by way of software running on a user device 120. Such software may be an application, such as a mobile app, a desktop computer application, or other software application suitable to access the services and applications described herein, which may be on the user device 120. Alternatively, a user may access information via the network 110 by way of a web page displayed by a web browser application via the user device 120. As discussed below, each player using the system 100 may have an account that is accessible by the application or web browser used to access functionality provided by the system. This may include profile information about the user, financial and other information associated with the user, and a means for contacting and communicating with the user (e.g., a message center or inbox, etc.).

The system 100 may use one or more servers 130 to provide access to games, gambling applications, wagering capabilities and related services and applications provided by the system 100 over the network 110. The servers 130 may be connected to each other and one or more database devices or data stores 140, 142 either directly or via the network 110, which may represent the Internet and/or other networks (e.g., LAN, WAN, VPN, etc.). Examples of databases that can be used with the system 100 shown in FIG. 1 include any standard databases capable of storing and providing access to the relevant data, information, and services, including, for example, databases provided by companies such as Oracle and Mongo, or other data storage devices such as distributed data storage like Terracotta databases, RAID arrays, and the like. The servers 130 are able to access and provide data, information, application capabilities, or other services provided by the system 100 from the databases 140, 142 and provide relevant information or services to the users via the network 110. The Additionally, the databases and data stores 140, 142 can be used for traditional functions such as disaster recovery, financial leger and account servicing, and the like. Some examples of the type of information that can be stored by the databases and data stores 140, 142 may include, for example, user information (e.g., user profiles), application information, user account and financial information, wallet and/or ledger information associated with a user, user habit information, information about restrictions, bonuses, promotions, rewards, loyalty, system integration, and events tracked by the system 100.

The servers 130 of the system 100 of FIG. 1 also may access various "data flows," "data streams," or "data pipelines" 150 to execute and facilitate real-time events and computations associated with the system 100 and the services and applications provided thereby. For example, data pipelines used in connection with the system 100 of FIG. 1 may include Apache ActiveMQ streams, Apache Kafka streams, TIBCO streams, or other similar pipelines. In addition, one or more data centers 160 may be connected to the network 110, and by way of the network 110 to the various devices connected thereto. Each data center 160 may include a number of servers 130, databases or data stores 140, 142, and data pipelines 150, such as those shown in FIG. 1, and various combinations thereof. Data centers 160 may be used to provide the services, application access, information, and data provided by the system 100 of FIG. 1 via the network 110. Additionally, the system may include one or more customer relationship management (CRM) services or systems 200 connected to the network to help facilitate providing the services, application access, information, and data provided by the system 100 of FIG. 1 via the network 110. The operations and services provided by the various devices and components of the system 100 of FIG. 1 will be described in further detail below.

According to embodiments described herein, the system 100 of FIG. 1 is used in connection with a distributed gaming or gambling system. The system is distributed as its servers and system information and components may be located in one or multiple locations that are together or geographically separated from each other. Additionally, the servers and system information and components may be located in one or multiple locations that are geographically separated from the user devices 120. According to embodiments, the users may be offered different gaming and/or gambling applications or services, such as CRM services, based on the user's geographic location via one or more user devices 120. The location of the user may be determined by any number of location techniques, including global positioning system (GPS) application or other geolocation applications, or other location-determining or location-tracking techniques (e.g., WiFi positioning system (WPS), RFID devices, Bluetooth beacons), or other location-based services.

Figure 2:
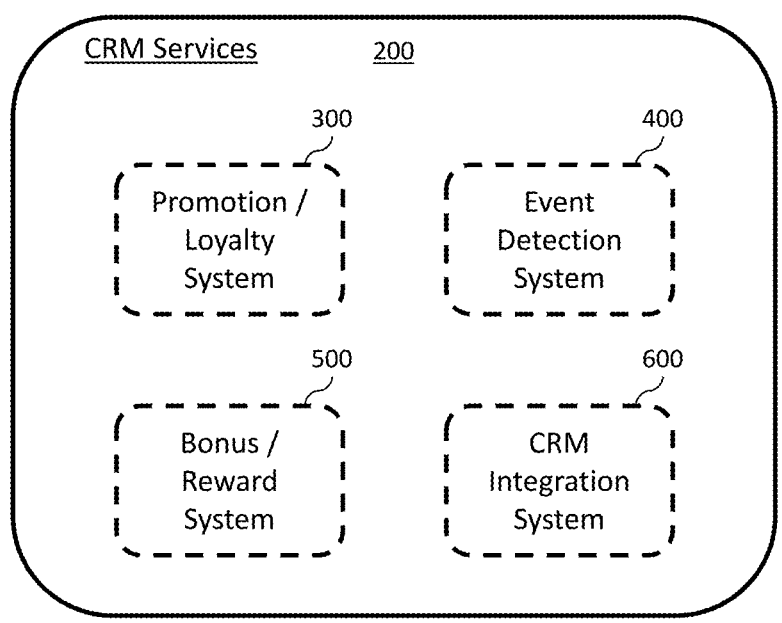
FIG. 2 shows an example of CRM services according to embodiments.

FIG. 2 shows various CRM services 200 used according to embodiments. As discussed above, the CRM services 200 may be used in the system 100 shown in FIG. 1. For example, the CRM services 200 such as a promotion/loyalty system 300 (see, e.g., FIG. 3), an event detection system (EDS) 400 (see, e.g., FIG. 4), a bonus/reward system 500 (see, e.g., FIG. 5), and a CRM integration system 600 (see, e.g., FIG. 6) can be used in the system 100 shown in FIG. 1. According to embodiments, each system shown in FIG. 2 is capable of communicating with and working in coordination with the other systems shown in FIG. 2. According to embodiments, the CRM services 200 may be provided and/or facilitated by one or more server devices.

Figure 3:
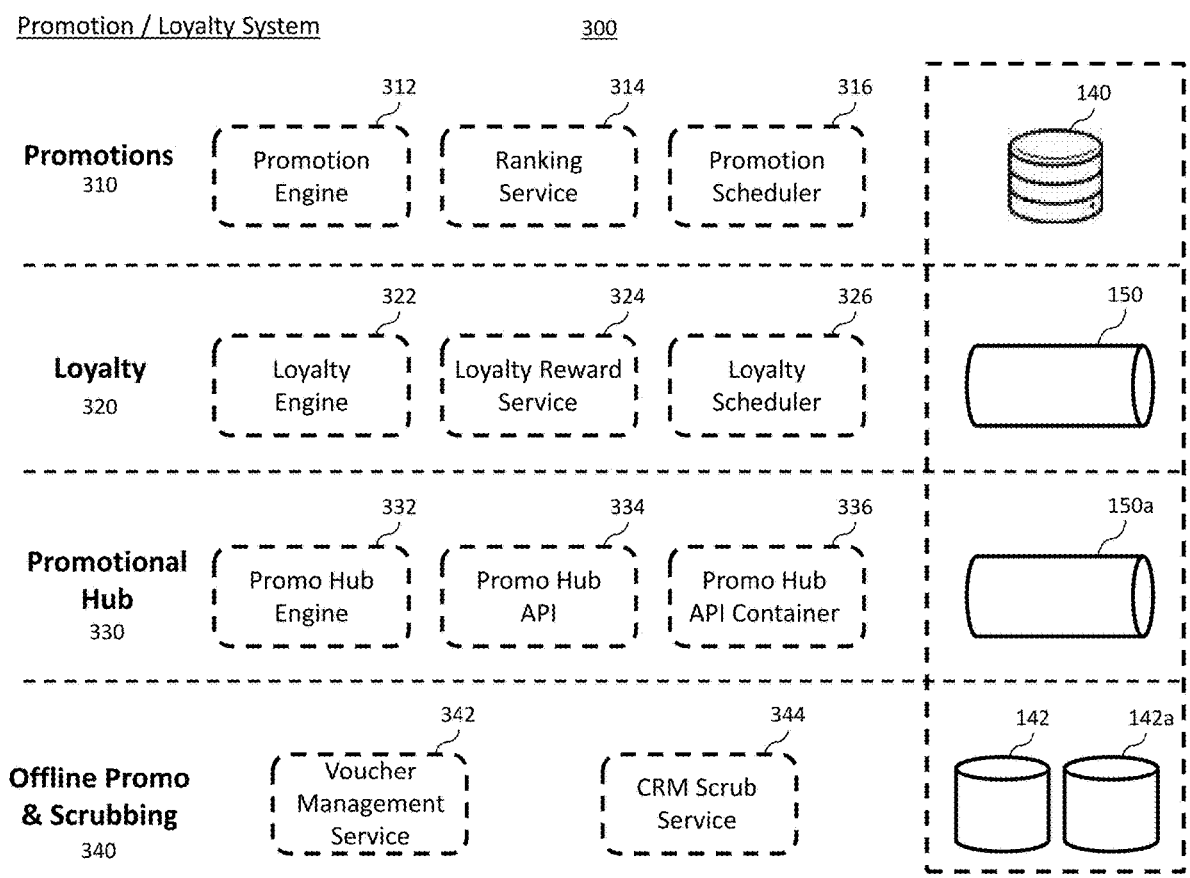
FIG. 3 shows an example of a promotion/loyalty system according to embodiments.

FIG. 3 shows an example of a promotion/loyalty system 300 according to embodiments. According to embodiments, the promotion/loyalty system 300 can be used to manage in-house promotional campaigns offered via the gaming system 100 described in connection with FIG. 1. The promotion/loyalty system 300 may provide offers to users of the gaming system 100 based on a number of different criteria, including play style, play frequency, geographic location, location within a certain facility, amounts spent, amounts won, or other criteria tracked by the system 100 that a company or entity operating the system wishes to reward.

The promotion/loyalty system 300 may include a subsystem for offering promotions by way of a promotions subsystem 310. For example, the promotion/loyalty system 300 may manage in-house promotional campaigns based on parameters provided to the system by users, owners, or others. According to embodiments, this promotions subsystem 310 can include a promotion engine 312, a ranking service 314, and promotion scheduler 316, all of which may be in communication with and may be supported by a system database 140. The promotion subsystem may be responsible for customer acquisition or engagement, by making various offers and promotions to users of the gaming system 100. For example, the promotion subsystem 310 may offer an opportunity for a user to perform some gaming action, and may offer that action at a discount. Examples of the types of offers that may be made to users for the purposes of acquisition or engagement include offers for the customer to perform gaming actions such as spinning a wheel, picking a box, flipping a coin, or clicking on a card to choose a card. These, or other acquisition or engagement activities may be presented to a user of the gaming system 100 by the promotion/loyalty system 300 and may be provided by the promotions subsystem 310. For example, according to embodiments, the promotions engine 312 may determine which activities to offer to users and may schedule those offers to users of the gaming system 100 using the promotion scheduler 316. According to embodiments the ranking service 314 may be used to track and rank users on a leaderboard in tournament settings or other similar competitions. According to alternative embodiments, the ranking service 314 may be used to rank the various offers to users and to determine how and when to make those offers. For example, offers can be made in-game or by other communication method (e.g., SMS, email, etc.). The offers can include any offers the operator of the gaming system is willing to provide as a promotion. The promotions subsystem 310 may, therefore, determine and guide the acquisition and engagement journey of players using the gaming system 100.

The promotion/loyalty system 300 may also include a loyalty subsystem 320 for managing loyalty of players that are users of the gaming system 100. This loyalty subsystem 320 may include a loyalty engine 322, a loyalty reward service 324, and a loyalty scheduler 326, which may provide and receive data via a data flow 150 to facilitate real-time actions by the gaming system 100. According to embodiments, the promotion/loyalty system 300 may be used to award, track, and manage loyalty points to users using the loyalty subsystem 320. According to embodiments, loyalty points may be awarded to players (e.g., users of the system 100 shown in FIG. 1) based on user activities, user activity level, or other user metrics that the operators of the gaming system 100 wish to track and reward. These loyalty points could include any type of loyalty points the operators of the gaming system 100 wish to offer. For example, according to embodiments, the gaming system 100 may offer loyalty points for a casino associated with the gaming or gambling offered by way of the gaming system 100. But the loyalty points provided by the promotion/loyalty system 300 may also include other types of loyalty points or rewards, such as hotel loyalty program points, airline loyalty program points, or points from other loyalty programs. According to embodiments, these loyalty offers may be determined by the loyalty engine 322 and scheduled by the loyalty scheduler 326. The loyalty reward service 324 may be used to help the loyalty engine 322. For example, the loyalty engine 322 may determine which loyalty offers and possibly which loyalty points system to use for a give player using the gaming system 100, and may be assisted by the loyalty reward service 324, which may fulfill the rewards determined. Loyalty rewards could be made via in-game communications or other communications (e.g., SMS, email, etc.), such as by providing a user a link to claim the reward. Alternatively, the reward could automatically be added to a player's loyalty account (e.g., by adding points directly to a loyalty-based points system).

The promotion/loyalty system 300 may also include a promotional hub subsystem 330, which may be used to cause the promotion/loyalty system 300 to manage other parts of the experience of a user of the gaming system 100. The promotional hub subsystem 330 may include a promotional hub engine 322, a promotional hub API 324, and a promotional hub API container, which are in communication with a data flow 150*a*. (In this figure and others described in this application, multiple illustrated instances of a data flow or data pipeline in the same figure or across multiple figures, may represent the same or distinct data flows or pipelines, even if the same numbering is used for multiple elements. The same is true for other elements and components shown in the figures.) The data flow 150*a* can offer the ability to perform real-time operations on the data or real-time queries and lookups using the data provided to it. For example, data from one or more sources can be considered together for real-time queries or analysis by the data flow 150*a*. By way of its application programming interface, the promotional hub subsystem 330 facilitates communications and operations between the promotion/loyalty system 300 and other applications, including applications that may be on the same server 130, or may be on a different device connected by way of the network 110. The promotional hub subsystem 330 may be used, for example, in connection with retention campaigns, such as cashback capabilities, loyalty stores, or rewards for length of play or other engagement, particularly when the API capabilities of the promotional hub subsystem 330 are needed to access other applications for the purpose of those retention programs. Alternatively, retention programs provided by the promotion/loyalty system 300 (like other programs provided by the promotion/loyalty system 300) that are run in-house and do not require connections to other applications via the APIs of the promotional hub subsystem 330 can be provided by way of the promotions subsystem 310 or the loyalty subsystem 320.

According to embodiments providing competitive gaming scenarios to users by way of the gaming system 100, the promotion/loyalty system 300 may be used to track and report the relative performance of the users who access the gaming system 100. This may be accomplished using one or more subsystems of the promotion/loyalty system 300. As another example, the promotion/loyalty system 300 may be used to provide a leaderboard that is visible to all or a subset of the users of the gaming system 100. The leaderboard can be adapted, for example, to rank and display users or subsets of users based on pre-determined criteria, such as users who are currently connected to the system 100, users who are currently playing one or more games on the system 100, users in a certain geographic area or jurisdiction, or users defined by some other pre-determined parameter (e.g., number of wins, velocity of wins, money spent, money won, length of time logged on, time spent playing a certain game, number of different games played during login session, or some other performance criteria). For example, a leaderboard may be provided for one or more games provided by way of the gaming system 100, such as sports betting, poker, bingo, casino slot races, or other games. The promotion/loyalty system 300 can facilitate competition among a series of sequential games, such as casino slot races. The leaderboard provided by the promotion/loyalty system 300 can also be adapted to list leaders over different time periods, according to embodiments (e.g., daily, weekly, or monthly leaderboards, etc.).

The promotion/loyalty system 300 may also provide various tools via an offline promotion and scrubbing subsystem 340 for administering the bonuses, loyalty points, rewards, and other incentives offered by the offline promotion/loyalty system 300 to players using the gaming system 100. According to embodiments, the offline promotion and scrubbing system 340 may include a voucher management service 342 and a CRM scrub service 344 for offering various functionality. The voucher management service 342 may provide the capability of providing players using the gaming system 100 with instant rewards based on special unique or ad hoc situations. This voucher management service 342 also may provide the capability to add or remove rewards from players using the gaming system 100 in bulk based on various groupings of players. For example, players may be grouped with similar players based on one or more parameters relating to a number of different factors, including geography, demographics, play style, play frequency, winnings, losses, interactions with other reward systems, etc. The voucher management service 342 allows the offline promotion and scrubbing subsystem 340 to provide system administrators or owners flexibility to reward and incentivize players using the gaming system as needed.

According to embodiments, the CRM scrub service 344 provides the ability to analyze player patterns and to monitor for fraudulent or other undesirable activities. This monitoring may be based on pre-determined rules, parameters, or other inputs provided to the CRM scrub service 344. According to embodiments, the inputs provided to the CRM scrub service 344 may be dynamically determined, such as by an adaptive learning system, artificial intelligence, machine learning, or other techniques (e.g., evolutionary algorithms, etc.). Players determined to be problematic or to have play or use patterns that are troublesome (e.g., patterns demonstrating the likelihood of fraud or actual fraudulent activity) can have their access limited via the CRM scrub service 344. For example, the CRM scrub service 344 may maintain a blacklist for players whose access to the gaming system 100 or all or some of its functions is to be cutoff or otherwise limited. In another example, the CRM scrub service 344 determines whether a player has opted out of receiving certain communications from the system, and can prevent the system from sending such communications to a player that has opted out. The promotion/loyalty system 300 generally, and the offline promotion and scrubbing subsystem 340 specifically, may be supported by one or more database devices or data stores 140, 142, 142*a*. (In this figure and others described in this application, multiple illustrated instances of database devices or data stores in the same figure or across multiple figures, may represent the same or distinct database devices or data stores, even if the same numbering is used for multiple elements.)

Figure 4:
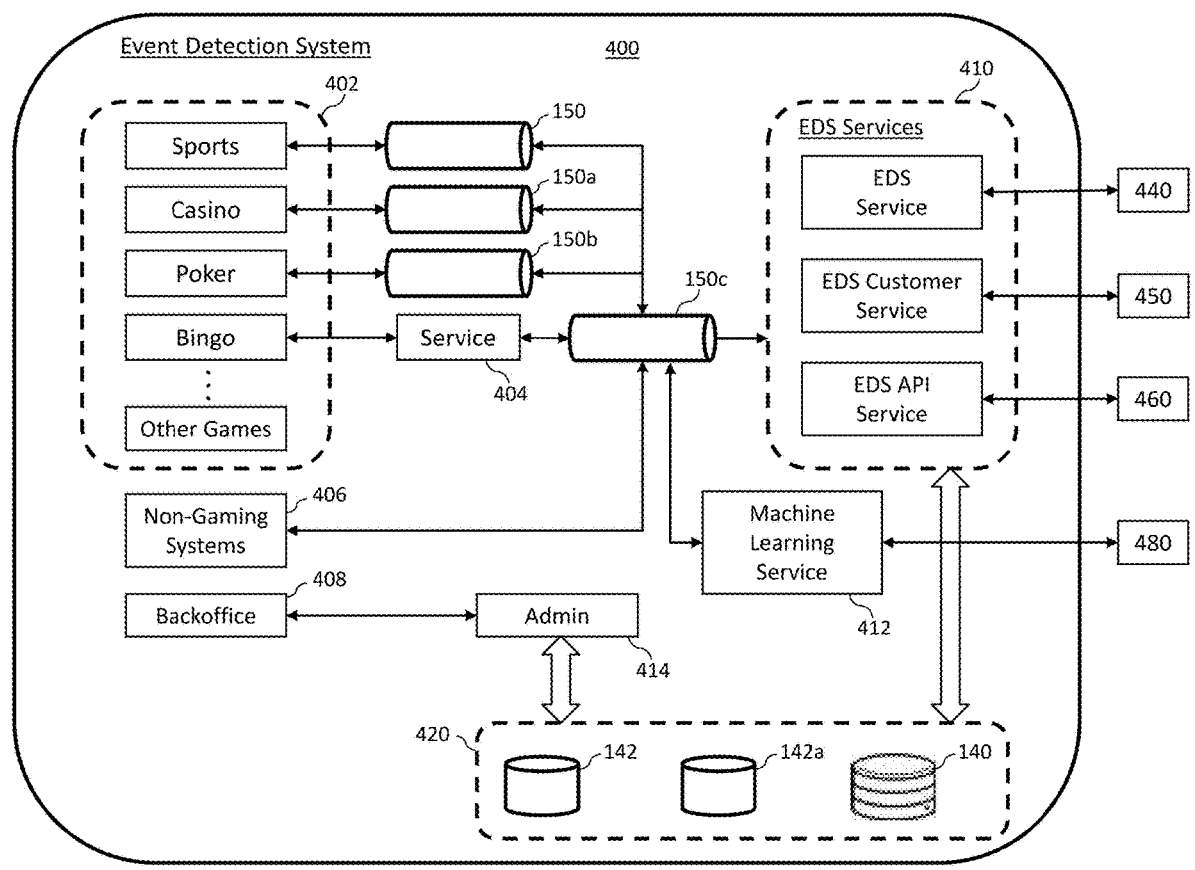
FIG. 4 shows an example of an event detection system according to embodiments.

FIG. 4 shows an example of an event detection system (EDS) 400 according to embodiments. The event detection system 400 is used to provide dynamic customer relationship management or CRM for the players using the gaming system 100. The EDS 400 is able to configure rules that are evaluated and can be applied in real time in the gaming system 100. The EDS 400 also is capable of targeting rewards at an event or player level. The EDS also tracks the activity of players using the gaming system 100 and is able to signpost critical events related to a particular user. Additionally, the EDS 400 is capable of executing complex reward models for the benefit of players using the gaming system 100.

The EDS 400 is configured to detect events associated with a number of different games or other applications 402 provided by way of the gaming system 100. For example, the EDS 400 may detect events associated with sports betting, casino games (e.g., casino slot races), poker, bingo, or other games offered for players using the gaming system 100. The EDS 400 may detect events associated with the various games 402 dynamically in real time using various data streams 150 or, alternatively, by using various services 404, such as the service 404 used for bingo in the EDS 400 shown in FIG. 4. According to embodiments, services 404 and one or more data streams 150, 150*a*, 150*b*, 150*c* can be used in connection with any of the games 402 monitored by the EDS 400. These services may provide various functionality and rules associated with the event detection for each of the games 402 monitored by the EDS 400. For example, the service 404 may act as a behavior intervention service and provide rules for monitoring one or more of the games 402 provided by the gaming system 100 and monitored by the EDS 400. The service 404, may act as a translation service, ensuring that data output by various games 402 is compatible with the various data streams 150.

The EDS 400 may also interface with other non-gaming system 406 and various back-office systems 408. This may include detecting events associated with those non-gaming systems 406 or the back-office systems 408. The EDS 400 may also monitor and detect events associated with the non-gaming systems 406 using various data streams, which may, for example, provide real-time or dynamic monitoring capabilities. Each of these systems and games monitored by the EDS 400 can be monitored by one or more EDS services 410. For example, the EDS 400 may include an EDS service, and EDS Customer Service and an EDS API service, according to embodiments. According to embodiments the EDS services 410 may be provided in the form of an EDS cluster. The EDS services may be connected to the data streams 150 to facilitate the dynamic, real-time event detection associated with the various games 402 monitored by the EDS 400. Additionally, the data streams 150 may provide a real-time connection to a machine learning service 412 for the EDS 400. The machine learning service 412 may provide real-time rule analysis and application for the various games 402 monitored by the EDS 400. The machine learning service 412 may detect unusual and/or potentially detrimental player activity. For example, according to embodiments, the machine learning service 412 may detect unusual player activity in the form of the churn rate for one or more players. According to alternative embodiments, upon detecting unusual and/or potential detrimental player activity, the machine learning service 412 may initiate activity to curb those activities. For example, according to embodiments, the machine learning service 412 may in certain circumstances cause the system to initiate action to encourage the player to engage in more responsible gameplay, or prevent the player from engaging in further potentially detrimental activity.

The back-office service 408 of the EDS 400 may be connected to an EDS administrative service 414 that provides various services for the back-office use of the EDS 400. The administrative service 414 and the EDS services 410 may be connected to a datacenter 420 that includes a number of database devices or data stores 140, 142. As shown in FIG. 1, the datacenter 420 and/or its database devices and data stores 140, 142, 142*a* are connected to the network 110 of the gaming system 100. The devices of the datacenter 420 provide the rules, parameters, and data needed by the back office service 408, the administrative service 414, and the EDS services 410 to perform the required event detection services of the EDS 400. According to embodiments, the datacenter 420 shown in FIG. 4 may be the same as or different from the datacenter 160 shown in FIG. 1.

According to embodiments, the EDS services 410 provide various functionality 440, 450, 460 for the gaming system 100. For example, the EDS service can provide event detection service for general campaigns 440 via the gaming system 100. This may include EDS for campaigns across all games or a subset of games offered across the gaming system 100 or campaigns offered to all players or a subset of players (e.g., chosen using some predetermined parameter) using the gaming system 100. The EDS customer service can provide EDS for targeted campaigns 450 that are focused on specific campaigns offered via the gaming system 100. The EDS customer service may include customer data platform software that is custom or provided by a third-party (e.g., Optimove, Bloomreach, Salesforce, or other appropriate software supplier) and capable of providing EDS for targeted campaigns according to embodiments. The EDS API service can provide an interface for front-end services and opt-in features 460. The EDS API service can connect with other software applications to provide these services and features.

The machine learning service 412 also may provide functionality 480 for the gaming system 100. For example, according to embodiments, the machine learning service may monitor the data streams and may track and calculate various player metrics, such as calculating player churn 480. In calculating player metrics, such as player churn, the machine learning service 412 may also make use of real-time or dynamic data from the data streams 150, 150a, 150b, 150c, which in turn receive data from the games or other applications 402 and the other non-gaming systems 406 of the EDS 400. In this way, the machine learning service 412 may dynamically adjust player metrics used by the EDS 400. For example, the machine learning service 412 may be used to detect and understand a player's various interests and patterns in a gaming system (e.g., such as what types of games a user likes to play, how long a user plays certain games, etc.). In response to determinations made by the machine learning service 412, the EDS 400 may react to the player patterns in a particular way based on the player's activity. For example, the EDS may provide information, promotions, or bonuses based on the player's activity (e.g., providing bonuses for games that player uses the most, encouraging break time, diverting a player to activities appropriate for the player based on the player's history, activity, buying power, etc.).

Figure 5:
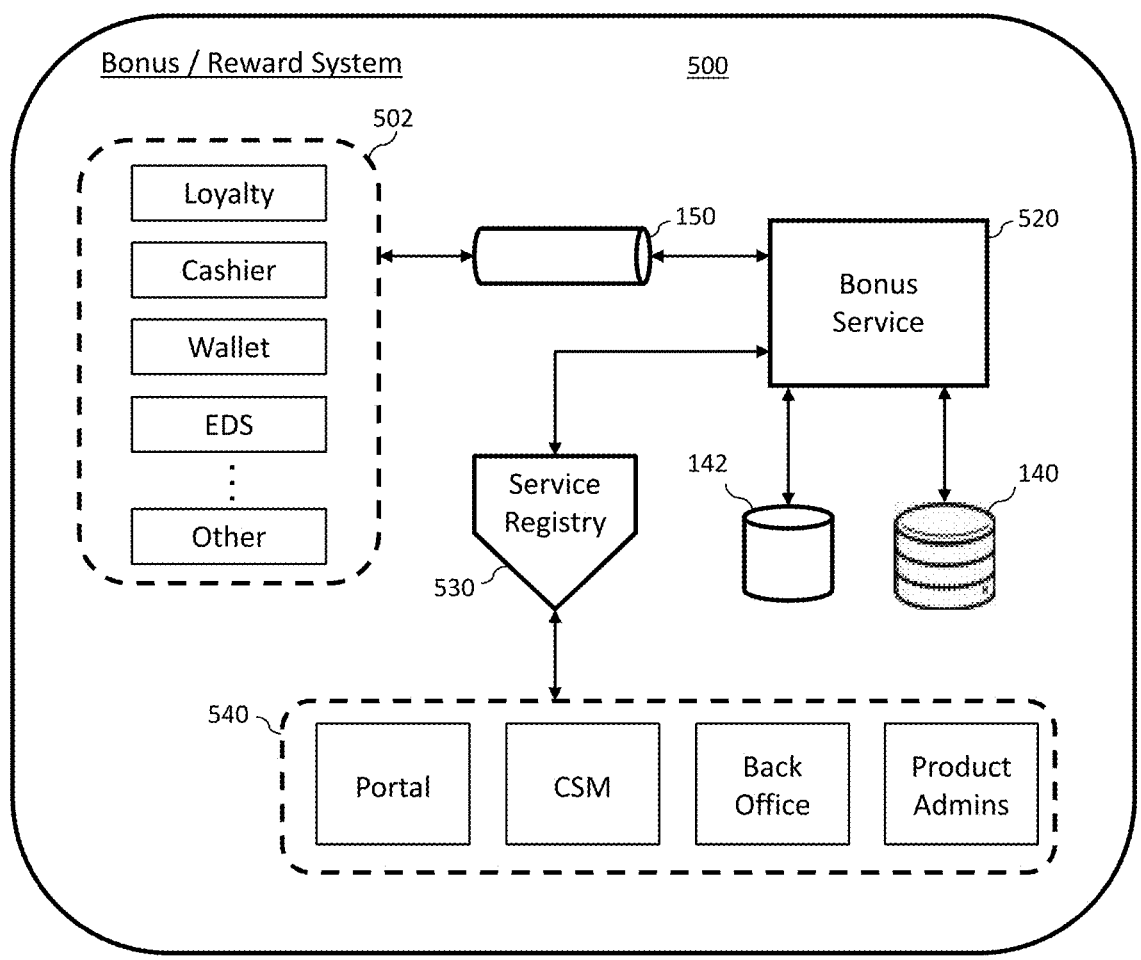
FIG. 5 shows an example of a bonus/reward system according to embodiments.

FIG. 5 shows an example of a bonus/reward system 500 according to embodiments. The bonus/reward system 500 is used to provide players using the gaming system 100 with bonuses and/or rewards based on a number of different parameters or criteria that may be preset and stored ahead of time, or which may be dynamically determined by the system. The bonuses and rewards offered by the bonus/reward system 500 can be offered for each of the games offered by the gaming system 100, and may vary by game, as will be discussed more below.

The bonus/reward system 500 includes a fulfillment subsystem 502 that is capable of monitoring and providing fulfillment of bonuses and rewards to the various users of the gaming system 100 by different means, and which may also be used to monitor consumption of and provide ways for players to consume the various bonuses or rewards offered by the bonus/reward system 500. For example, the fulfillment subsystem 502 may allow the bonus/reward system 500 to interact with an provide promotion or loyalty points via the promotion/loyalty system 300. The fulfillment subsystem 502 may also provide interaction with the cashier to provide various other bonuses or rewards to a player using the gaming system, and may also provide access to the wallet of a player using the gaming system 100 to allow the promotions and rewards provided by the bonus/reward system 500 to be stored by the player for the player's access across his or her use of the gaming system 100. The fulfillment subsystem 502 may also interact with the EDS 400 to determine when various events occur that require or justify promotions or rewards to players using the gaming system 100. The fulfillment subsystem 502 may also interact with other systems, subsystems, games, and functionality provided by the gaming system 100 to provide various bonuses and rewards to the players using the gaming system 100, consistent with the principles and objectives described herein.

The fulfillment subsystem 502 of the bonus/reward system 500 may communicate information concerning the various types of bonuses and rewards to be awarded to a bonus service 520 by way of data pipeline 150, which may provide various real-time or dynamic analyses of the information from the fulfillment subsystem 502. This may include monitoring and administering the consumption and/or fulfillment of bonuses and/or rewards by the fulfillment subsystem 502 interfacing with the various systems described in connection therewith.

In addition to various real-time or dynamic data accessed, used, and updated in connection with the data pipeline 150, the bonus service 520 may also access, use, and update data in one or more data stores 140, 142. As described in connection with FIG. 1, the data pipeline 150 and the data stores 140, 142 may be accessed either directly via direct connection, or via a connection over the network 110 for the gaming system 100. This includes the ability of the bonus/reward system 500 to access the data pipelines 150 and/or the data stores 140, 142 in locations remote from that system 500 and/or remote from any server 130 upon which that system may be operating.

The bonus service 520 may also receive input regarding bonuses and rewards to be offered from the service registry 530, which receives input from a number of different sources 540 for creating or offering rewards and bonuses. For example, the bonus/reward system 500 can receive input regarding which rewards and bonuses to offer via the service registry 530 from a number of different sources 540, including a portal to allow access to users or administrators, access for customer service managers (CSM), access for back-office employees, and access to administrators of various products offered via the gaming system 100. Other sources 540, aside from those shown, can be added or sources can be removed, according to the specific needs of the gaming system 100 in accordance with the principles described herein.

According to embodiments, the bonus/reward system 500 may offer (e.g., from the bonus service 520) a variety of bonuses for different games via the gaming system 100. For example, the bonus/reward system 500 can offer bonuses, such as cash amounts, digital currency (e.g., crypto currency), non-fungible tokens (NFTs), or other real-world or digital assets, which may be offered in the form of prizes based on gameplay or performance. In addition to the rewards offered, the bonus/reward system 500 can offer various rewards, such as in-game rewards that enhance or alter the game play or participation in the various games provided via the gaming system 100. For example, the bonuses offered via the bonus/reward system 500 can change and be adapted according to pre-determined parameters, customer demand, or a variety of other variables within the data flow 150, the data stores 140, 142, or received from the service registry 530. These bonuses and rewards offered by the bonus/reward system 500 can be tailored to a specific game via the gaming system 100. By way of example, for sports betting offered via the gaming system 100, the bonus/reward system 500 may offer free bets, cash bonuses, or other prizes. As another example, for bingo offered via the gaming system 100, the bonus/reward system 500 may offer bonus bingo tickets, cash bonuses, or other prizes. As a further example, for poker offered via the gaming system 100, the bonus/reward system 500 may offer free turns, free rolls, free round or tournament dollars (e.g., cash or cash equivalent that can be used for a particular round or tournament), cash bonuses, or other prizes. As an additional example, for electric casino games (e.g., casino slot races) offered via the gaming system 100, the bonus/reward system 500 may offer bonus free spins, free special tokens or coins (e.g., tokens or coins with special properties to be used with the casino games), free-to-play turns or tournaments, cash bonuses, or other prizes.

Figure 6:
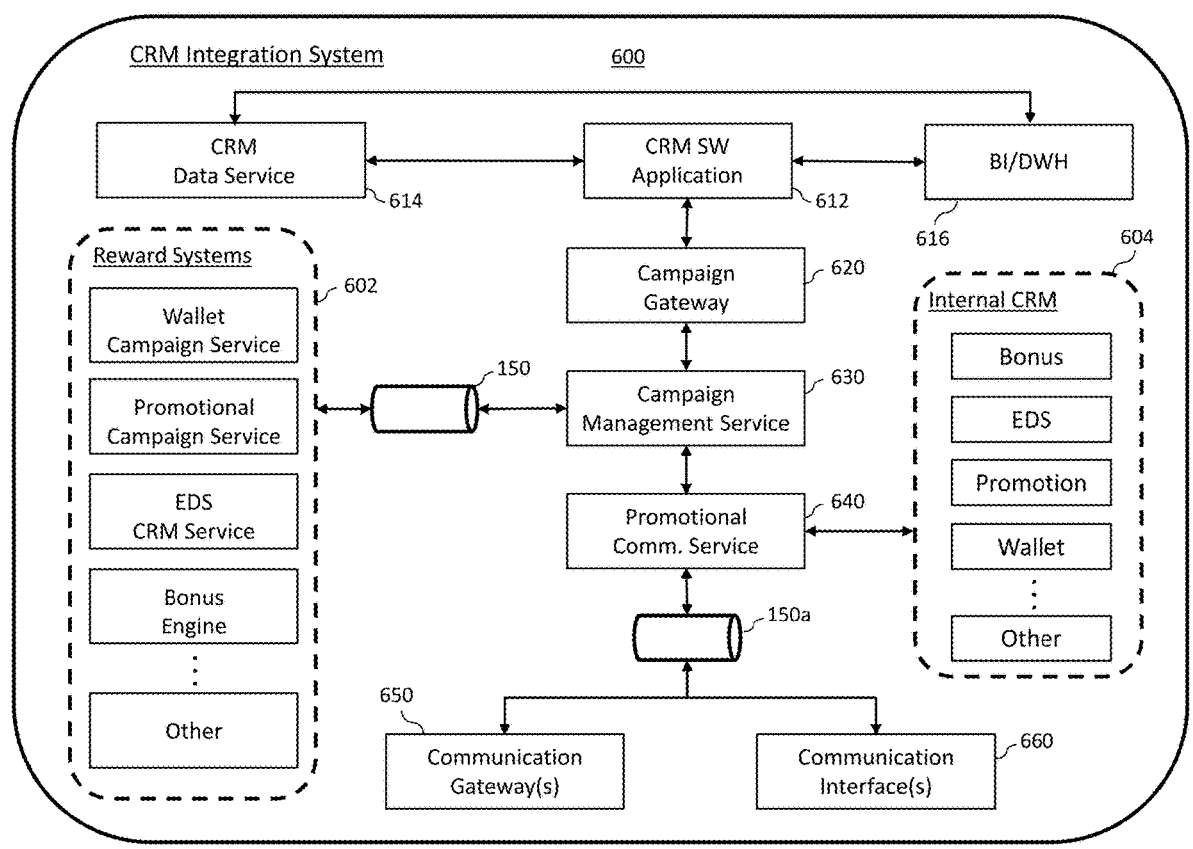
FIG. 6 shows an example of a CRM integration system according to embodiments.

FIG. 6 shows an example of a CRM integration system 600 according to embodiments. The CRM integration system 600 receives input from the reward systems 602 and internal CRM subsystems 604. The reward systems 602 represent rewards associated with the various systems and subsystems of the gaming system 100, which can be provided by the bonus/reward system 500 of FIG. 5. For example, the reward systems 602 may include a wallet campaign service for integrating rewards to a wallet associated with a player using the gaming system 100. The reward systems 602 may also include a promotional campaign service for integrating promotional campaign offerings for players or groups of players using the gaming system 100 and a bonus engine for integrating bonus offerings for players or groups of players using the gaming system 100. The reward systems 602 may also include an EDS CRM service for monitoring and detecting events and integrating that event detection service with the CRM integration system 600 and its components, including the CRM software application 612 and the campaign management service 630. The reward systems 602 are in communication with a data flow 150 for providing and receiving real-time and dynamic data to and from the CRM integration system 600. The reward systems 602 can also include other services and subsystems according to the functionality and rewards offered by way of the gaming system 100. The internal CRM subsystems 604 may include bonus, EDS, promotion, wallet and other subsystems to integrate rewards associated with each subsystem.

The CRM integration system 600 may also use a CRM software application 612 to help manage customer relationship and customer data information of players using the gaming system 100. This may include customer data platform software that is custom or provided by a third-party (e.g., Optimove, Bloomreach, Salesforce, or other appropriate software supplier). To manage the data of the CRM integration system 600, the CRM software application 612 is in connection with a CRM data service 614 that manages the CRM data relevant to the gaming system 100. The CRM software application 612 and the CRM data service 614 are each in communication with a business information (BI) and/or data warehousing (DWH) service 616, which may generate business insights relevant to the gaming system 100 and the players using that system, and may provide relevant data for generating those business insights. The CRM software application 612 communicates with other components of the CRM integration system 600 via a campaign gateway 620, which in turn communicates with the campaign management service 630.

According to embodiments, the campaign management service 630 receives information from the campaign gateway 620 that allows it to actively manage the campaigns of the gaming system 100 according to information about the various campaigns and users of the system. The campaign gateway 620 may provide information to the campaign management service 630 in the form of segmented lists. For example, the campaign gateway 620 may provide the campaign service 630 lists of the players using the gaming system 100, segmented according to useful information and parameters about those users, the campaigns being provided, or other parameters useful for segmenting the information. Based on the information communicated to the campaign management service 630, according to embodiments, it may provide information about rewards into the data flow 150 connected to the reward systems 602 to administer rewards to the reward systems 602 via the gaming system 100.

The campaign management service 630 also receives information from and provides information to a promotional communication service 640, which is in communication with the internal CRM subsystems 604 and a data flow 150 in communication with various communication gateways 650 and communication interfaces 660. According to embodiments, the promotional communication service 640 receives input from the internal CRM subsystems 604 and communicates information to the data flow 150a to provide communications to players using the gaming system 100 via the communication gateways 650 and communication interfaces 660. The communications provided to users of the gaming system 100 can be provided by a number of communication gateways 650, including gateways designed to directly communicate with an exact target player or a group of players using a third-party application or service, such as an email message, a text message (e.g., SMS or MMS messaging), or other direct message, and gateways designed to communicate information via the gaming system 100, such as site and application banners, push messages, and the like. The communications provided via the communication gateways 650 are informed by the dynamic data of the data flow 150a in communication the gateways.

The communications provided to users of the gaming system 100 can also be provided by a number of communication interfaces 660, which are also informed by the dynamic data of the data flows 150, 150a in communication with those interfaces either directly or indirectly. The communication interfaces 660 can include communications to an account in-game inbox of a player or group of players that is capable of providing information to each player, including regulatory, informational, bonus-related information, account-related information, and other similar information. The communication interfaces 660 may also communicate to players using the gaming system 100 in different ways, including overlays, advertisements, pop-up messages, or other in-gaming messaging techniques that provide the relevant communications directly to the player(s). The information provided by way of the communication gateways 650 or communication interfaces 660 can include communications of various bonuses, rewards, prizes, or invitations being provided to players, depending on the campaigns and rewards being coordinated by the campaign management service 630. These communications are based on data and parameters associated with the players or groups of players using the gaming system 100, including, for example, geographic location, seasonal offerings, player activity, player profile information, financial incentives, or other criteria or parameters.

Figure 7:
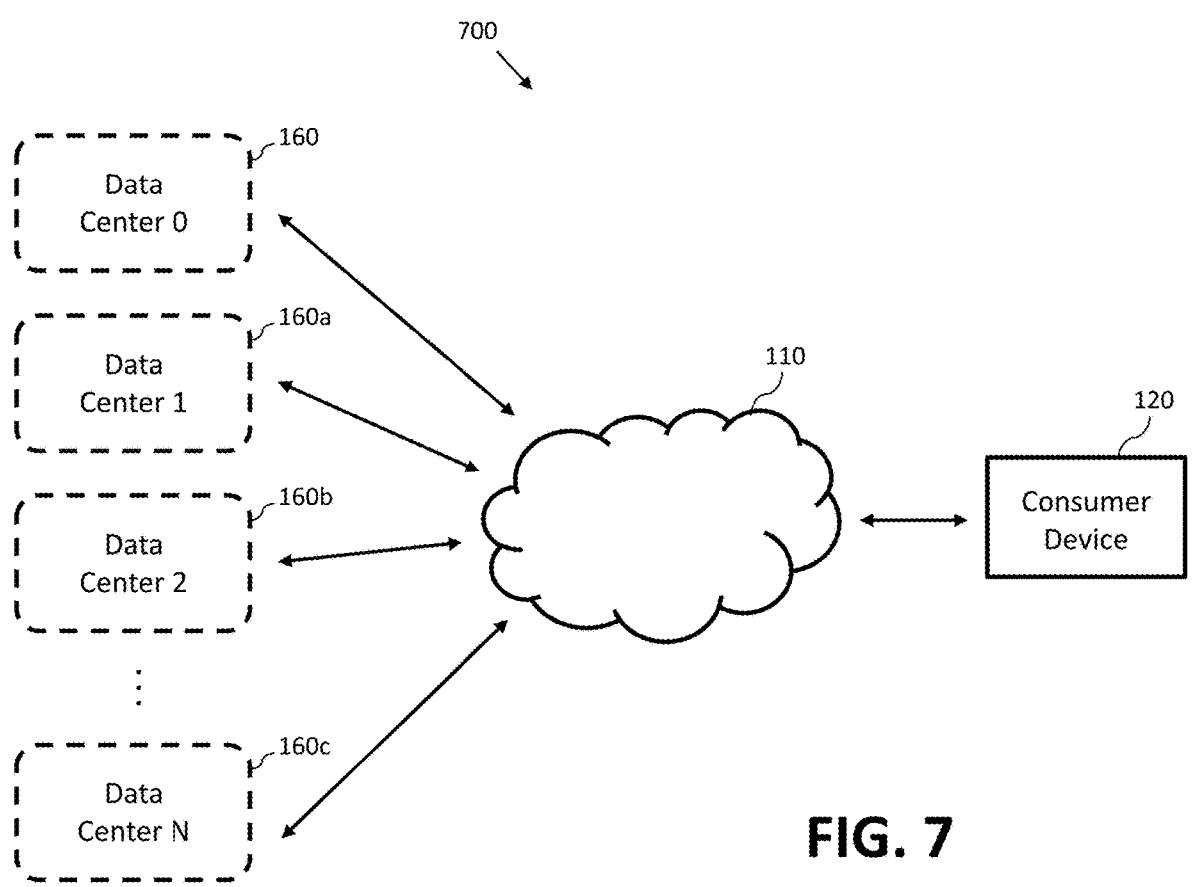
FIG. 7 shows an overview of a system and various components thereof to allow a consumer device to communicate with multiple data centers according to embodiments.

FIG. 7 shows an overview of a system 700 and various components thereof to allow a consumer device 120 to communicate with multiple data centers 160 according to embodiments. Similar to the gaming system 100 shown in FIG. 1, the system 700 of FIG. 7 allows a consumer device 120 (e.g., mobile devices 122, laptops 124, desktop computers 126, or other user device 120 suitable for accessing the network 110), to connect to one or more data centers 160 via the network 110, which may include the Internet, a local network, or some combination thereof. As shown in FIG. 7, the consumer device 120 may access a number of devices, shown as Data Center 0 160, Data Center 1 160a, Data Center 2 160b, . . . Data Center N 160c. That is to say that the number of data centers 160 used in the system of FIG. 7 may be unlimited and can be expanded as needed.

The system shown in FIG. 7 can route service of the consumer device 120 to different a data center 160 based on a number of different criteria. For example, a typical service may route access for a consumer device 120 over the network 110 to a data center based on load balancing, or some other similar desirable parameter. In the case of a gaming system that may involve financial transactions or gambling and related regulatory requirements, one way to route access for a consumer device 120 over the network 110 may involve the geographic location of the consumer device 120 and the related regulations in that geographic location. For example, in the United States, each state has different regulations relating to such financial transactions or gambling. For example, while Nevada, New Jersey, Pennsylvania, West Virginia, and Colorado all permit some type of gambling (and other jurisdictions may also allow gambling or free-to-play applications), the laws and regulations and gambling permitted in each jurisdiction are all very different from one another. As such, one way to address and ensure compliance with each state's laws and regulations is to provide a specific data center for each state that is accessed when the consumer device is physically located within that state's jurisdiction (e.g., as determined by geolocation or some other location-determining technique), which is specifically set up for compliance with that host state's laws and regulations. The same principles can also apply for jurisdictions outside of the United States. Thus, Data Center 0 160 may be accessed by the consumer device 120 when the user of the device attempts to access a game or other gambling activity on the system while located in a first state, while Data Center 1 160*a* and Data Center 2 160*b* may be accessed when the consumer device 120 attempts to access a game or other gambling activity on the system from a second and third state, respectively. In this way, each individual data center can be set up to ensure compliance with its associated state (or other) jurisdiction's laws and regulations.

Figure 8:
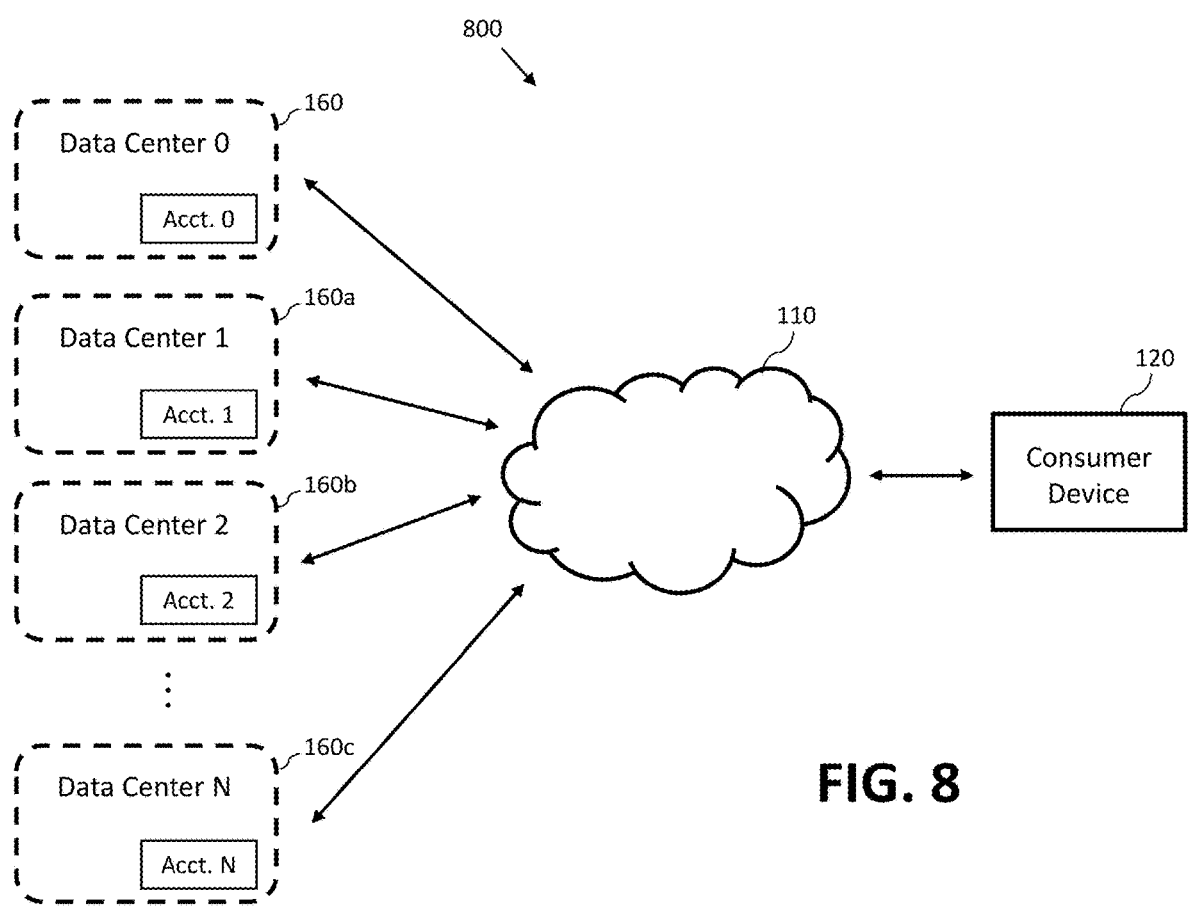
FIG. 8 shows an overview of a system and various components thereof to allow a consumer device to communicate with multiple data centers having multiple separate accounts.

FIG. 8 shows an overview of a system 800 and various components thereof to allow a consumer device 120 to communicate with multiple data centers 160 having multiple separate accounts. The system 800 of FIG. 8 is similar to the system 100 of FIG. 1 and illustrates one way to provide gaming or gambling access to a specific player using the consumer device 120 while ensuring compliance with the laws and regulations of the state (or other jurisdiction) where the player and the consumer device 120 are located. In this system 800, the player uses an application or web browser on the consumer device 120 to access the gaming system via the network 110. As with the system of FIG. 7, when the player and the consumer device 120 are located in a first state (or other jurisdiction), the player's access and communications are routed to the first data center, Data Center 0 160, and when the player and the consumer device 120 are located in a second and third state (or other jurisdiction) the player's access and communications are routed to a second data center, Data Center 1 160*a*, and a third data center, Data Center 2 160*b*, respectively.

In addition, the system 800 of FIG. 8 shows that when the consumer device 120 is logged into each individual data center based on its geographic location, the player using the device is logged into a separate account associated with that data center and corresponding jurisdiction. In other words, the player is logged into Account 0 when logging into Data Center 0, Account 1 when logging into Data Center 1, and so forth. This setup has the advantage of ensuring that both the data center and the player's unique account in that data center are set up in such a way to ensure compliance with the host jurisdiction's laws and regulations and to provide a physical separation between the data centers and accounts where the laws and regulations of other jurisdictions are applied and followed. The disadvantage of this system is that the user has multiple, different accounts across the overall system 800 of FIG. 8, each of which may contain different information, providing the user with inconsistent access to his funds, account information, or other information. Another disadvantage of the system 800 of FIG. 8 is that the replication of accounts for each user has the potential to increase the overhead (e.g., storage, tracking, etc.) associated with each player using the system if that player accesses the system from multiple different geographic locations. The system 800 of FIG. 8, because it may have multiple, independent accounts for any user can also lose the correlation of a user's activity and thus valuable information about a user across those different accounts that might otherwise be usable if the accounts were coordinated in some way.

Figure 9:
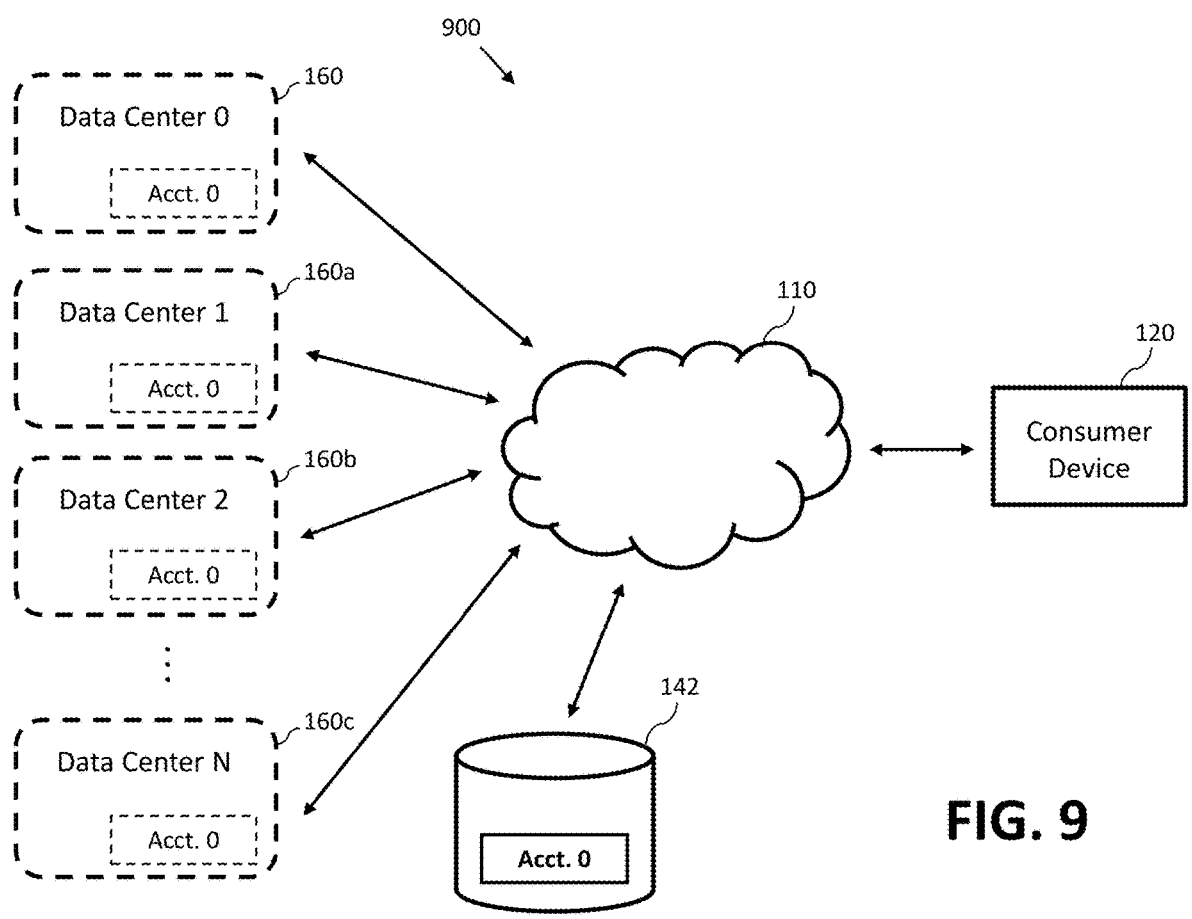
FIG. 9 shows an overview of a system and various components thereof to allow a consumer device to communicate with multiple data centers having a single account according to embodiments.

FIG. 9 shows an overview of a system 900 and various components thereof to allow a consumer device 120 to communicate with multiple data centers 160 having a single account according to embodiments. The system 900 of FIG. 9 is similar to the system 100 shown in FIG. 1 and can be used for similar applications. Unlike the system 800 shown in FIG. 8, the system 900 of FIG. 9 has a single account, Account 0, accessed by a player using a consumer device 120 for gaming and gambling purposes. Thus, while the consumer device 120 may still be directed to connect and communicate with a particular data center associated with a particular jurisdiction based on the geographic location of the consumer device 120 within the same jurisdiction (or a compatible jurisdiction for the purpose of the games and functionality being offered by the system, if appropriate), the user will be connected to the same account in each jurisdiction. The user will have different functionality available or limited in specific geographic locations based on and to ensure compliance with the laws and regulations in that location.

A user's access to different functionalities in different jurisdictions can be managed either by forcing a consumer device 120 to connect to the specific data center 160 located in the same jurisdiction and set up for compliance with the laws and regulations of that jurisdiction. On the other hand, where all relevant laws and regulations permit it, access to one or more jurisdictions may be combined in a way that still limits a user's access to functionality based on the laws and regulations of geographic location where the consumer device 120 is located, which can be accomplished by access lists, smart networking, dynamic access rules, relational database access rules, virtual partitions, or other appropriate means.

The single account used for each user may be stored in a database 142, as shown in FIG. 9, which may be part of one of the data centers 160 or separate therefrom, depending on constraints like the network topology requirements, network communications capabilities, and various laws and regulations where applicable. For example, one of the data centers (e.g., Data Center 0 160) could be designated as a main data center that houses user account information in databases 142 or other data stores 140. The account can be replicated or virtually replicated across all of the data centers to allow the user access to the same account regardless of the geographic location of the user and the consumer device 120. As an alternative, the database 142 or other data store 140 containing the user account information may be separate from all of the data centers directly accessed by the consumer device 120 over the network 110. This could be in a separate data center or other facility accessible via the network 110. Any account activity in each data center can be regularly updated and synchronized with the principal account information (e.g., the account information in the main database 142). This could occur, for example, daily during low traffic hours or at some other convenient frequency at convenient times, and/or can be done dynamically upon each access to the same account via a different data center 160 to minimize system disruption and provide maximum synchronicity between different copies of the user account, thereby providing the user of the consumer device 120 with the smoothest and most consistent experience.

According to embodiments, single account for each user of the system 900 shown in FIG. 9 may contain data and information concerning the user associated with each account. This can include information provided by the various CRM systems 200 shown in FIG. 2 and subsequent FIGS. 3-6. The data and information stored by or with the account can include, for example, financial information associated with the user. In this regard, the user's account can include a way to store value associated with the user's account, such as a digital wallet, ledger, or account. For example, a digital wallet can be used to store various items of value, such as bonuses, rewards, prizes, or promotional items awarded via the system, as discussed above. A digital wallet can also be used to store other items of value, such as cash amounts, digital or crypto currency, NFTs, or other real-world or digital assets. According to embodiments, in the system of FIG. 9, a user can be assigned a single wallet, which may, for example, be associated with the user's single account. The single wallet may be stored on a central database 142 and information about the items and assets stored in the wallet may be copied across data centers 160 so that a user may access and use items and value from the wallet and/or and store items and value in the wallet regardless of the user's geographic location or the geographic location of the consumer device 120 or the data center 160 to which it is connected.

Certain laws related to gaming may require that when a player participates in gaming activity while located in a particular jurisdiction, all account data associated with the player and the activity must also reside in that jurisdiction. The example system 900 shown in FIG. 9 facilitates compliance with such laws by ensuring that player account information resides in data centers 160 located in each jurisdiction where a player may attempt to participate in gaming activity (e.g., available through specific database devices or data stores 140, 142 or a data flow 150). Because the system provides for a single account, as opposed to a separate account corresponding to each jurisdiction, a player may, for example, use the same account login credentials regardless of the jurisdiction in which the player is located, providing a more consistent user experience. Moreover, a player's account information accessed in one jurisdiction may include information that reflects the player's gaming activity in jurisdictions other than the one in which the player is presently located. Accordingly, a player may, for example, earn rewards based on achieving a certain level of system-wide gaming activity, as opposed to rewards being limited to achieving a certain level of gaming activity within a particular jurisdiction.

Similarly, certain laws related to gaming may require that when a player participates in gaming activity while located in a particular jurisdiction, all funds, or a record of all funds, associated with the activity must also reside in that jurisdiction. The example system 900 shown in FIG. 9 facilitates compliance with such laws by ensuring that a player's funds, or a record thereof, are capable of residing in data centers 160 located in each jurisdiction where a player may attempt to participate in gaming activity. Because the system provides for a single wallet, as opposed to a separate wallet corresponding to each jurisdiction, a player may, for example, have access to the same funds, regardless of the jurisdiction in which the player is located, providing a more consistent user experience. In embodiments, a wallet associated with a player is established and resides in each data center 160 associated with each jurisdiction in which the player may participate in gaming activities in accordance with the system. The system provides the player with a single wallet by facilitating the seamless transfer of funds from the player's wallet that resides in a first jurisdiction to the player's wallet that resides a second jurisdiction when the player travels from the first jurisdiction to the second jurisdiction and attempts to participate in gaming activity while located in the second jurisdiction, thereby providing a more consistent user experience. Examples of data centers used in the configuration shown in FIG. 9 are described with reference to later figures below.

Figure 10:
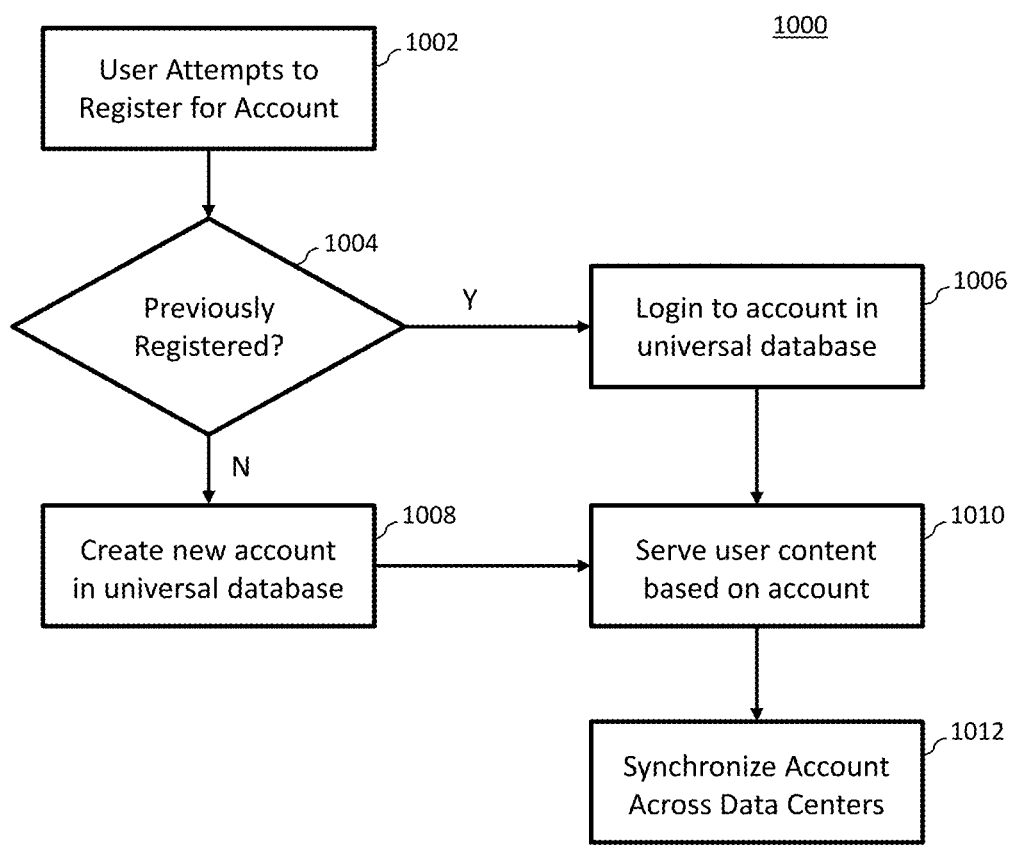
FIG. 10 shows a process and various steps thereof for use with a single account in a system having multiple data centers or databases according to embodiments.

FIG. 10 shows a process 1000 and various steps thereof for use with a single account in a system having multiple data centers or databases according to embodiments. Because a user may wish to access his or her account in multiple different jurisdictions, the system setting up and using the account and multiple copies of the account needs a technique for registering and maintaining consistency and copy control of those account copies. Although this may not be a problem when a user uses consistent login information in each jurisdiction with each corresponding data center, for example, it may become an issue if the user uses different or inconsistent information, which the system or specific data center may view as a user attempting to register for a new account. Thus, when a user attempts to register for an account in step 1002, a determination is made regarding whether the user has previously registered for an account in step 1004. This may be verified centrally within the system using identification information that is likely to be repeatedly used by a user across systems (e.g., full name, mobile phone number, social security number, date of birth, street address, email address, biometric information like fingerprints or facial recognition, etc.), or some combination of multiple different forms of identification information.

If it is determined in step 1004 that the user has previously registered for an account, the user is logged in to the universal database 142 or prompted to log into the universal database 142 in step 1006. Otherwise, if it is determined in step 1004 the user has not previously registered for an account on the system, the system creates a new account in the universal database 142 in step 1008 and prompts the user to provide the required and relevant information. The account created in the universal database in step 1008 that will be replicated in all data centers upon synchronization of the system. Whether the user ends up logging into an existing account in step 1006 or creates a new account in step 1008, the system serves the user content based on the user's account in step 1010. This includes the content described above in connection with the earlier figures, including the content served by the CRM services 200, such as the promotion/loyalty system 300, the EDS 400, the bonus/reward system 500, and the CRM integration system 600. The system also synchronizes accounts across data centers in step 1012, as described above, based on the timing and other parameters of the system.

Figure 11:
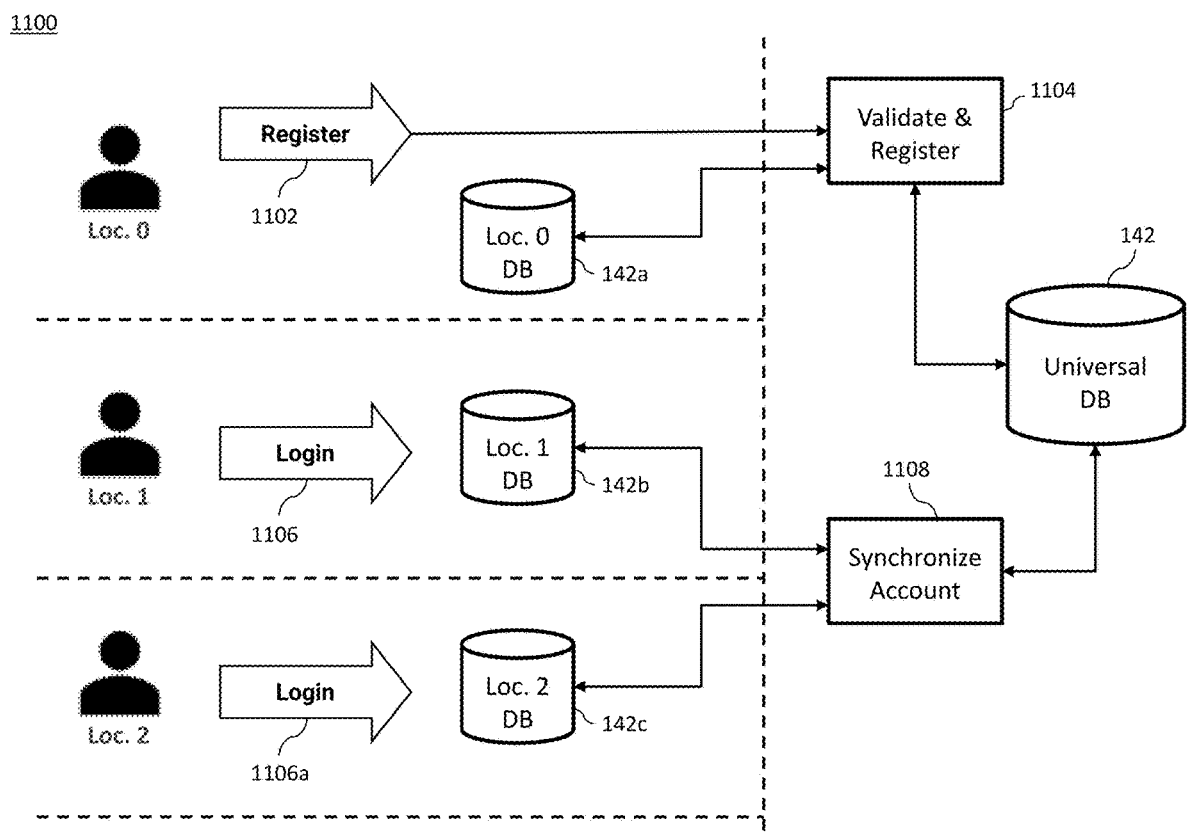
FIG. 11 shows a diagram for using a single account in a system having multiple data centers or databases according to embodiments.

FIG. 11 shows a diagram 1100 for using a single account in a system having multiple data centers or databases 142 according to embodiments. In FIG. 11, a user accesses the system in multiple different geographic locations, designated Location 0, Location 1, and Location 2. Although there are only three locations shown in FIG. 11, the same principles apply when the user accesses the system at any number of locations. The system of FIG. 11 uses a single account for each user across multiple geographic data center locations, as shown. According to embodiments, the system shown in FIG. 11 can be used with process of FIG. 10. As shown in FIG. 11, the user registers for a new account at Location 0. Location 0 includes a local database referred to as Loc. 0 DB 142a, which stores information in the data center associated with that location. Because the user has not previously registered for an account, the user's registration request is validated and registered 1104. This may be accomplished at a central location for the entire system shown in FIG. 11. Once the user's account is validated and registered, the account information is stored in the universal database 142, which may be at a central location for the entire system of FIG. 11.

Once the account has been created and centrally stored in the universal database 142, whenever the user logs in at different locations 1106, 1106a, such as at Location 1 and Location 2, then the system does not create a new account, but grants access to a "copy" of the account stored in a local database 142b, 142c associated with the local database in the data center corresponding to the geographic location of the user and whatever consumer device 120 the user is using to access his or her account. According to an embodiment, the "copy" of the account may be a pointer to the original account or a shadow account associated with the user in that jurisdiction, and which may be created in each local jurisdiction for the user. Alternatively, according to an embodiment, the copy may include a separate copy that is maintained locally and then reconciled with the other copies of the same account. The copy of the account in each local database 142b, 142c is updated and synchronized with the main copy in the universal database 142. According to embodiments, the central location where the universal database 142 is located may be the same as one of the local data centers (e.g., the first location, Loc. 0). According to embodiments, although the universal database 142 is geographically co-located with the local data center, it is maintained as a separate database because of the different functionality and data of the universal database 142 and the local database. According to an alternative embodiment, the universal database 142 may also be configured and used as the local database of that geographic location (e.g., Loc. 0 DB 142a), if desired. According to other embodiments, the universal database 142 may be separate from and located at a different geographic location than all of the data centers and their respective local databases 142a, 142b, 142c, but in communication by way of a network connection.

According to embodiments, the registration process allows a user in a first location to create an account in the first location. When a user completes the registration process in a first location, shadow accounts may be created in all remaining locations with the user's information. A user's available balance may be made available to the user in the last location in which the user has logged in to the system.

The system may be configured such that when a user moves from a first location in which the system is available to a different location in which the system is available, attempting to use the system in the different location may trigger a transfer of funds from the user's account in the first location to the user's account in the different location. The transfer of funds may include the transfer of the user's full unrestricted balance from the user's account in the first location to the user's account in the different location. The system may maintain a transaction history in which records of all transfers between a user's accounts are visible.

Various locations in which the system is available may implement various requirements for verifying a user's identity via know your customer or know your client (KYC) procedures. The system may be configured such that the initial registration process involves the user undergoing a KYC procedure associated with the location in which the initial registration process is performed. The system may then transfer the user's KYC verification status to all locations in which the system is available. Accordingly, if a user registers in a first location and subsequently attempts to use the system in a different location, the user may not be required to undergo the KYC procedure associated with the different location, provided that the KYC requirements of that different location are equally or less rigorous than those of the first location. However, if a user registers in a first location and subsequently attempts to use the system in a different location, the user may be required to undergo the KYC procedure associated with the different location if the KYC requirements of that different location are more rigorous than those of the first location.

Each location in which the system is available may require users to accept certain location-specific terms and conditions (T&C) in order to participate in gaming activities within that location. The system may be configured such that each time a user attempts to use the system in a location for the first time, the system may prompt the user to accept the terms and conditions associated with that location. The system may keep a record of the dates upon which a user accepted the terms and conditions associated with each location in which the user has used the system.

Figure 12:
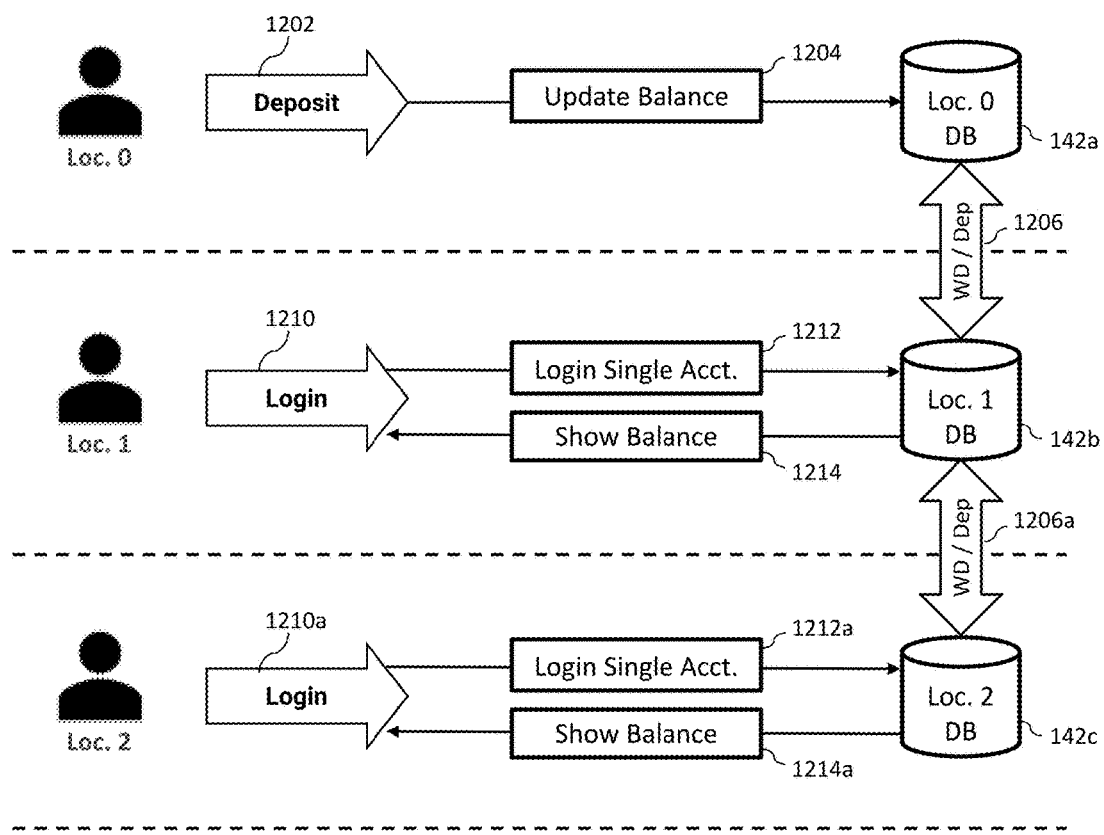
FIG. 12 shows a diagram for using a single wallet in a system having multiple data centers or databases according to embodiments.

FIG. 12 shows a diagram 1200 for using a single wallet in a system having multiple data centers or databases 142a, 142b, 142c according to embodiments. As explained previously, a user may have a single wallet or other means of storing items of value (e.g., digital wallet, digital ledger, or account). FIG. 12 illustrates how a single wallet can be used by the system across multiple distinct geographic locations and, according to embodiments, in connection with a single user account across multiple locations. As with FIG. 11, although FIG. 12 illustrates only three geographic locations, the principles of that system apply to systems using any number of different locations, and thus the system of FIG. 12 can be used with as many geographic locations as desired. The system of FIG. 12 provides a way for maintaining, updating, and synchronizing a digital wallet that may be used with a gaming system across multiple For example, when a user at a first location (Loc. 0) deposits 1202 cash or another item of value into the user's account, ledger, or wallet for use in a gaming system 100, the balance of the user's account ledger or wallet is updated 1204 and stored in the local database Loc. 0 DB 142a associated with the local database for that geographic jurisdiction. Information about these and other transactions, such as withdrawals and deposits are communicated between and synchronized among the wallet information stored in each local database (e.g., Loc. 1 DB 142b and Loc. 2 DB 142c). That what when a user logs in to the system 1210, 1210a while in different geographic locations (e.g., Loc. 1, Loc. 2), the system has information about the user's wallet stored locally in its corresponding local database 142b, 142c. The system of FIG. 12 recognizes the user's login attempt as an attempt to login to an existing account, passes the login information and credentials 1212, 1212a to the local database 142b, 142c, and retrieves balance and other information about the user's wallet that are displayed to the user 1214, 1214a.

In embodiments, when a user has made a deposit 1202 at a first location (Loc. 0), the user's balance is updated 1204 and stored in the local database (Loc. 0 DB 142a) associated with the first location. When the user subsequently travels to a second location (Loc. 1), a transaction 1206 occurs in which the user's balance is withdrawn from the user's wallet residing in the local database (Loc. 0 DB 142a) associated with the first location, and that balance is deposited into the user's wallet residing in the local database (Loc. 1 DB 142b) associated with the second location. Similarly, if the user travels from the second location (Loc. 1) to a third location (Loc. 2), a transaction 1206a occurs in which the user's balance is withdrawn from the user's wallet residing in the local database (Loc. 1 DB 142b) associated with the second location, and that balance is deposited into the user's wallet residing in the local database (Loc. 2 DB 142c) associated with the third location.

The system shown in FIG. 12 may be configured such that a user may earn rewards, for example, associated with a loyalty program, in a first location and further earn rewards in a different location. These rewards, promotions, prizes, and bonuses, along with other items of value, may be stored in the user's account, leger, or digital wallet. Rewards earned in each location may be combined into a cumulative rewards balance and rewards may be redeemed in a location in which some or all of the rewards were earned or, alternatively, in a location where none of the rewards were earned. According to embodiments described herein, these may all be stored in the same location until they are redeemed.

Figure 13:
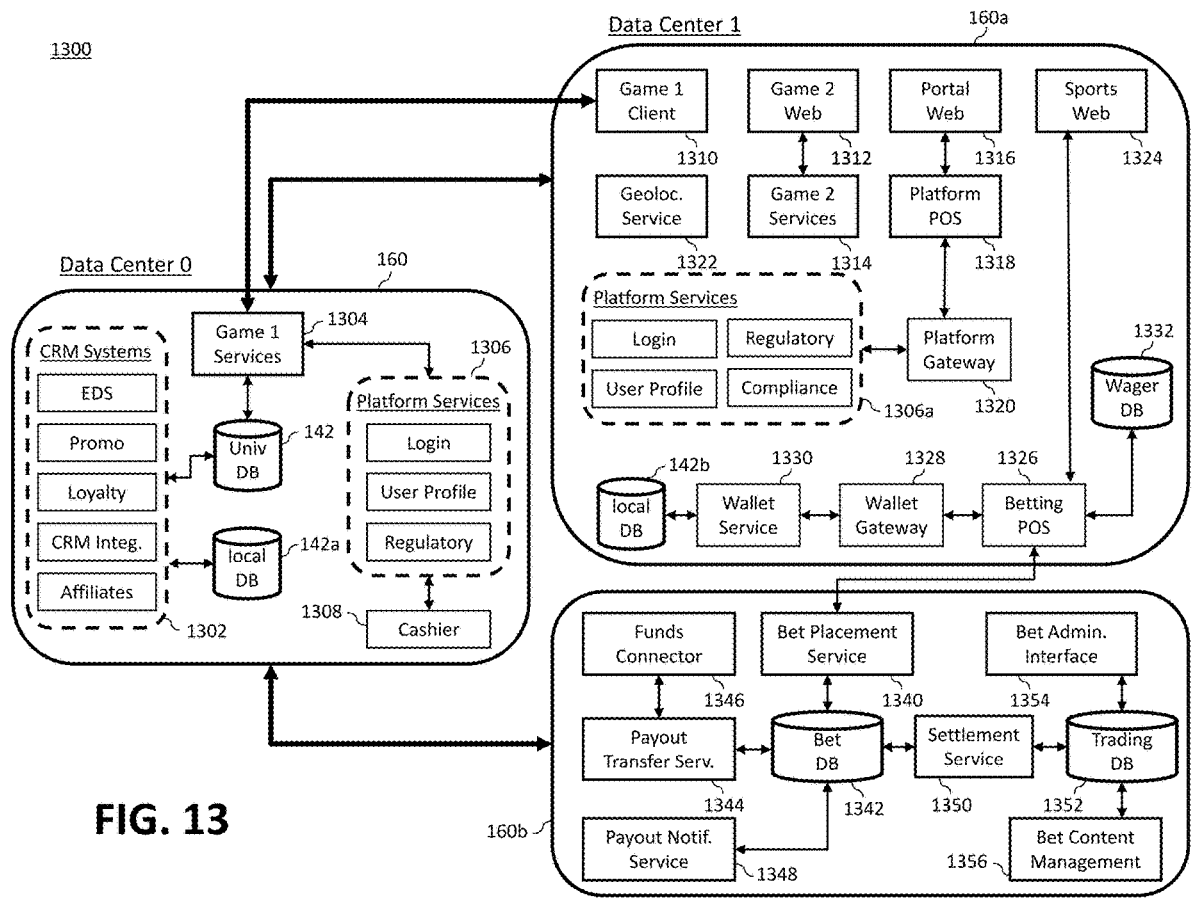
FIG. 13 shows a detailed overview of a system and various components thereof to allow a consumer device to communicate with multiple data centers according to embodiments.

FIG. 13 shows a detailed overview of a system 1300 and various components thereof to allow a consumer device to communicate with multiple data centers according to embodiments. The system 1300 of FIG. 13 is similar to prior systems 100, 700, 800, 900, described herein and may use components of those or similar systems, or may be used by such systems. The system 1300 includes multiple data centers, Data Center 0 160 and Data Center 1 160a, associated with different geographic locations. The system 1300 also includes a separate central data center 160b, which is at a geographic location that may be separate from one or both of the local data centers 160, 160a. Although the system 1300 is shown using these three data centers 160, 160a, 160b, the system is scalable and can be implemented using more or fewer data centers than shown in FIG. 13 by applying the same principles discussed herein relevant to that system 1300.

In the system 1300 shown in FIG. 13, Data Center 0 is the main data center that includes a local database 142a and a universal database 142 for the entire system, which may be the same database according to embodiments, or may be separate databases in the same data center. Data Center 1 160a corresponds to a different geographic location than the geographic location of Data Center 0 160. These two data centers 160, 160a are in communication with each other as shown in FIG. 13. If additional data centers were used at other geographic locations, they would also be in communication with these data centers 160, 160a in similar fashion, and could be arranged as a mesh network, where each data center is in communication with the other, or in a hub-and-spoke configuration, where each data center is in communication with the main Data Center 0 160 but may not be in communication with each other, depending on the needs of the system 1300.

The central data center 160b is different from and provides support and storage for the other data centers and for use by the system 1300. This central data center 160b may be in the same geographic location as one of the other data centers 160, 160a, or in a separate geographic location from any of the other data centers depending on a variety of different factors, such as cost of land, technical requirements, requirements of applicable laws and regulations, or other parameters. As shown in FIG. 13, the central data center 160b is in communication with both the main Data Center 0 160 and Data Center 1 160a.

According to embodiments, the main Data Center 0 160 administers various CRM system 1302, similar to the CRM system 200 of FIG. 2, including EDS, promotions, loyalty, CRM integration and affiliate programs. The promotions and loyalty systems are similar to those shown in connection with the promotion/loyalty system 300 of FIG. 3. The EDS is similar to the EDS 400 of FIG. 4. The CRM integration system is similar to the CRM integration system 600 of FIG. 6. The affiliates system permits affiliates to provide customer relations data and information for use in the system 1300, and may, according to embodiments, include some functionality described in connection with the bonus/reward system 500 of FIG. 5 or other figures described above.

The CRM systems 1302 are in communication with the universal database 142 and the local database 142a, and provide information concerning the various CRM systems and functions to those databases 142, 142a. The information stored in the local database 142a is used for players logging into that Data Center 0 as the local data center corresponding to the geographical area of the consumer device 120 that the user is are using. The universal database 142 may be used to support game services, such as Game 1 services 1304 of the main Data Center 0 160. This Game 1 can be any number of games provided by the gaming system, such as poker or slot races. Each geographic data center 160, 160a includes platform services 1306, 1306a local to each data center. These platform services may include services like login services, user profile services, regulatory services and compliance services. The platform services may support the games, such as Game 1 services 1304. The platform services 1306 may also provide access to cashier services 1308 in the main data center Data Center 0 160. According to an embodiment, the cashier services 1308 are located in and offered only from the main data center, Data Center 0 160. Alternatively, as discussed below, alternative embodiments may distribute cashier services 1308 capabilities to different data centers.

According to embodiments, the game services of the main data center Data Center 0 160 may support a client for the same game administered by a different data center. For example, Data Center 0 160 provides Game 1 services 1304 that may be used to support a Game 1 client 1310 in the remotely located in Data Center 1 160a. This Game 1 client 1310 may provide game play functionality and interaction for Game 1, such as poker, for example, or other games where the system may take advantage of shared liquidity and prizes. According to other embodiments, the system may also support the Game 1 client 1310 providing game play functionality and interaction for other games as well. (e.g., casino games, casino slots, etc.). Thus when a user logs in to the system 1300 using a consumer device 120 located in the same geographic area as Data Center 1 160a, that local data center may provide gameplay for Game 1 to the user, supported by the Game 1 client 1310. By way of example, the local data center 160a may also offer gameplay to a user for a second game, Game 2, by way of a Game 2 web application 1312, supported by Game 2 services 1314. According to embodiments, this application 1312 can provide access to a second game for a user via a web interface either used by a player in an app or a web browser on the consumer device, and can support a number of games, including those discussed above.

When a user connects to the local data center 160a, the user may access the platform services 1306a via a portal web application 1316. Although implementations can vary, according to embodiments, the portal web application 1316 is in communication with a platform point-of-service or POS 1318, which is in communication with a platform gateway 1320 that provides access for the user to the platform services 1306a and their functionality. The local data center 160a can also provide geolocation service 1322 to allow detection of the location of the consumer device 120 used by the player or user of the system. According to embodiments, this geolocation service 1322 helps determine that the user and the consumer device 120 are in a geographical location that is either the same as Data Center 1 160a, or which can be serviced by Data Center 1 160a, consistent with applicable laws and regulations.

According to embodiments, the local data center 160a may also provide a sports web application 1324 that enables participation in various activities related to sports where permitted. For example, the sports web application 1324 may permit access to betting on sporting events where permissible via a betting POS 1326. This betting POS 1326 may be connected to a number of services and components to facilitate betting using the system 1300, where permitted by applicable laws and regulations. For example, the betting POS 1326 may include a wager database 1332 that is local to the data center 160a and tracks wagers made by the user connected to the data center. The betting POS may also provide access to the user's digital wallet via a wallet gateway 1328 and wallet service 1330 that is in communication with a local database 142b within the local data center 160a, and which includes saved (e.g., replicated) wallet information for the user. Additionally, to allow a user to place bets, the betting POS 1326 may provide communications with an external bet placement service 1340 that is within the central data center 160b.

The bet placement service 1340 within the central data center 160b may be accessed by way of a betting POS 1326 and may allow a user to place bets in real-time on real-world sporting events. The bets placed by the bet placement service 1340 are stored in the bet database 1342, which is updated to reflect the current betting status of all users of the system 1300. The bet database 1342 is used to manage payouts from bets via the payout transfer service 1344, which may provide payout via a funds connector 1346, which may permit funds to be placed in a users account, ledger, or digital wallet. When a payout is to be made, the central data center also provides notices of such payouts to users by way of the Payout Notification Service 1348. This may notify the user who will receive or has received the payout by way of one of the communication techniques discussed above in connection with the communication gateways 650 and communication interfaces 660. The bet database 1342 is also connected to a settlement service that is used to access the trading database and settle outstanding payment obligations via the trading database 1352. A bet administrator interface 1354 is provided to allow an administrator to access information about the bets and betting system, including access to the trading database. A bet content management service 1356 is also provided to permit management of the betting content provided to users, such as through the sports web interface 1324. This content management service 1356 may be governed by a set of pre-programmed rules or may be customized and adjusted by an administrator using the bet administrator interface.

The system 1300 of FIG. 13 can be used to improve network reliability and mitigate risk elements associated with operation of such a system and its components. This may include, for example, mitigating risks associated with internet service provider (ISP) routing issues in the main data center or other data centers. For example, the main data center may be configured with a backup ISP provider to mitigate any ISP routing issues. Additionally, the system 1300 may be configured to detect issues in real-time and automatically switch to the backup ISP provider. Additionally, the system 1300 of FIG. 13 may provide mitigation for malicious attacks such as distributed denial-of-service (DDoS) attacks on the data centers. For example, any data center attached using a DDoS attack can have its traffic re-routed to another data center. For example, if the main data center 160, Data Center 0 was the target of a DDoS attack, traffic could instead be re-routed to Data Center 1 160a or the central data center 160b, or any other number of data centers in the system 1300. Additionally, in a DDoS attack, traffic could also be re-routed to a scrubbing center that provides real-time DDoS protection, which may be located in one or more of the data centers in the system 1300, or may be otherwise connected to the system 1300. Protection from a DDoS attack may be provided using program as a Honeypot that is intentionally made vulnerable to lure and detect attacks, such as on the front end of the system 1300 or on the front end of one or more of the data centers 160 of the system 1300. Additionally, the system 1300 may further protect against DDoS attacks by using a program that proactively monitors and analyzes network packet flows and derives proactive flow rules to migrate packets appropriately and to limit communication rates to mitigate such attacks or other attacks such as brute force attacks.

Figure 14:
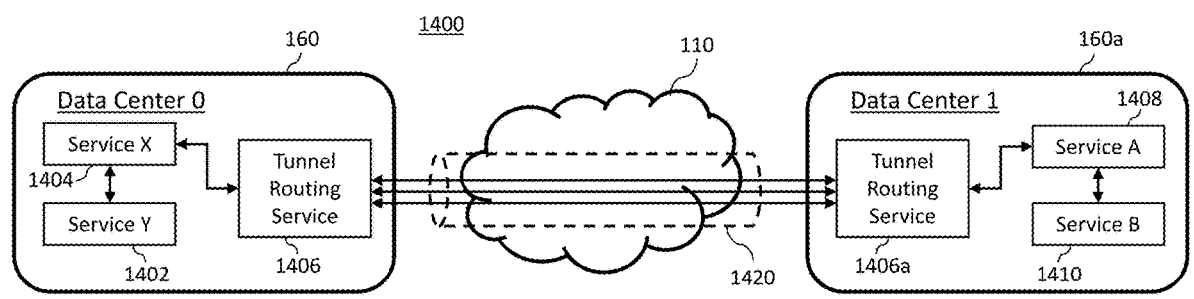
FIG. 14 shows a system for facilitating a secure communication connection according to embodiments.

FIG. 14 shows a system 1400 for facilitating a secure communication connection according to embodiments. All of the connections made by the various systems described herein over one or more networks may be made using a system such as the system 1400 shown in FIG. 14. In that system 1400, two data centers 160, 160a wish to establish a secure communications tunnel over the network 110, which may comprise a local network, the Internet, or some combination of networks. This may include, for example, a virtual private network (VPN) or other secure tunneling network, such as IP in IP, SIT/IPv6, Generic Routing Encapsulation (GRE), OpenVPN, SSTP, IPSec, L2TP, VXLAN, WireGuard, Transport Layer Security (TLS), or other similar protocol.

In the system 1400 of FIG. 14, the first data center may use one or more services (e.g., Service X or Service Y) 1402, 1404 that need to communicate over the network 110 with another data center 160a. According to embodiments, these services 1402, 1404 use a tunnel routing service 1406 to encrypt and securely communicate with the other data center 160a by establishing a secure tunnel 1420 between tunnel routing services 1406, 1406a of the first and second data centers 160, 160a, respectively. The communications when safely received by the on the other end of the secure tunnel 1420 are decrypted and may be used in connection with services on the receiving end (e.g., Service A and Service B) 1408, 1410. The communications using the secure tunnel

1420 are two-way and may be transmitted in either direction. Using this system 1400, communications used by the various systems described here may be secure and protect the valuable information and/or items of value transmitted over the network 110, even if all or part of that network is public.

Figure 15:
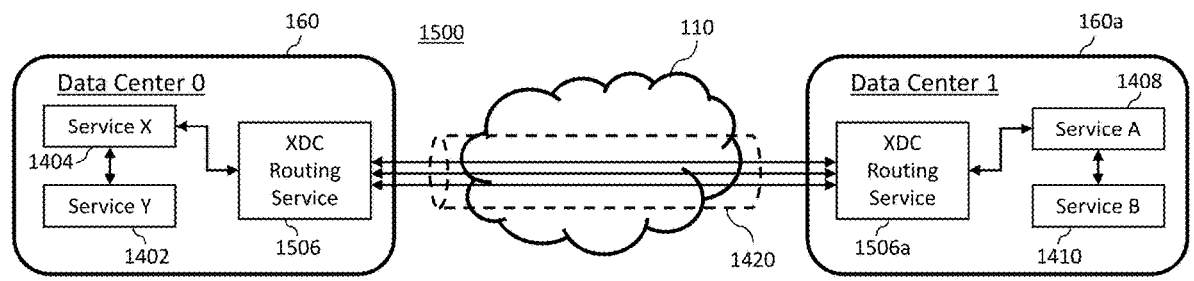
FIG. 15 shows a system for facilitating a secure communication connection using XDC routing according to embodiments.

FIG. 15 shows a system 1500 for facilitating a secure communication connection using XDC routing according to embodiments. The system 1500 of FIG. 15 is a version of the system 1400 of FIG. 14, which uses the XDC protocol, which is a secure protocol for use via a hybrid blockchain platform for added security and verifiability. Such communications allow peer-to-peer contracts using XDC tokens. As such, the system of FIG. 15 also establishes a secure tunnel 1420, and information then may be communicated between the services 1402, 1404 of one data center 160 and the services 1408, 1410 of another data center 160*a*. The communications over the secure tunnel 1420 are accomplished by XDC routing services 1506, 1506*a* that are capable of encrypting or decrypting communications and sending or receiving those communications over the secure tunnel 1420. These communications are secure and have the added benefits of the hybrid blockchain technology that allows the peer-to-peer contracts sent over the network.

The systems described herein may make use of the secure communication systems 1400, 1500 shown in FIGS. 14 and 15. For example, these communications techniques may be applied to the various systems 100, 700, 800, 900, 1300, 1700 described herein. These systems may also be configured to prevent or mitigate issues associated with the secure communications discussed in connection with FIGS. 14 and 15. For example, according to embodiments, XDC routing can be used instead of IPSec tunnels to prevent the IPSec tunnel between one or more data centers from going down. In such situations, the calls and communications between data centers happen over the Internet using SSL, and are therefore more reliable. Additionally, using XDC routing can avoid other problems, such as those associated with the ETL process (i.e., the process of extract, transform, and load) associated with database synchronization over IPSec tunnels. For example, by using the data flows 150 described in connection with embodiments, those data flows (e.g., Apache Kafka streams or other data flows) to synchronize databases in real-time via the sync processes, even if ETL processes are delayed. Additionally, if necessary, ETL processes can be re-run to restore consistency.

Figure 16:
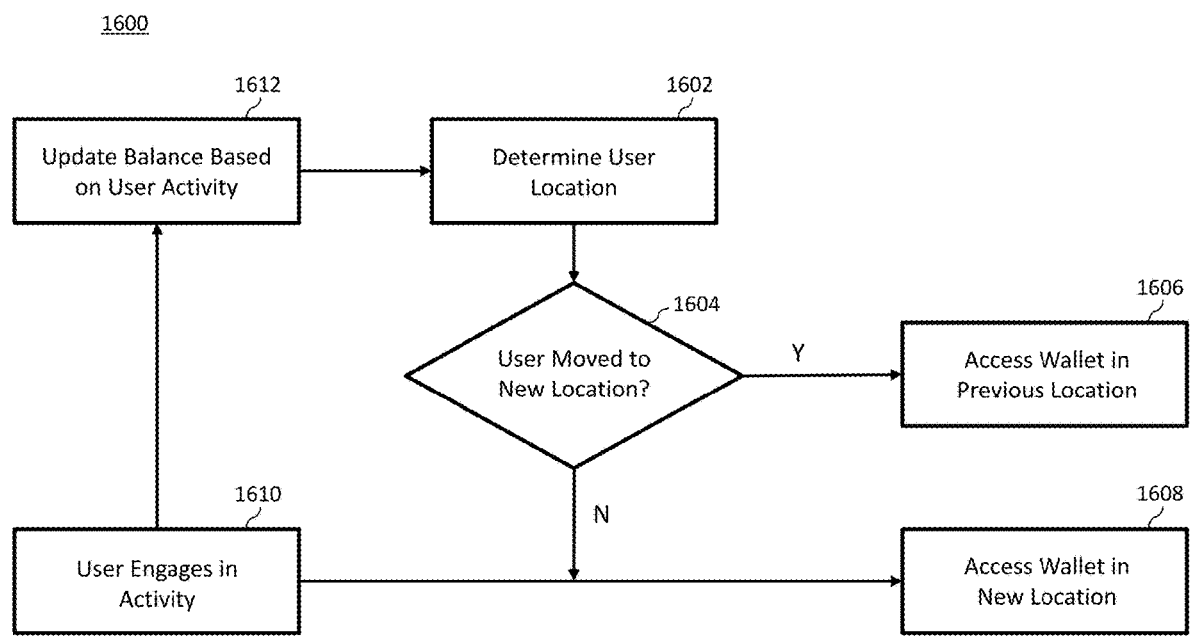
FIG. 16 shows a process and various steps thereof for use with a single wallet in a system having multiple data centers or databases according to embodiments.

FIG. 16 shows a process 1600 and various steps thereof f for use with a single wallet in a system having multiple data centers or databases according to embodiments. The process 1600 shown in FIG. 16 takes place when a user is logged in to the gaming system 100. At step 1602, the user's geographical location is determined by elements of the system based on the geographical location of the user's user device 120. Any number of location techniques, including global positioning system (GPS) application or other geolocation applications, or other location-determining or location-tracking techniques (e.g., WiFi positioning system (WPS), RFID devices, Bluetooth beacons), or other location-based services, may be used to determine the location of the user. Step 1602 may be performed upon a user logging in to the gaming system. According to embodiments, in step 1602, the user's location may be continuously or periodically monitored, as shown in FIG. 16, while the user is logged in to the system 100. The system 100 may store information reflecting the most recent geographic location in which the user has accessed the system 100.

According to embodiments, a geographic location may be a state, municipality, jurisdiction, or other geographic location in which gaming activity is subject to a particular set of laws or regulations. Thus, two different cities within the same state may be understood to be within the same geographic location for purposes of embodiments, while two different cities in different states may be understood to be in different geographic locations.

At step 1604, the user's current geographic location is compared to the most recent geographic location in which the user previously accessed the system 100. If it is determined that the user has not traveled to a new location, the process proceeds to step 1610. If it is determined that the user has traveled to a new location in which access to the system is permitted, the process proceeds to step 1606, where the user is permitted access to his or her wallet account from the previously determined location (e.g., to withdraw funds). According to embodiments, upon determining that the user has traveled to a new location, the user may be logged out of the system and required to log in to the system again before engaging in further activity (e.g., in instances where logging in again is required for compliance or other reasons).

At step 1606, the user's account balance is withdrawn from the user's account at the previous location. For example, funds may be withdrawn from a wallet associated with the user and residing on a database associated with the previous location. At step 1608, the user's account balance is deposited into the user's account at the current location. For example, funds may be deposited into a wallet associated with the user and residing on a database associated with the current location. Steps 1606 and 1608 may be performed to ensure compliance with gaming laws that require a user's funds, or a record thereof, to reside in the same jurisdiction in which the user participates in gaming activities. After either or both of steps 1606 and 1608, the user's wallet information may be synchronized between the previous and new location.

At step 1610, the user engages in activity via the system 100. This activity may include playing or participating in a game, placing a bet, or similar gaming activity, or may include conducting a financial transaction, such as transferring funds from an external bank account to a wallet associated with the system, or transferring funds to an external bank account from a wallet associated with the system.

At step 1612, upon detecting the user's activity in step 1610, the balance in the user's wallet is updated based on the user's activity. For example, the user may be charged a fee to participate in a certain game in which case the balance in the user's wallet will decrease upon the user participating in the game. If the user wins the game or achieves a particular objective within the game, the user may receive a cash reward in which case the balance in the user's wallet will increase. In another example, the balance in the user's wallet may be increased upon the user making a deposit from an external bank account, and the balance in the user's wallet may be decreased upon the user making a withdrawal to an external bank account.

Figure 17:
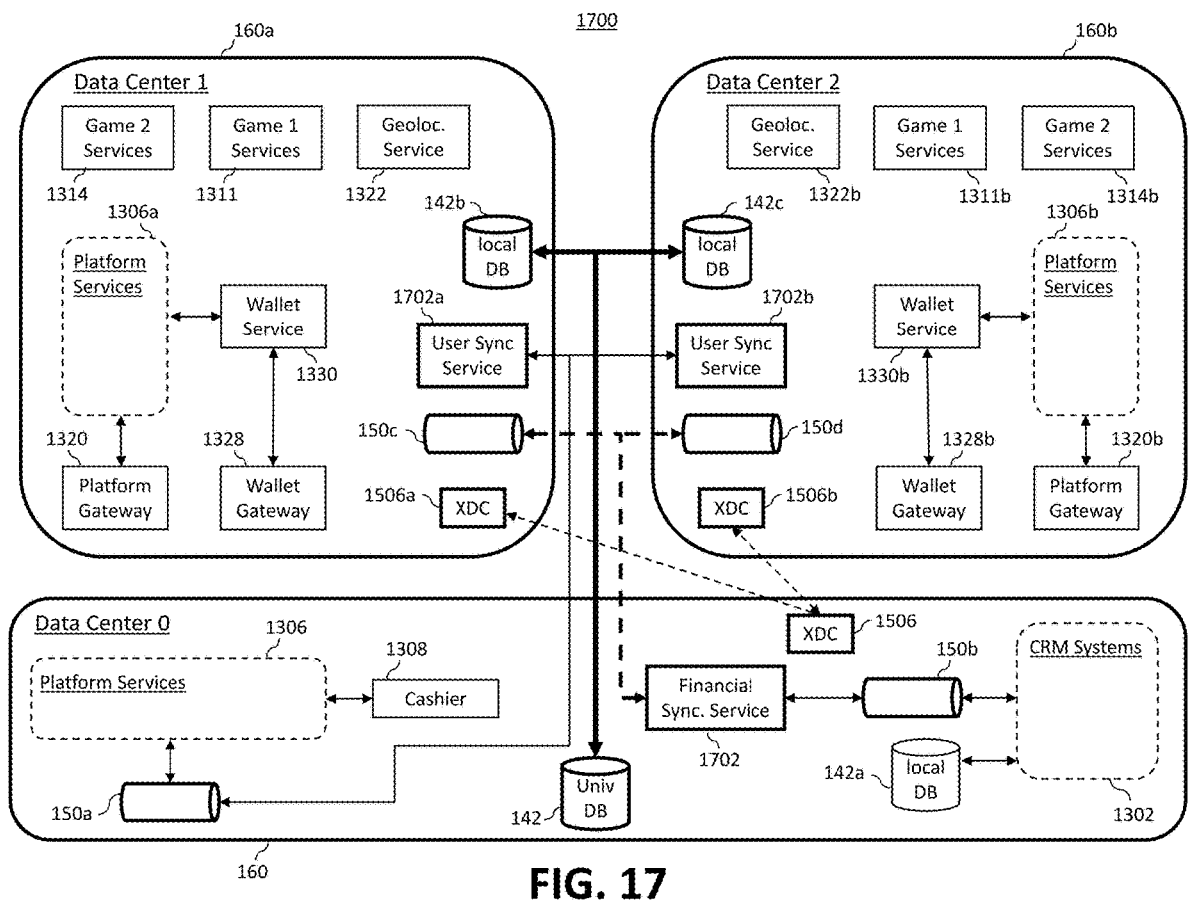
FIG. 17 shows a detailed overview of a system and various components thereof to allow a consumer device to communicate with multiple data centers according to embodiments.

FIG. 17 shows a detailed overview of a system 1700 and various components thereof to allow a consumer device to communicate with multiple data centers according to embodiments. The system 1700 of FIG. 17 is similar to the system 1300 of FIG. 13 and uses many of the same components. Any components from the system 1300 of FIG. 13 not shown in the system 1700 of FIG. 17 should be considered part of that system 1700. In addition to those components already discussed above in connection with FIG. 13, the system 1700 of FIG. 17 includes some additional detail to show how, according to embodiments, multiple data centers may communicate. FIG. 17 shows three data centers 160, 160a, 160b in communication with one another. Those data centers include the same or similar components shown in and discussed in connection with the system 1300 of FIG. 13 plus some additional components shown in FIG. 17. For the sake of simplicity, not every component or communication pathway between components is shown in FIG. 17. Although FIG. 17 shows three data centers, it can include a number of additional data centers that are the same as or similar to those shown in FIG. 17.

Each data center 160, 160a, 160b of system 1700 of FIG. 17, for example, includes tunneling services, such as an XDC routing service 1506, 1506a, 1506b. Those tunneling services are in communication with each other, as shown in FIG. 17 to communicate in the manner described in connection with FIGS. 14 and 15. Additionally, as shown in FIG. 17, the system 1700 includes a dataflow in communication with the platform services of the main data center 160, Data Center 0, which in turn is in communication with user synchronization services 1702a, 1702b in each of the other data centers 160a, 160b, Data Center 1 and Data Center 2. This allows the main data center 160 to synchronize services, including those related to the accounts and wallets of users associated with those data centers and to ensure that the wallet and account of each user is synchronized across all data centers. Similarly, the universal database 142 of the main data center 160 is in communication with the local databases 142b, 142c of each of the other data centers 160a, 160b. And in addition, the CRM systems of the main data center 160 communicate through a data flow 150b to a financial synchronization service 1702, which is in communication with data flows in each of the other data centers 150c, 150d to synchronize financial services among all of the data centers 160, 160a, 160b. As described above, although services of the system 1700 are run out of the main data center 160, those services may be replicated across and distributed via the other data centers 160a, 160b of the system 1700 so that communications and services can easily be re-routed to or through other data centers, as needed, such as needed if communication with a data center is lost, or if a data center is attacked (e.g., via a DDoS attack).

For example, if the login service of the platform services 1306 of the main database 160 becomes unavailable for some reason, that information can be communicated to the platform gateway 1320, 1320b of the local data centers, where a setting can be recorded indicating that login activity needs to be routed to and/or handled by the local data center specific to the location of the user, rather than by the main data center 160. When that setting is changed back, then login activity can again be routed to the platform services 1306 of the main data center 160.

If the CRM systems 1302 of the main data center 160 become unreachable or unresponsive, or stop working for some reason, such as because of issues in the main data center's local database 142a, a number of mitigation techniques can be used. For example, the data flows in the various data centers will ensure that information is tracked locally and will be synchronized throughout the system once normal operation happens. This will allow the system to recover without any impact on the ability to place bets, or the tracking of financial, loyalty information, or bonuses.

Because of the distributed nature of the systems described herein, a number of components can continue to function and services can be offered at the local level, even if they cannot be offered system wide. For example, according to an embodiment where cashier services 1308 may be distributed, if cashier services 1308 in the main data center 160 become unavailable, the cashier information can be tracked at the local level in the other data centers 160a, 160b If the main data center 160 is impacted because of a disaster, such as a natural disaster or a disaster induced by malicious actors, or because of other circumstances, such as a hardware failure, in a way that might otherwise impact user registrations, financial transactions (e.g., deposits or payments), or promotions, the systems described herein include a number of advantageous mitigation capabilities. For example, if the database in the main data center 160 is impacted, the system may go into a disaster recovery mode, which will take advantage of the synchronization of data and services among the various databases, as well as synchronization within the main datacenter 160 itself (e.g., between the universal database 142 and the local database 142a). According to an embodiment, the universal database 142 in the main datacenter may maintain a slave database (which is different and separate from the local databases) in a "data guard" protection mode or configuration that is intended to preserve all data in the universal database. In this embodiment, when the system goes into disaster recovery mode, the slave database in the data guard configuration may be used to address the problems of the universal database 142 by, for example, correcting any data errors in the database, replicating its data on the universal database, and/or temporarily replacing the universal database 142 in operation. Alternatively, in a disaster recover mode, the local database 142a in the main data center, or one of the local databases 142b, 142c in the other data centers 160a, 160b can take over as the active universal database while any issues in the original universal database 142 are addressed. A number of suitable programs may be used to synchronize data and address any issues in the data centers. For example, Oracle's Active Data Guard may be used to synchronize the data among the various datacenters and databases of the system. In the event another database (e.g., local database 142a, 142b, 142c) takes over as the active universal database, the universal database and any impacted services can be shutdown and restarted as needed. Once all services are running as normal, the universal database 142 in the main data center 160 can again resume its normal operations.

As discussed above, the machine learning service 412 may detect unusual and/or potentially detrimental player activity and, upon detecting such activity, initiate action to encourage the player to engage in more responsible gameplay, or prevent the player from engaging in further potentially detrimental activity. In accordance with embodiments of the invention, a system may provide education (via documents or other materials informing a player of potential risks and tools available to reduce such risks), intervention (prompting player interaction with the system, providing opportunities to implement optional tools to reduce risk), and prevention (automatically preventing a player from engaging in potentially detrimental activity).

Figure 18:
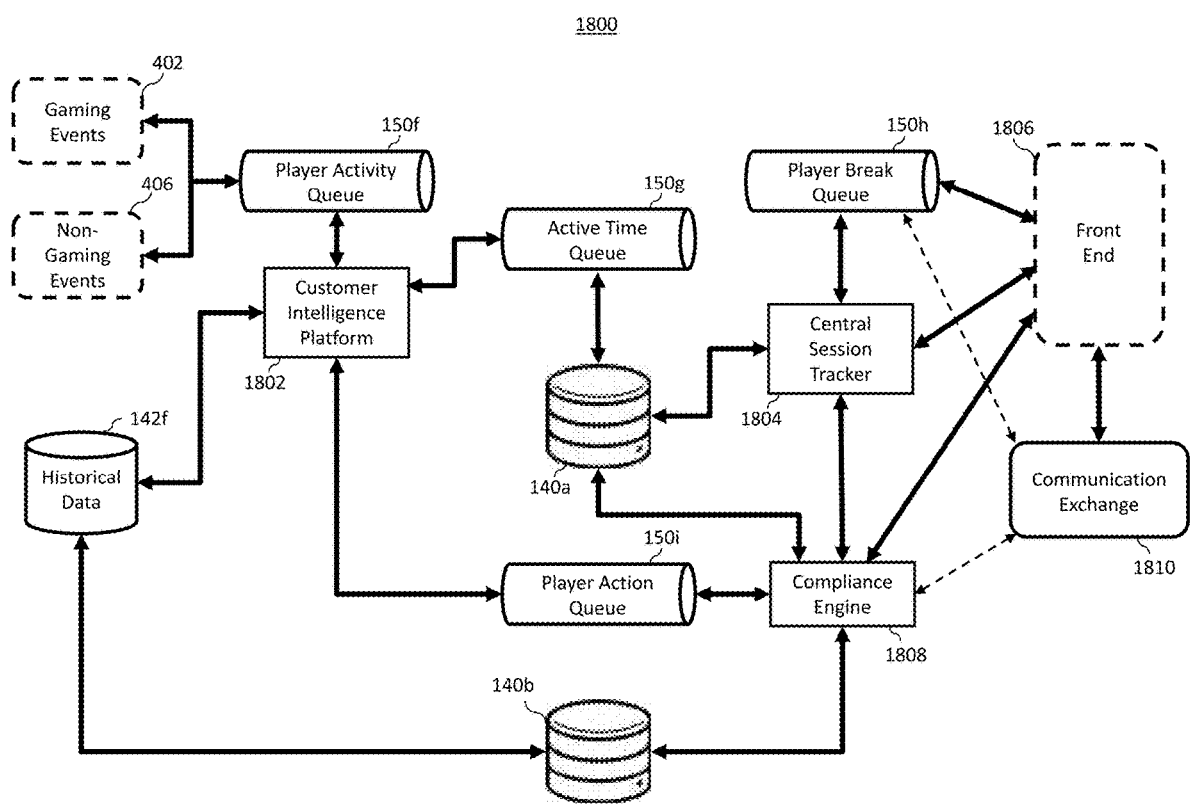
FIG. 18 shows system components configured to monitor gameplay, provide warnings, promote responsible gameplay, and prevent detrimental gaming activity according to embodiments.

According to an embodiment, the machine learning service 412 may utilize information, including information from data streams 150, 150a, 150b, 150c and events associated with non-gaming systems 406 to detect patterns, and may consider several factors in determining a user's level of risk. Examples of such factors include: if a player tends to spend more when losing; if a player spends/loses more at certain times; if a player deposits more when losing; if a player deposits more when winning, the specific games a player plays, the amounts of a player's bets, the outcomes of games, a player's entry into special events such as tournaments. The system may also check a user's credit to determine what the user is reasonably able to afford. A user's level of risk may be based on historical data, real-time data, and, preferably, a combination thereof. A user may be tracked across multiple jurisdictions as the user connects and establishes copies of or pointers to the user's account in different jurisdictions. Alternatively, additional system components, such as those described below may be used to monitor gameplay, provide warnings, promote responsible gameplay, and prevent detrimental gaming activity FIG. 18 shows system components 1800 configured to monitor gameplay, provide warnings, promote responsible gameplay, and prevent detrimental gaming activity according to embodiments. These components can be used in connection with the various embodiments of the system 100 shown and described herein.

According to embodiments, a player's activity is monitored and a user can be prompted or required to change activity through a sophisticated set of data flows, databases, data stores, and analytics engines. For example, gaming events and a player's activities in connection with the various games and other applications 402 can be monitored by way of a player activity queue 150f For example, as described above, gaming events 402 can include all events from the gaming apps of the system 100, including, for example, games such as sports betting, casino games (e.g., roulette spines, etc.), Bingo, poker, or other games. The information provided to the player activity queue 150f from the gaming events 402 can be provided in the form of activity stream information relating to the one or more gaming events 402 and one or more users of the system playing or accessing those games.

Additionally, a number of non-gaming events or systems 406 may also be monitored by way of the player activity queue 150f. The non-gaming events or systems 406 monitored can include any events or systems that the system operators or administrators have an interest in monitoring, or for which rules have been set. For example, the non-gaming events or systems 406 can include login events, access events, and financial transactions, such as deposits and/or withdrawals from the cashier. Non-gaming events can be streamed from a number of different clients that can be in communication with the system 100, such as Web clients, native applications, Windows applications, Mac clients or applications, iOS applications, Android applications, or any other suitable clients. The information provided to the player activity queue 150f from the non-gaming events or systems 406 can be provided in the form of activity stream information relating to the one or more non-gaming events or systems 406 and one or more users of the system using or accessing those non-gaming systems.

The activity stream flows from the gaming events 402 and the non-gaming events and systems 406 are provided to the player activity queue 150f. This player activity queue, like the other data flows described above can be implemented using any suitable data pipeline, such as Apache Kafka streams, Apache ActiveMQ streams, TIBCO streams, or other similar data pipelines. The player activity queue 150f outputs a player event data stream, which can include events for all of the players using the system 100, which is ingested by the customer intelligence platform 1802.

The customer intelligence platform (CIP) 1802 is a player analytics engine that is capable of continuously ingesting the player event feed for all players. The CIP 1802 is also capable of ingesting historical data from the historical data database or data warehouse 142f. The CIP 1802 runs analytical models for player protection based on the real-time data received in the player event feed from the player activity queue 150f and the historical data from the historical data database 142f In this way, the CIP 1802 is capable of detecting player events that are either pre-programmed or determined in real time to protect players and users of the system 100 based on its analysis and data processing. According to embodiments, the CIP 1802 can be an Apache analytics engine, such as an Apache Spark DataFrame, or other suitable analytics engine. The analytics engine 1802 can be configured to ingest and process large amounts of data relating to player gaming and betting behavior, for example, received from the player activity queue 150f, as well as from the historical data database 142f. The CIP 1802 may also store data in a historical data warehouse, such as the database 142f, or in multiple similar databases. According to an embodiment, the historical data database 142f stores information that is older than some pre-determined amount of time (e.g., 24 hours). The historical data database 142f can be any number of suitable databases, such as a Teradata data warehouse, or the like. The CIP may also be configured to back-up its analytics data to address any system failures that may happen. For example, according to an embodiment, the CIP 1802 may use a Hadoop Distributed File System (HDFS) from Apache to provide adequate backup and recovery capabilities (e.g., in the event of a failover, etc.).

The CIP analytics engine 1802 may provide data concerning players it is monitoring to an active time queue data flow 150g. For example, the CIP 1802 may calculate a player activity time (e.g., player time using the gaming events 402 and/or the non-gaming events or systems 406) based on current activity (e.g., from the player activity queue 150f) and historical data (e.g., from the historical data database 142f). In particular, the CIP 1802 may calculate the player activity time based on the player's historical playing pattern and may provide notifications of any anomalies or any breach of any pre-set or pre-determined thresholds (e.g., exceeding a maximum time or exceeding a player's own usual or maximum activity time by a pre-determined percentage or amount). The active time queue 150g receives data selected for it by the OP 1802 regarding players who may need to be further monitored or encouraged to change their playing behavior. The active time queue 150g provides active time events to the a central data store 140a of the system.

The system central data store 140a is a data store that can be local or distributed, and is capable of quickly ingesting and analyzing large amounts of event data, and providing relevant information to other system components, such as in response to queries. For example, according to an embodiment, the central data store 140a may be an Apache Druid distributed data store, or other suitable data store capable of performing similar tasks. The central data store 140a may monitor a number of different use cases involving each player, such as winnings and losses, active and passive usage or other use cases that are helpful in encouraging responsible gameplay and preventing detrimental gaming activities. The central data store 140a can continuously ingest and roll-up data provided to it, such as the time spent event data stream provided from the active time queue 150g. For example, in embodiments where the central data store 140a is an Apache Druid distributed data store, it can be configured to ingest data in the form of a raw Kafka data stream (e.g., from the active time queue 150g) and store the data from that data stream in data segments within the Druid data store, thereby reducing the data's raw footprint. Additionally, according to embodiments, storing data segments in the central data store 140*a* can also help with query optimization and archival data storage.

The central data store 140*a* is also configured to respond to queries from and provide information to the central session tracker 1804. The central session tracker 1804 can, for example, provide safety checks on game or other activity by a user or player through the system's front end 1806. For example, the central session tracker (CST) 1804 can perform safety checks against existing rules and limits when a player performs new gaming activity, such as checking sports before a player places a bet, checking casino games before a player performs a spin, or checking bingo before a player purchases a new ticket. The central session tracker 1804 can also act as a service that performs as a session proxy for gaming clients or server queries. The central session tracker 1804 can also be configured to provide real-time session stats to any component shown in FIG. 18, including a central data flow (e.g., a Kafka data flow), such as the player break queue 150*h*.

Depending on a player's activity, the CST 1804 may calculate a risk level for the player. This information about breaks may be provided, for example to the player break queue data flow 150*h*. The player break queue 150*h* can act as a push bridge that each gaming service, application, or client active in the system's front end 1806 is listening to. For example, each of the games described in connection with the gaming events 402 may be active in the front end and may be listening for relevant break information from the player break queue 150*h*. This may include break notifications to any game active in the front end 1806 that a player may need to take or be encouraged to take from gaming and/or betting. The player break events that the CST 1806 provides to the player break queue 150*h* may be informed by certain pre-determined information, such as player break configurations, pre-determined thresholds, or the like. The player break queue 150*h* can help encourage or require a player to take breaks, depending on the level of risk the player demonstrates, as detected by the system 100. For example, based on session activity time, relevant time management actions may be provided by the player break queue 150*h* to trigger action on the front end 1806, such as prompting the user for a session break, providing more forceful intervention if the user's grace period has been exceeded or breached, and/or providing an appropriate message to the player through the front end 1806. For example, the player break queue may provide a user the option to voluntarily take a break based on that user's activity and detected level of risk. Alternatively, if the user's level of risk is determined to be higher, the player break queue 150*h* may force a user to take a break, such as by preventing certain gameplay or certain application use. By way of example, the player may be blocked from betting on sporting events, blocked from playing games like bingo, casino games, or bingo. Additionally, player activity may be stopped while a player is using an application or playing a game, such as by blocking a casino game launch or blocking a spin in such a game, or by blocking a launch or draw in bingo or poker. Additionally, the player break queue 150*h* may also block or otherwise limit transactions with the cashier 1308, such as preventing a player from using, betting, or depositing more money. The CST 1806 may be configured to monitor the breaks put in place by the player break queue 150*h*, such as by checking the status of various games and applications and clients active in the front end 1806 and/or the cashier 1308.

The player action queue 150*i* is the system's central player action queue. As with the other data flows, the player action queue 150*i* may be a Kafka or other suitable data flow. As described above, the CIP 1802 calculates a player risk level. This can occur based, at least in part, on the player's non-activity stream, as well as historical activities, such as cashier and wallet interaction patters. When the CIP 1802 calculates a player risk level exceeding a pre-determined threshold or a player risk level that is viewed as breaching the acceptable risk level, the player action queue 150*i* is notified. This can be based, for example, on the level of player engagement calculated by the OP 1802.

A compliance engine 1808 is also in communication with the central session tracker 1804, the central data store 140*a*, the system front end 1806, and the player action queue 150*i*. The compliance engine 1808 consumes player action events from the player action queue 150*i* in real time. Based on the information the compliance engine 1808 receives, it executes the appropriate workflow for player protection. In other words, the compliance engine 1808 implements the appropriate actions to protect the player, based on the player's calculated risk level and based on real-time actions of the player. For example, the compliance engine 1808 may engage in management of funds, controlling or limiting the source(s) of funds available to a particular player. The compliance engine 1808 may also monitor markers of harm for each player, and take appropriate action based on those markers. The compliance engine 1808 may also perform affordability checks with a player, based on the player's actions. The compliance engine 1808 may also implement other actions, as determined appropriate by the system and its rules, as discussed further below.

As shown in FIG. 18, the compliance engine 1808 is in direct communication with the system front end 1806. By way of this connection, the compliance engine 1808 may monitor actions of the user via the applications, games, clients, etc., of the front end 1806 and may intercept those activities at the appropriate time. For example, according to an embodiment, checks by the compliance engine 1808 may be triggered during a player's login. This may consist of requiring a user to perform certain tasks before the player is allowed to complete his or her login. For example, a player may be required to complete mandatory tasks or "journeys" before login can be completed. Depending on a player's risk level, the interceptor activities of the compliance engine 1808 may be either mandatory or voluntary. For example, if the player actions detected have a grace period, the interceptor activities may take the form of a secondary notification via the communication exchange 1810 to the front end 1806. Examples of such secondary notifications include things like a pop-up window asking a player to complete a questionnaire, a real-time messaging service (RTMS) notification for educating a player to act, a real-time banner indicating pending actions, or the like. A number of different actions can be sent to the user in the front end 1806 by way of the communication exchange 1810 based on the user's preferences, such as via RTMS, user inbox, push notifications, emails, SMS messages, or the like.

The player's activity state from the compliance engine 1808 is stored in the system's overall data store 140*b*, which is also synched with the historical data database 142*f* periodically (e.g., at the end of each day, multiple times per day, or at other intervals). According to an embodiment, the system's overall data store 140*b* can be an Oracle database or other suitable database for storing the required data and synchronizing data with the system components, as shown in FIG. 18.

The scenarios described below provide examples of ways in which a system 100, including the components shown in FIG. 18, may encourage responsible gameplay and/or prevent detrimental activity in accordance with embodiments of the invention. It is to be understood that a system may combine aspects of the various exemplary scenarios described below, or omit aspects of those scenarios, without departing from the scope of the invention. The risk levels described below are also exemplary. It is to be understood that the system described herein is not limited to a specific number of risk levels, and that the specific process steps that correspond to each risk level may vary without departing from the scope of the invention.

In a first scenario, a user is determined to be a low risk user. In such a scenario, the system may provide the user with notifications to inform the user of available gambling control tools. Notifications may be sent to the user in various forms including email, text or SMS messages, or on-site or in-app messages, which may be delivered to an user's inbox on a website or in a mobile application associated with the system. Such notifications may be sent to a user on a regular basis, and may ensure that the user is informed and aware of options to encourage safe and responsible gameplay, without intrusion upon, or restriction of, the user's activity.

Figure 19:
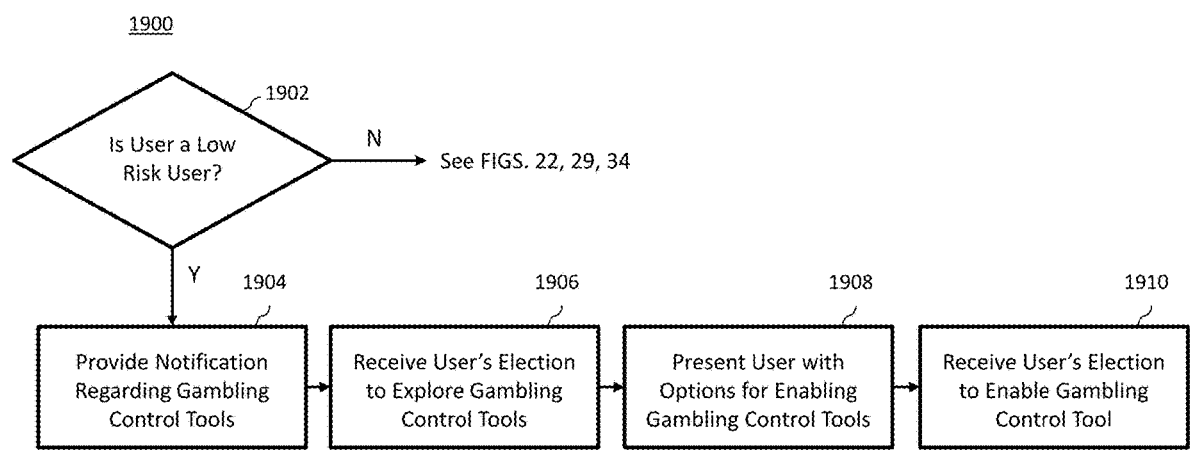
FIG. 19 shows a process for raising awareness of and providing users access to gambling control tools.
Figure 20A:
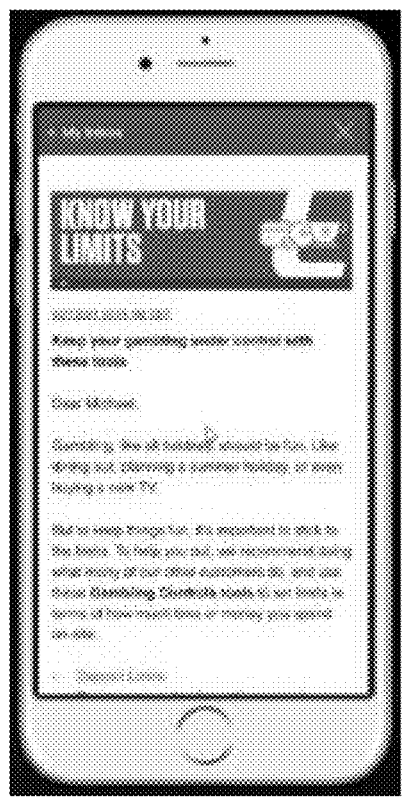
FIGS. 20A and 20B show a diagram of an exemplary message sent to a user's inbox in a mobile telephone application.
Figure 20B:
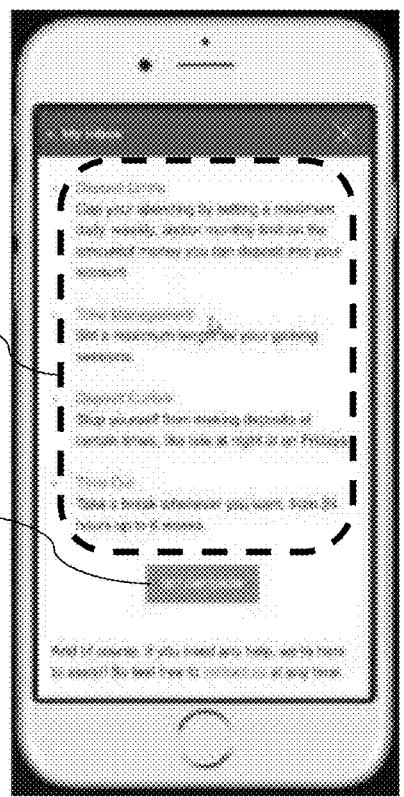

FIG. 19 shows an exemplary process 1900, in accordance with a scenario for raising awareness of gambling control tools, and ensuring that users have access to such tools. In step 1902, the CIP 1802 determines that a user is a low risk user. In step 1904, the user receives a notification from the system via the front end 1806 regarding gambling control tools. FIGS. 20A and 20B show an exemplary message 2002 sent to a user's inbox in a mobile application associated with the system. The message may include information 2004 regarding gambling control tools, may encourage the user to use such tools, and may include an interface, or a link 2006 to an interface, that allows the user to access and implement such tools.

Examples of various types of gambling control tools include deposit limits, which allow a user to cap spending by setting a maximum amount of money that the user is allowed to deposit into the user's account during a specified time period, such as a day, a week, or a month. Time management tools allow a user to limit the amount of time the user is allowed to spend in a gaming sessions during a specified time period. Deposit curfew tools prevent a user from making deposits at certain times, such as late at night, or on specific days of the week. Time out tools allow a user to take a break from certain activities for a specified time period. For example, a user may enable a time out tool that prevents the user from engaging in gaming activity for 24 hours, or up to 6 weeks or more.

Figure 21A:
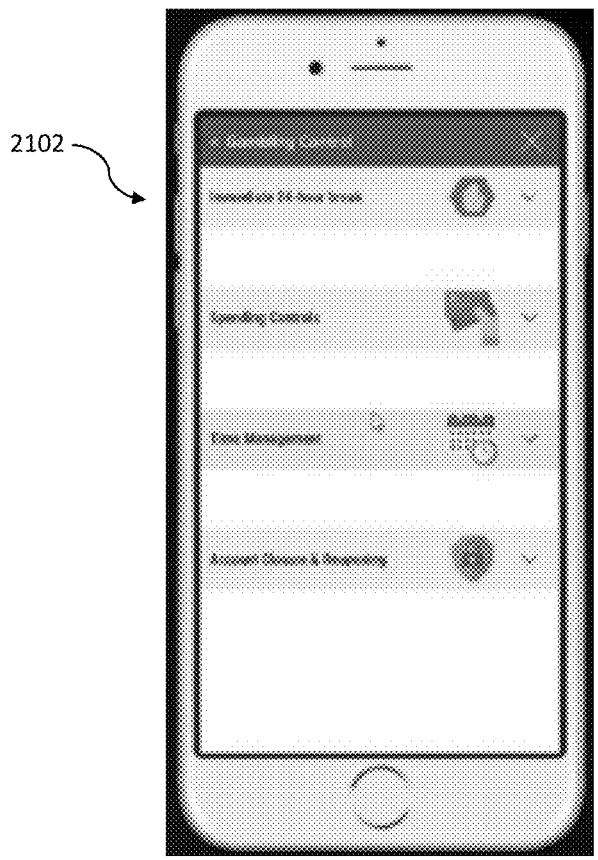
FIG. 21A shows a diagram of an exemplary interface for enabling various categories of gambling control tools.

In step 1906 the user elects to explore available gambling control tools. The user may make such an election, for example, by following a link 2006 in the message 2002 received in the user's inbox. In step 1908 the user is presented with options for enabling such gambling control tools. FIG. 21A shows an exemplary interface 2102 for enabling various categories of gambling control tools, including breaks, spending controls, time management, and account closure & reopening. Breaks may last for any specified duration and may include an immediate break, such as an immediate 24-hour break, or may include a break that begins at a specified amount of time after it is selected. For example, a user may choose to take a 24-hour break that begins 30 minutes after that choice is entered. Spending limits may include deposit limits and deposit curfews as discussed above, and maximum stake limits, which place a cap on the amount a user is allowed to wager on a particular game, hand, slot spin, or event.

Figures 21B, 21C:
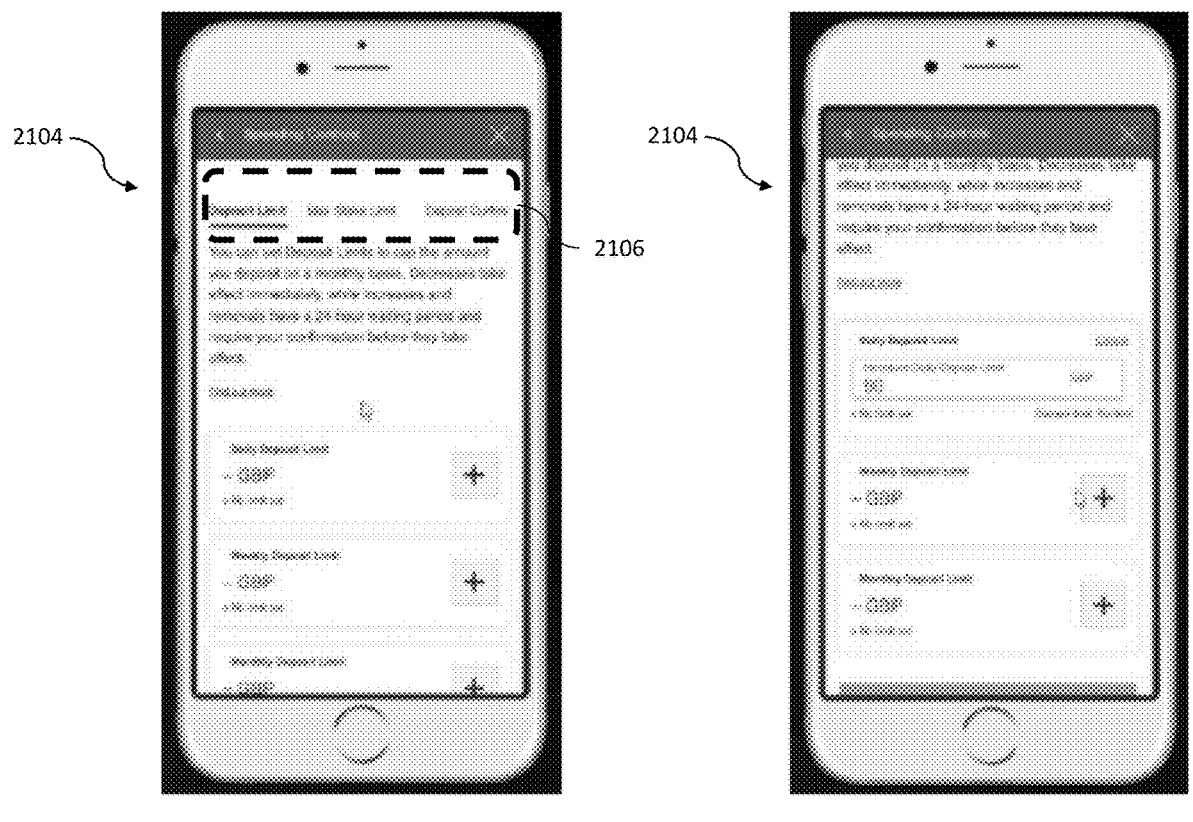
FIGS. 21B and 21C show a diagram of an exemplary interface 2102 for enabling spending controls.

In step 1910, the user elects to enable a particular gambling control tool. FIGS. 21B and 21C show an exemplary interface 2104 for enabling spending controls. The interface 2104 provides various options for setting a deposit limit including a daily deposit limit, a weekly deposit limit, or a monthly deposit limit. The interface 2104 allows the user to enter a maximum deposit amount (e.g., 50 GBP per day, or some other suitable value). The system may be configured such that any deposit limit set by the user remains active indefinitely. The system may be also configured such that if the user chooses to decrease the maximum deposit amount, the choice becomes effective immediately, but if the user chooses to increase the maximum deposit amount, the choice becomes effective after a cooling off period, such as 24 hours.

The exemplary interface 2104 shown in FIGS. 21B and 21C includes tabs 2106 that allow the user to set a maximum stake limit or a deposit curfew by entering a maximum stake amount or a curfew time, respectively, in a manner similar to that described above for setting deposit limits.

In a second scenario, a user is determined to be a medium risk user. In such a scenario, the system may implement triage to ensure that the user obtains personalized and tailored controls on the user's account. Such triage may be facilitated via a self-assessment questionnaire that is presented to the user, and is designed to gather information about the individual user's playing experience. The questionnaire may be presented on a website or in a mobile application associated with the system. Depending on the user's answers to the questionnaire, the user may, for example, be allowed to continue activity without further intervention, may be offered personalized recommendations regarding enabling gambling control tools, may have limits automatically imposed on the user's account, or may have the account suspended.

Figure 22:
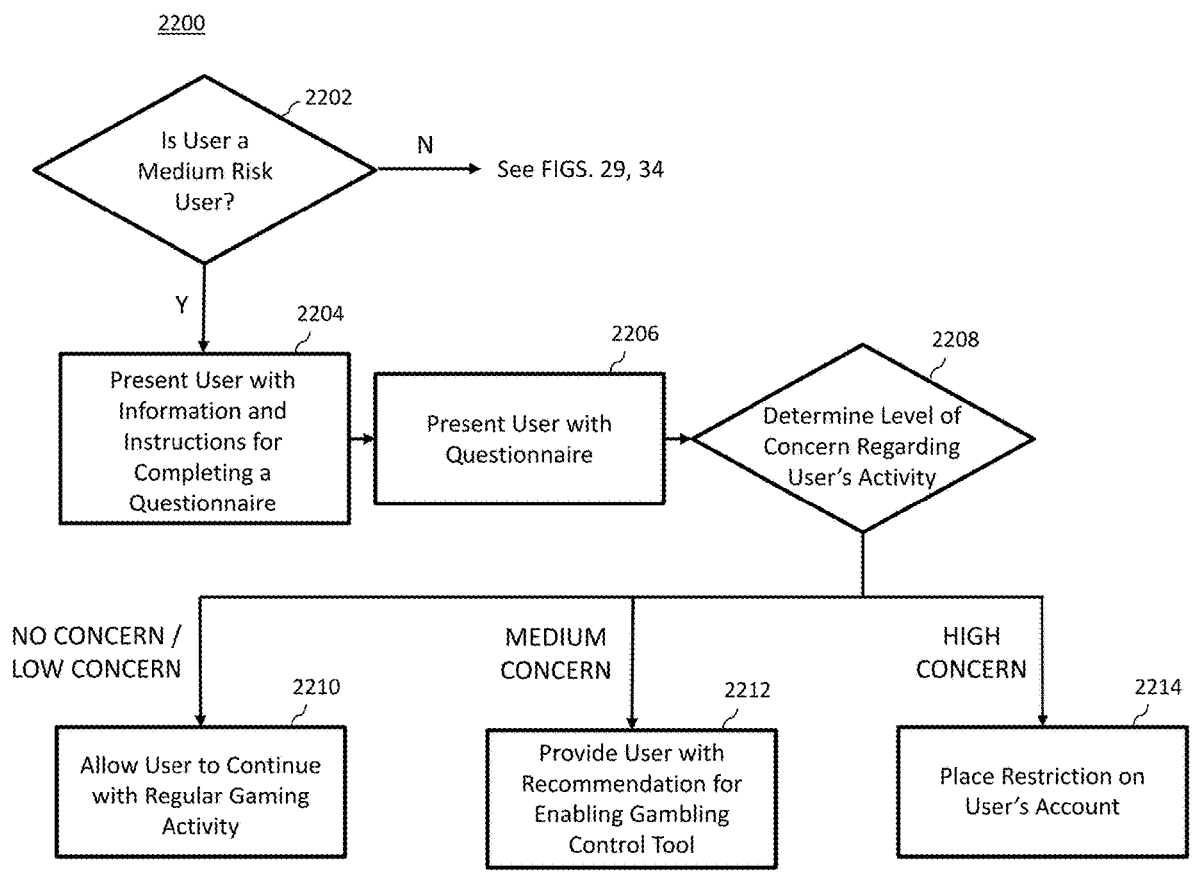
FIG. 22 shows a process for providing personalized and tailored controls on a user's account.

FIG. 22 shows an exemplary process 2200, in accordance with the second scenario, for providing personalized and tailored controls on a user's account. In step 2202 the OP 1802 determines that a user is a medium risk user. In step 2204 before the user is able to continue using the system for gaming activities, the user is presented with information and instructions for completing a questionnaire via the front end 1806. FIGS. 23A and 23B show exemplary interfaces 2302, 2304 including information and instructions for completing a questionnaire. The user may be instructed, for example, to be as honest as possible in answering the questions, as the user's answers may impact the user's overall experience with the system and may affect the accuracy of recommendations provided by the system.

In step 2206, the user is presented with a questionnaire including questions related to the user's gaming activity. The questions may seek yes/no answers, and may be directed to whether the user gambles to forget about personal problems, whether the user gets stressed, anxious or is unable to sleep because of gambling, whether gambling negatively affects the user's personal relationships, job, or studies, or whether the user becomes restless or irritable when unable to gamble. Other exemplary questions may be directed to whether the user bets more than he/she/they can afford to lose, whether the user has borrowed money or gone in debt to gamble, whether the user has gambled money that was supposed to be spent on bills, rent, or other commitments, whether the user has felt guilty about gambling, or whether the user has needed to gamble with larger amounts of money to get the same feeling of excitement.

Figure 24:
FIG. 24 shows a diagram of an exemplary interface including a questionnaire with radio buttons for a user to indicate an answer in response to each question.

FIG. 24 shows an exemplary interface 2402 including a questionnaire with radio buttons for the user to indicate an answer of yes or no in response to each question. The questions may be presented to the user one at a time, such that the user must answer the first question before seeing the second question, and so forth. The questionnaire may include any number of questions, however, in an exemplary embodiment, the number and content of the questions is selected such that the questionnaire is effective in obtaining meaningful information regarding the user's activity, while not being overly burdensome for the user to complete. For example, the questionnaire may include four or five questions, and may be designed for the user to complete in less than one minute. Actually completing the questionnaire may be optional, or may be mandatory depending on the user's risk level.

Figure 25:
FIG. 25 show a diagram of an exemplary interface indicating the result of the questionnaire and providing an opportunity for a user to explore and implement gambling control tools.
Figure 26A:
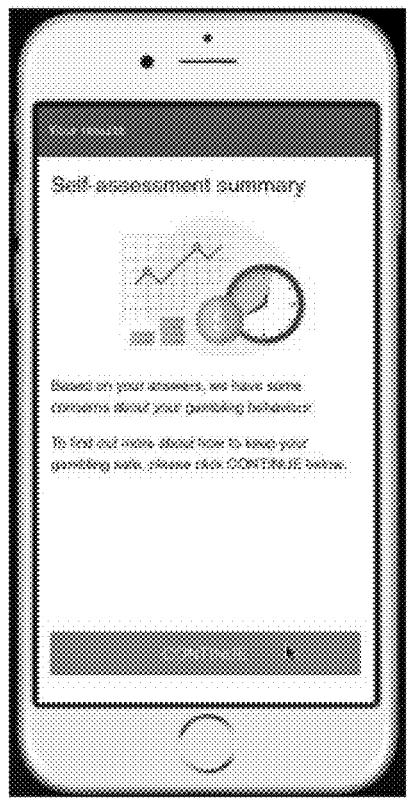
FIGS. 26A-D show diagrams of exemplary interfaces via which a user is informed that the user's questionnaire responses raise concerns and providing access to gambling control tools, such as by recommending or allowing a user to set a deposit limit.
Figure 26B:
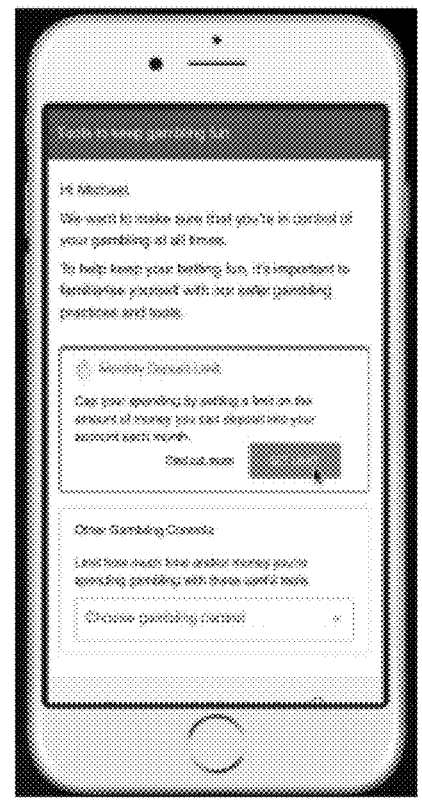
Figure 26C:
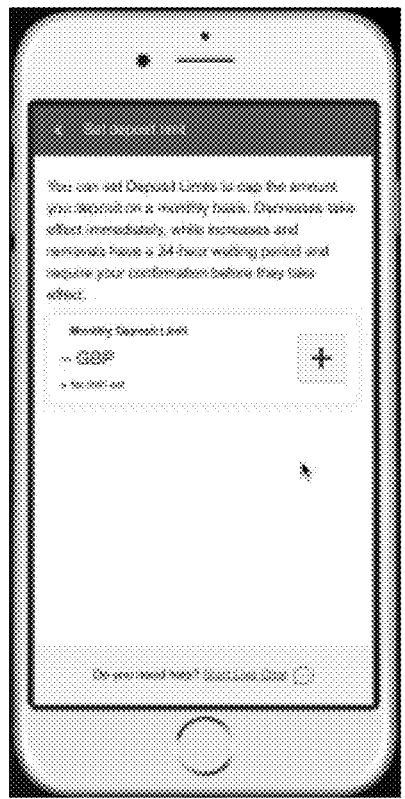
Figure 26D:
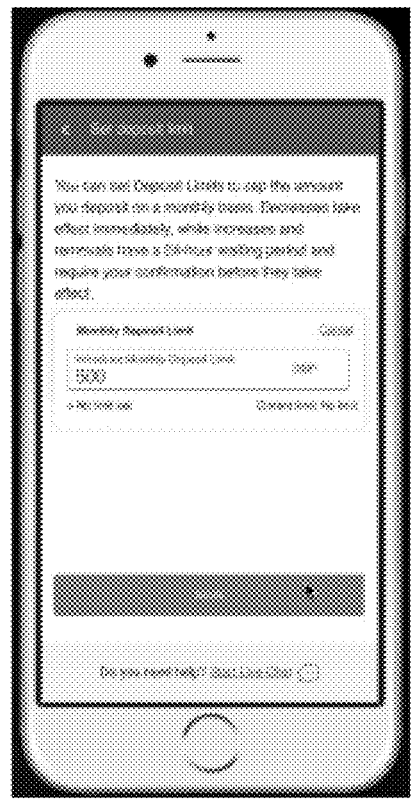

In step 2208, the level of concern regarding the user's activity is determined based on the user's answers to the questionnaire. If the user's answers indicate no concern or a low level of concern regarding the user's activity, for example, if the user answers NO to all of the questions, the user may be allowed to continue with regular gaming activity in step 2210. Before doing so, however, the user may be presented with a summary interface 2502, an example of which is shown in FIG. 25, indicating the result of the questionnaire and providing an opportunity for the user to explore and implement gambling control tools as described above with respect to the first scenario.

In step 2208, if the user's answers indicate a medium level of concern regarding the user's activity, for example, if the user answers YES to one or two of the questions, the user may be provided with a personal recommendation for enabling a gambling control tool in step 2212. Recommendations may be based on the user's answers to the questionnaire, the user's previous behavior, or a combination thereof. For example, if the user's previous behavior indicates that there has been a recent significant increase to the frequency and/or amount of deposits that the user has made, the system may recommend that the user sets a monthly deposit limit. FIGS. 26A-D show exemplary interfaces 2602, 2604, 2606, 2608 via which the user is informed that the user's questionnaire responses raise concerns, a monthly deposit limit is recommended for the user, and the user is allowed to set a monthly deposit limit, e.g., 500 GBP per month. Actually enabling a gambling control tool may be optional for the user or, alternatively, the user may be required to enable a recommended gambling control tool, or another gambling control tool, before the user is allowed to continue with gaming activity.

Figure 28:
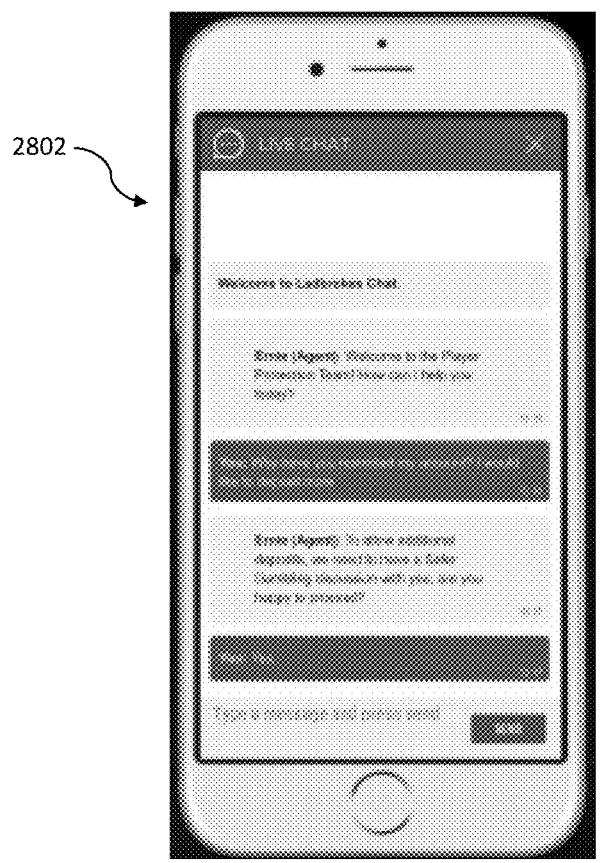
FIG. 28 shows a diagram of an exemplary interface in which the user may communicate with an agent via live chat in a mobile application associated with the system.

In step 2208, if the user's answers indicate a high level of concern regarding the user's activity, for example, if the user answers YES to two or more of the questions, a restriction may automatically be placed on the user's account in step 2214. For example, if the user's answers indicate a high level of concern regarding the user's activity, a temporary deposit limit may be placed on the user's account. In addition, a user for whom there is a high level of concern may be put into contact with an agent that specializes in safer betting and gaming, and who can assess the user's account and determine and recommend actions that can be taken to prevent the user from engaging in future detrimental activity. The user may be provided with options for communicating with an agent including via live chat or phone. The system may be configured such that any restrictions placed on the user's account in view of the user's high level of concern may remain in place until the system confirms that the user has communicated with an agent. The system may, for example, require that an agent, remote from the user, provide input indicating that a restriction should be removed in order for the restriction to be removed from the user's account. FIGS. 27A and 27B show exemplary interfaces 2702, 2704 via which the user is informed that the user's questionnaire responses raise concerns, a temporary deposit limit is automatically placed on the user's account, and the user is provided with options, including via live chat or phone, for communicating with an agent. FIG. 28 shows an exemplary interface 2802 in which the user may communicate with an agent via live chat in a mobile application associated with the system.

In a third scenario, a user is determined to be a high risk user. In such a scenario, the system may require the user to enable a gambling control tool before being allowed to engage with gambling features. For example, the system may prevent the high risk user from making a deposit or a bet until the user enables a gambling control tool.

Figure 29:
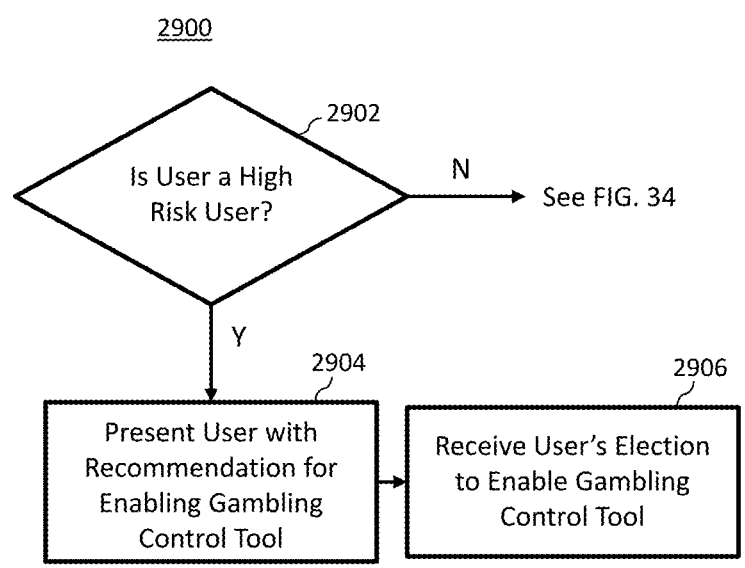
FIG. 29 shows a process for providing an automated intervention and placing mandatory safeguards on a user's account.

FIG. 29 shows an exemplary process 2900, in accordance with the third scenario, for providing an automated intervention, placing mandatory safeguards on a user's account. In step 2902, the CIP 1802 determines that a user is a high risk user. In step 2904, before the user is able to continue using the system for gaming activities, the user is presented with a recommendation for enabling a gambling control tool via the system front end 1806. The recommendation may be based on the user's previous activity and, thus, may be personalized to the needs of the specific user. In addition to being provided with a recommendation for a specific gambling control tool in step 2904, the user may be provided with information regarding other gambling control tools, and with options for enabling such other gambling control tools.

In step 2906, the user enables a gambling control tool, which may be a recommended gambling control tool or another gambling control tool selected by the user. For example, the user may choose to accept a recommended gambling control tool by setting a deposit limit.

Figure 30:
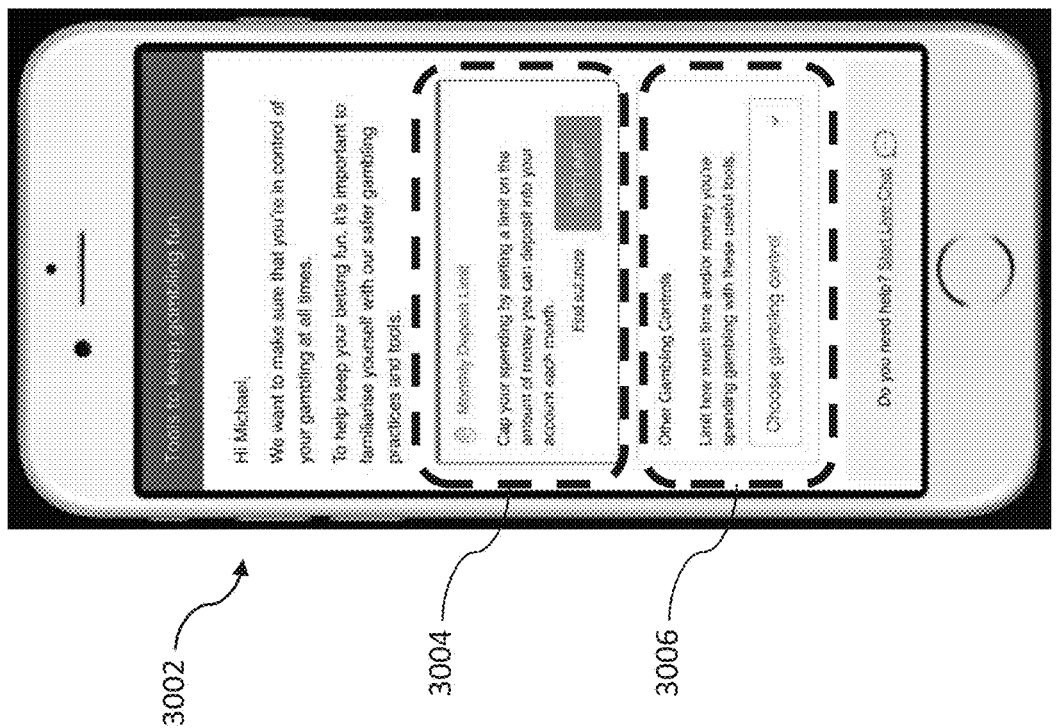
FIG. 30 shows a diagram of an exemplary interface that may be presented to a user upon a determination that the user is a high risk user.

FIG. 30 shows an exemplary interface 3002 that may be presented to a user upon a determination that the user is a high risk user. The interface 3002 includes a personalized recommendation 3004 for a gambling control tool, (e.g., monthly deposit limit) as well as information 3006 concerning other available gambling control tools.

Figure 31B:
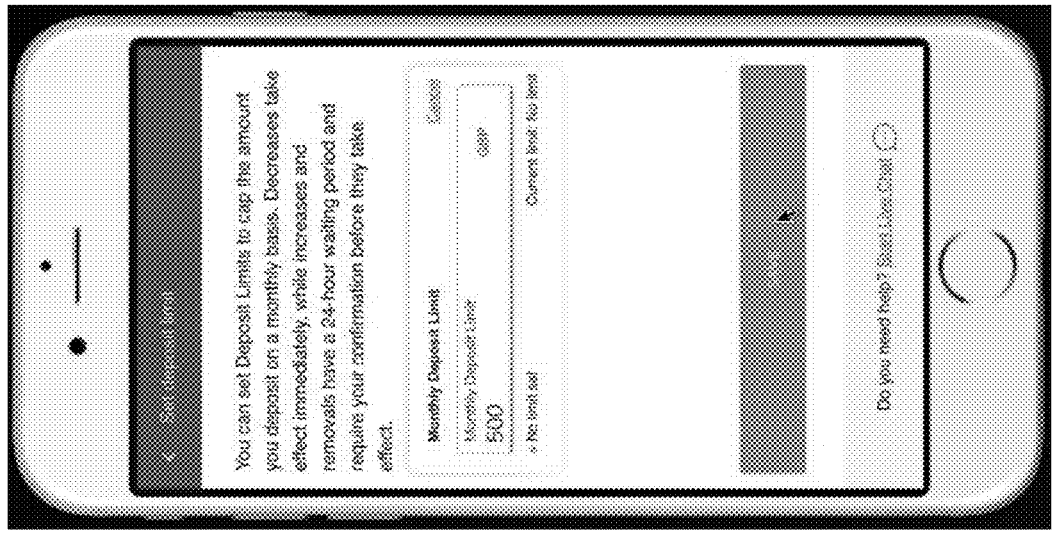
FIGS. 31A and 31B show diagrams of exemplary interfaces that allow a user to receive information and enable a gambling control tool, such as a monthly deposit limit, based on the user's acceptance of a recommended gambling control tool.
Figure 31A:
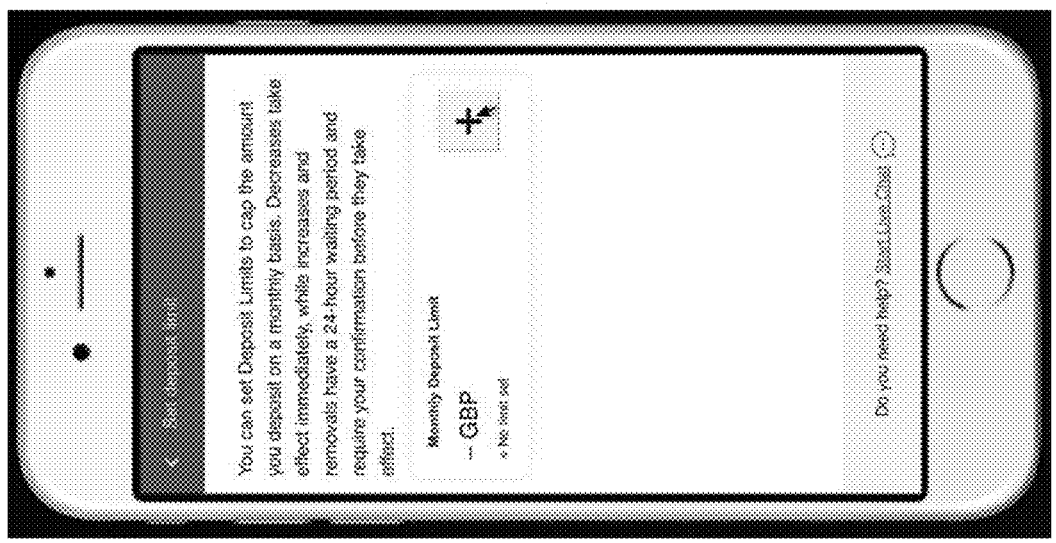

FIGS. 31A and 31B show exemplary interfaces 3102, 3104 that allow a user to receive information and enable a gambling control tool, such as a monthly deposit limit of 500 GBP, based on the user's acceptance of a recommended gambling control tool. A limit placed on the user's account may remain active indefinitely until the user decides to modify it.

In another example, a user may be identified as a high risk user based primarily on the user's prior history of chaotic play or chasing losses in slots. Accordingly, the system may present a personalized recommendation to the user that the user set a maximum stake limit on the user's account.

Figure 32:
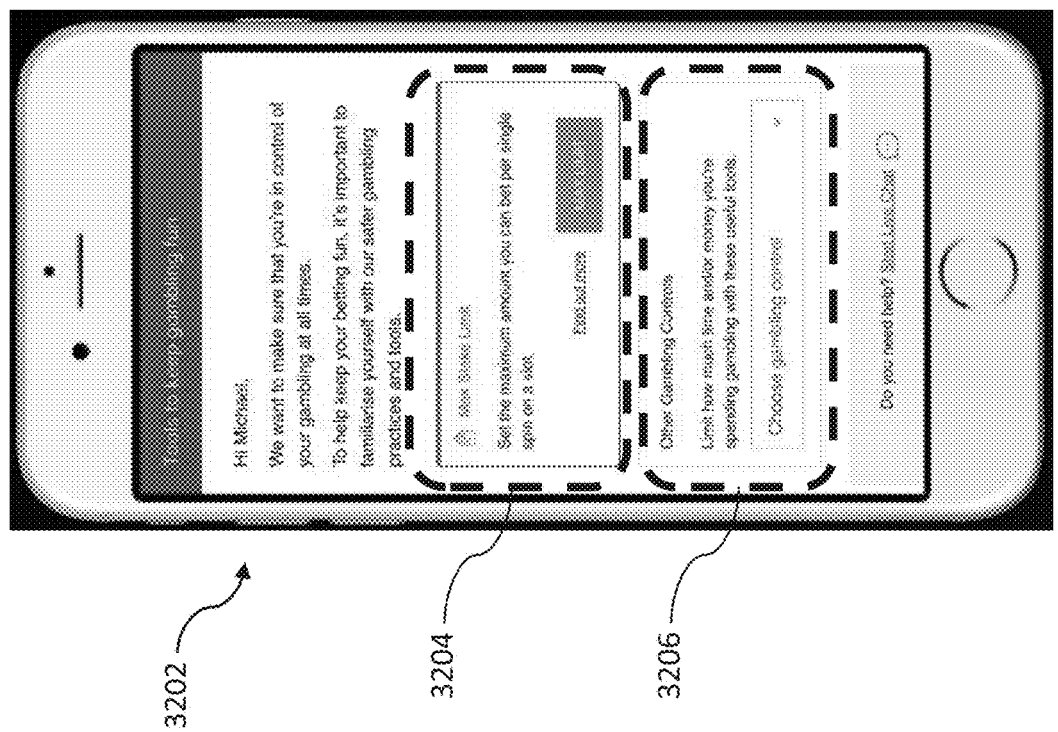
FIG. 32 shows a diagram of an exemplary interface that may be presented to a user upon a determination that the user is a high risk user.

FIG. 32 shows an exemplary interface 3202 that may be presented to a user upon a determination that the user is a high risk user. The interface 3202 includes a personalized recommendation 3204 for a gambling control tool (e.g., max stake limit), as well as information 3206 concerning other available gambling control tools.

Figure 33B:
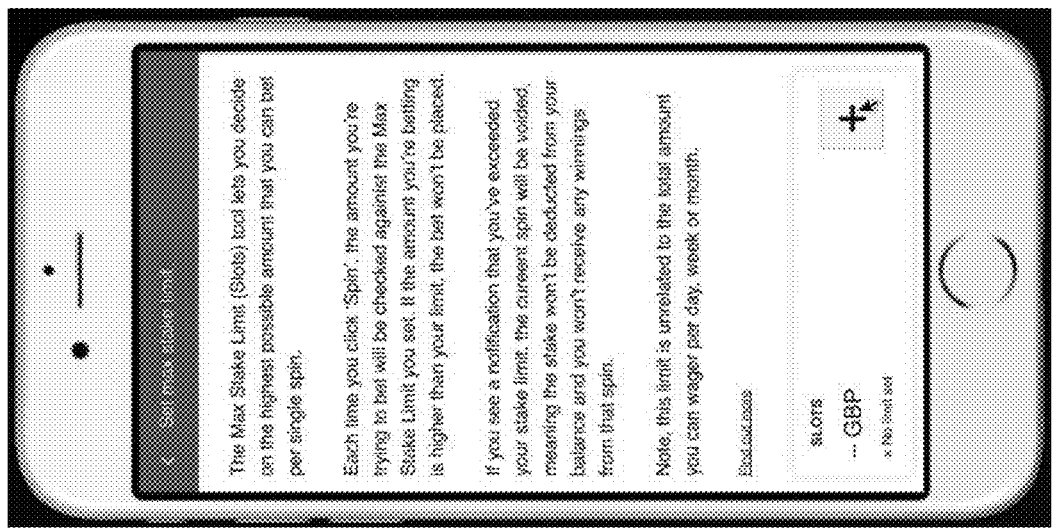
FIGS. 33A and 33B show diagrams of exemplary interfaces that allow a user to receive information and enable a gambling control tool, such as a maximum stake limit, based on the user's acceptance of a recommended gambling control tool.
Figure 33A:
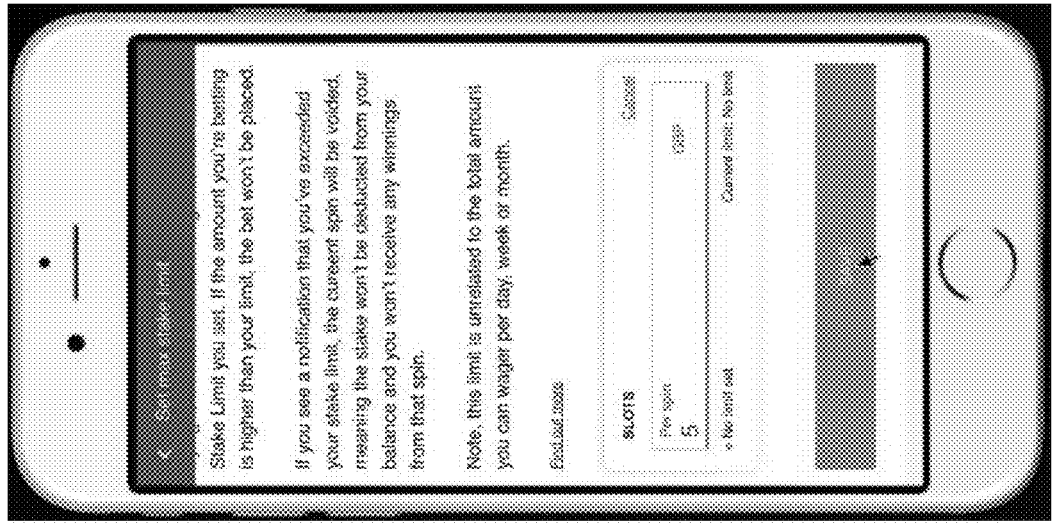

FIGS. 33A and 33B show exemplary interfaces 3302, 3304 that allow a user to receive information and enable a gambling control tool, such as a maximum stake limit of 5 GBP per spin, based on the user's acceptance of a recommended gambling control tool. A limit placed on the user's account may remain active indefinitely until the user decides to modify it.

In a fourth scenario, a user is determined to be a particularly high risk user, a level different from the high risk user of the third scenario. In the fourth scenario, a restriction may automatically be placed on the user's account. For example, a monthly deposit limit may be automatically placed on the user's account. In addition, the user may be put into contact with an agent that specializes in safer betting and gaming, and who can assess the user's account and determine and recommend actions that can be taken to prevent the user from engaging in future detrimental activity. The user may be provided with options for communicating with an agent including via live chat or phone. The system may be configured such that any restrictions placed on the user's account may remain in place until the system confirms that the user has communicated with an agent.

Figure 34:
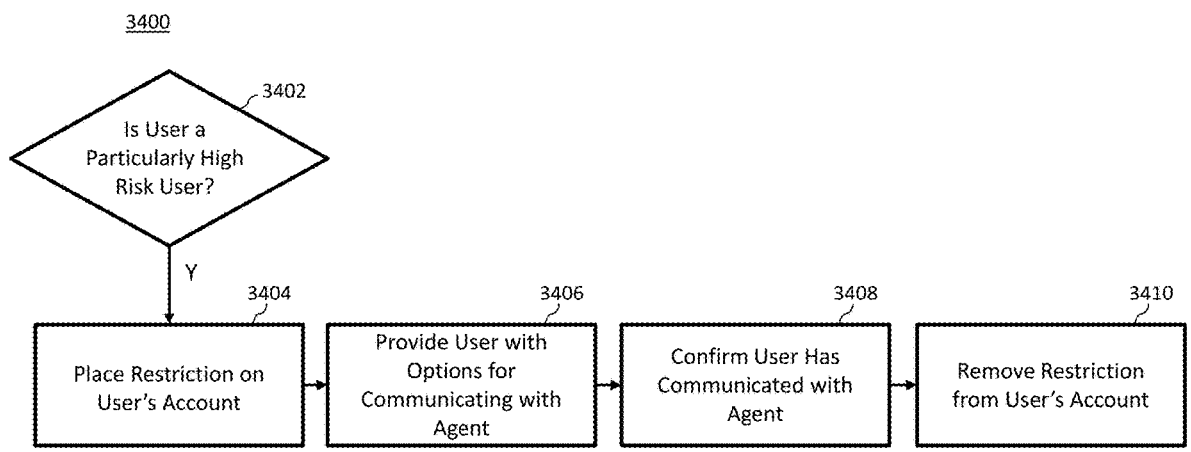
FIG. 34 shows a process for automatically triggering an account restriction and prompting communication with an agent specializing in safer gambling.

FIG. 34 shows an exemplary process, in accordance with the fourth scenario, for automatically triggering an account restriction and prompting communication with an agent specializing in safer gambling.

In step 3402, the OP 1802 determines that a user is a particularly high risk user. In step 3404, a restriction, such as a monthly deposit limit, is automatically placed on the user's account. In step 3406, the user is provided with options for communicating with an agent including via live chat or phone. In step 3408, the system confirms that the user has communicated with an agent and, in step 3410, the restriction is removed from the user's account.

Figure 35:
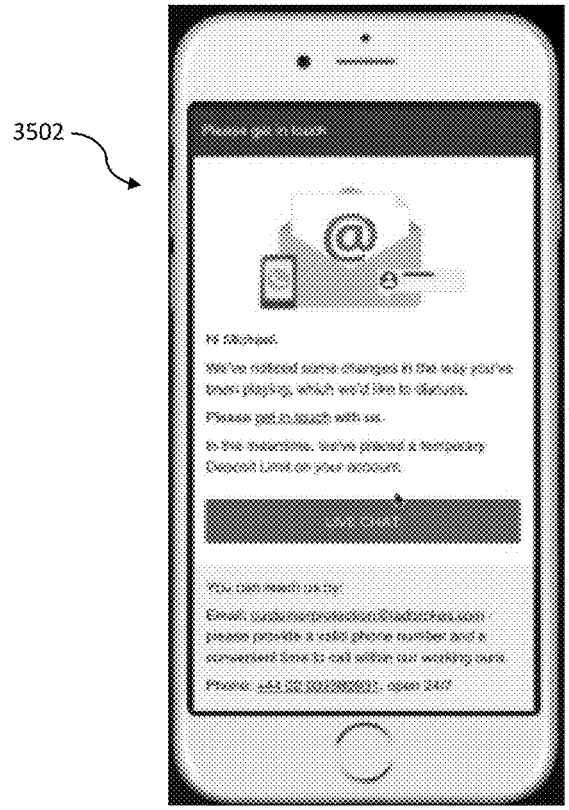
FIG. 35 shows a diagram of an exemplary interface in which the user is provided with options for communicating with an agent.
Figure 36:
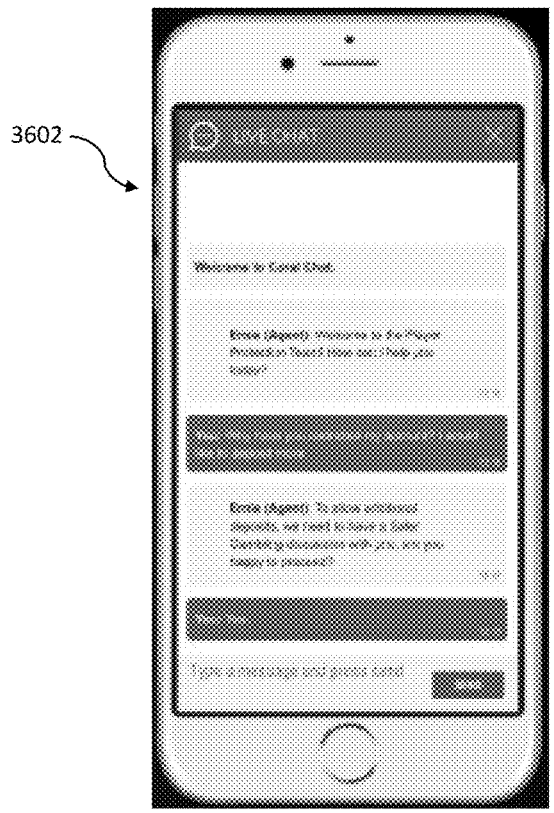
FIG. 36 shows a diagram of an exemplary interface in which the user may communicate with an agent via live chat in a mobile application.

FIG. 35 shows an exemplary interface 3502 in which the user is provided with options, including via live chat or phone, for communicating with an agent. FIG. 36 shows an exemplary interface 3602 in which the user may communicate with an agent via live chat in a mobile application associated with the system.

In a fifth scenario, a user is identified as one who is depositing an amount that is greater than usual in real-time. In such a scenario, the user may be informed of the unusual activity and, should the unusual activity continue, restrictions may be automatically imposed on the user's account for a predetermined time period.

Figure 37:
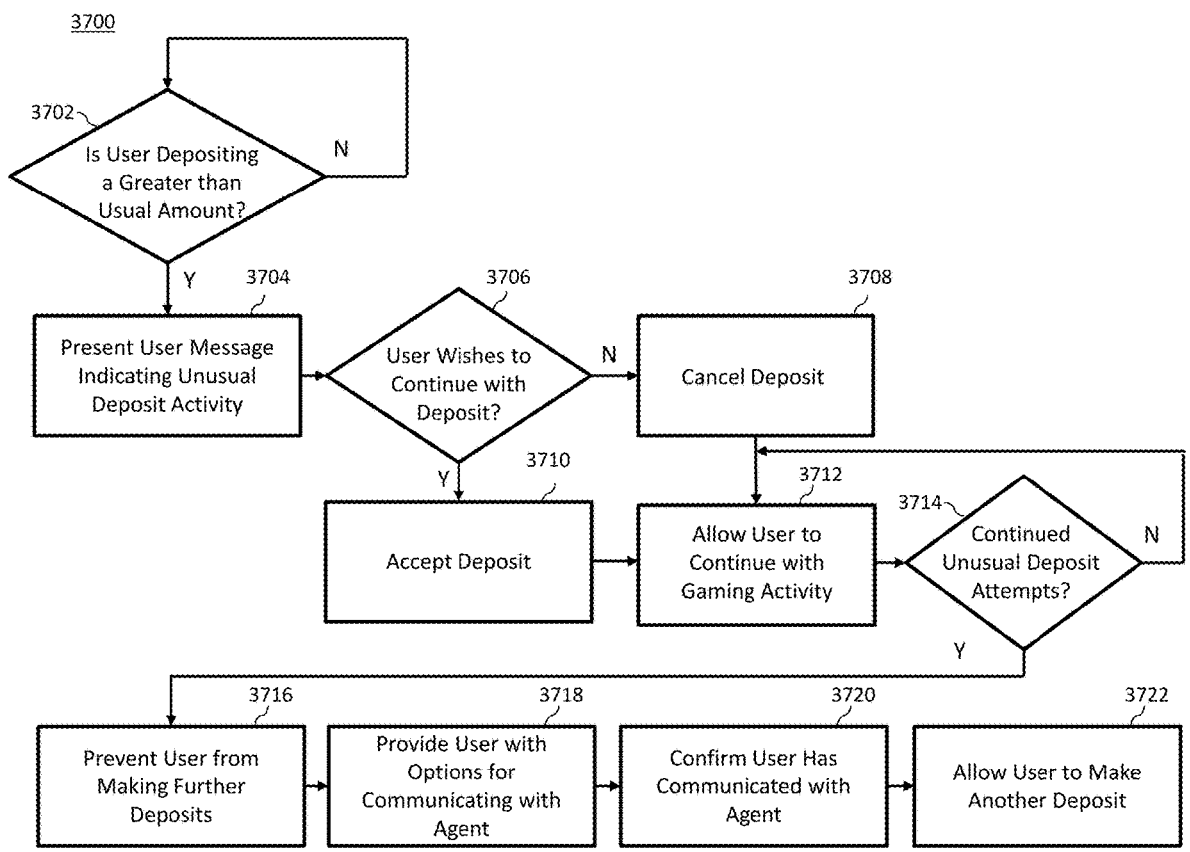
FIG. 37 shows a process for capping the size and frequency of deposits with enforceable cooling off periods.

FIG. 37 shows an exemplary process, in accordance with the fifth scenario, for capping the size and frequency of deposits with enforceable cooling off periods. In step 3702, the user is identified as one who is depositing an amount that is greater than usual in real-time. Such a determination may be made based on a real-time analysis of the user's current deposit amounts and frequency and the user's previous deposit amounts and frequency. For example, the system may determine that the user has deposited an unusually high amount in the last 24 hours. In step 3704, when the user attempts to make a deposit, the system presents the user with a message, indicating that the user's deposit activity is unusual and asking whether the user wishes to continue with the attempted deposit. In step 3606, based on user input, the system determines whether the user wishes to continue with the attempted deposit. If the user does not wish to continue with the attempted deposit, the attempted deposit is cancelled at step 3708, and the user may continue with gaming activity in step 3712. If the user does wish to continue with the attempted deposit, the deposit is accepted at step 3710, and the user may continue with gaming activity in step 3712. In step 3714, the system may determine whether the user has continued to make unusual deposit attempts. If so, in step 3716, the system may automatically prevent the user from making further deposits for a predetermined time period. In step 3718, the user is provided with options for communicating with an agent, including via live chat or phone, regarding safe gambling. If, in step 3720, the system detects that the user has communicated with an agent, the user may be allowed to make another deposit prior to the conclusion of the predetermined time period in step 3722.

FIG. 38 shows an exemplary interface 3802 in which the user is informed of unusual deposit activity and provided with the option to cancel or continue with a current attempted deposit. FIG. 39 shows an exemplary interface 3902 in which the user is informed that deposits will not be allowed for a predetermined time period (e.g., 24 hours) due to unusual deposit activity, and the user is provided with options, including via live chat or phone, for communicating with an agent.

In a sixth scenario, a user is identified as one who is spending an unusual amount of time engaged in gambling activity. In such a scenario, the user may be informed of the unusual activity and, should the unusual activity continue, restrictions may be automatically imposed on the user's account for a predetermined time period.

Figure 40:
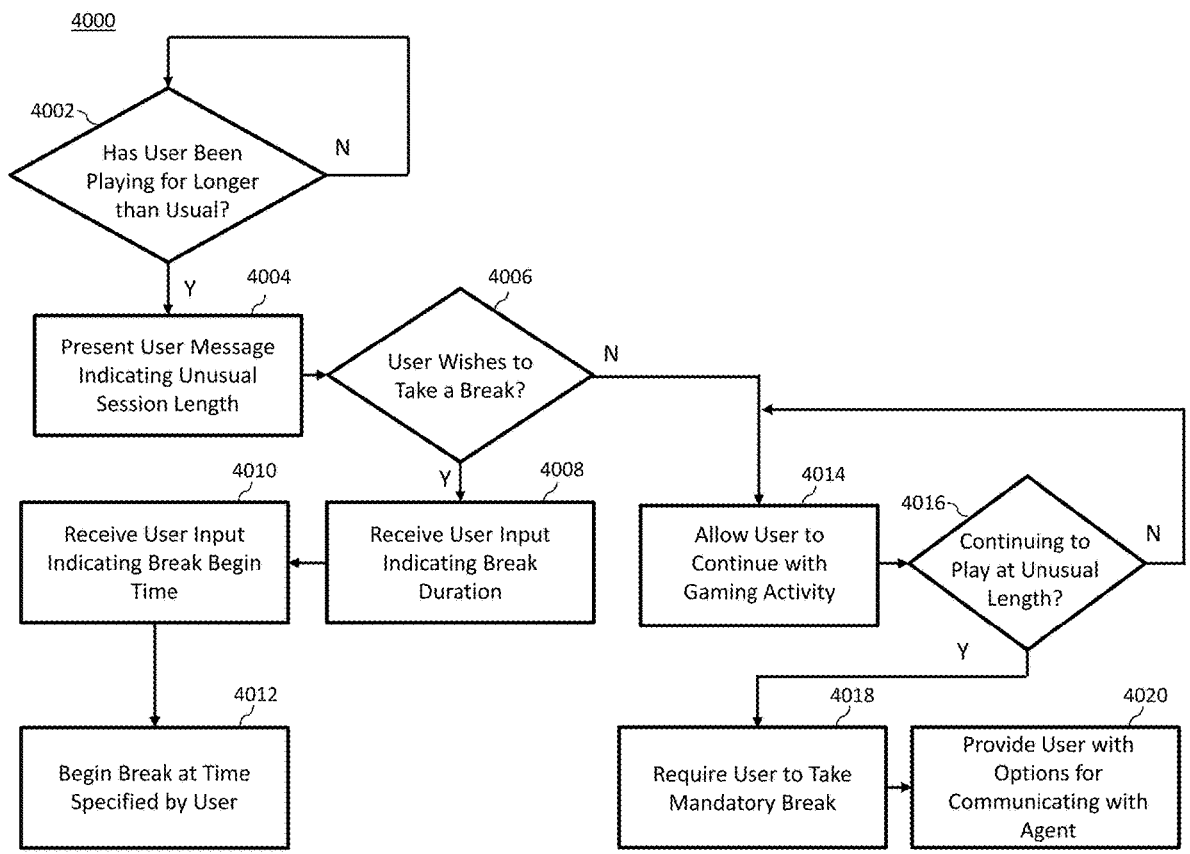
FIG. 40 shows a process for encouraging a user to take breaks and intervening to prevent excessively long sessions.

FIG. 40 shows an exemplary process 4000, in accordance with the sixth scenario, for encouraging a user to take breaks and intervening to prevent excessively long sessions. In step 4002, the user is identified as one who has been betting and playing for longer than usual within a given time period. Such a determination may be made based on a real-time analysis of the user's current session length and the user's previous session lengths. In step 4004, the system presents the user with a message, indicating that the user's session length is unusual and asking whether the user wishes to take a break. In step 4006, based on user input, the system determines whether the user wishes to take a break. If the user does wish to take a break, the user may be prompted in step 4008 to enter the desired duration of the break. In step 4010, the user may be prompted to indicate when the break should begin. The user may indicate that the break should begin immediately, or the user may specify an amount of time after which the break should begin. For example, the user may indicate a desire to take a 45 minute break that begins immediately. In step 4012, the break begins at the time specified by the user. During the break, the user may be prevented from making deposits or placing bets, however, the user may still be allowed to withdraw funds and view gaming and payment history. If the user does not wish to take a break, the user may continue with gaming activity in step 4014. However, if the system determines in step 4016 that the user is continuing to play at an unusual length, the system may require the user to take a mandatory break in step 4018 In step 4020, the user is provided with options for communicating with an agent, including via live chat or phone, regarding safe gambling.

Figure 41:
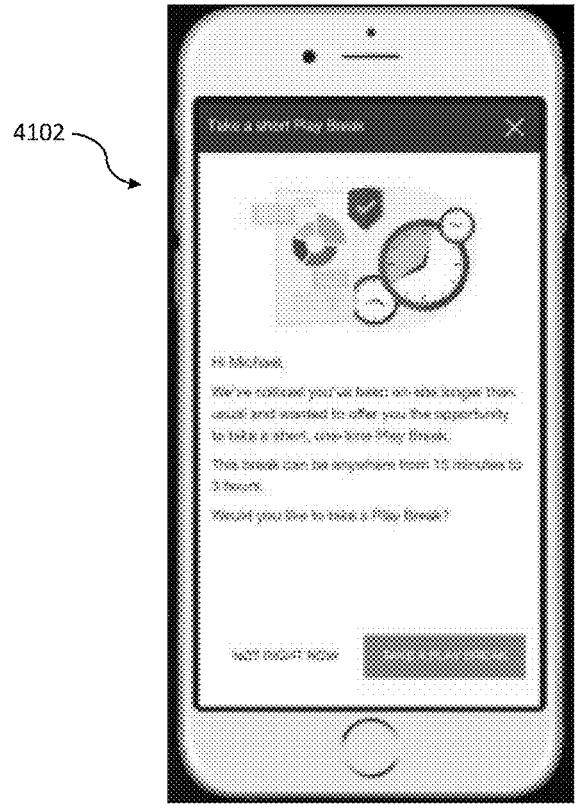
FIG. 41 shows a diagram of an exemplary interface in which the user is provided with a recommendation to take an optional break.
Figure 42:
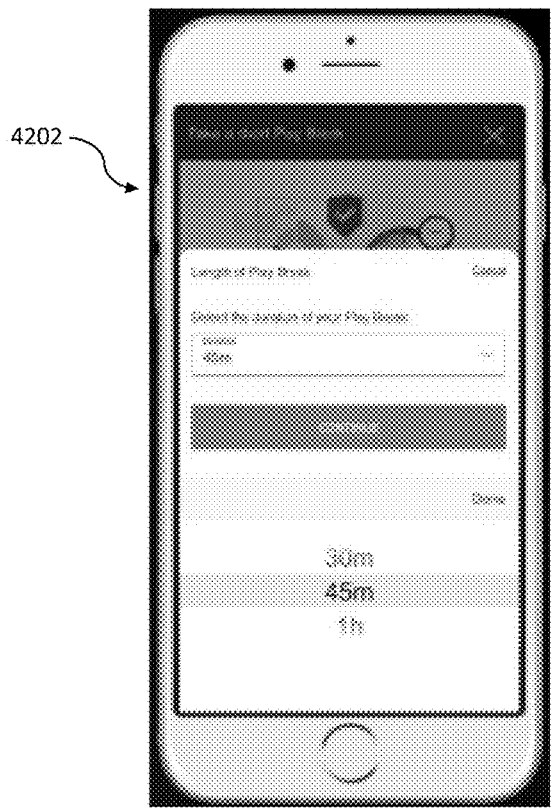
FIG. 42 shows a diagram of an exemplary interface in which a user may indicate a break duration.
Figure 43:
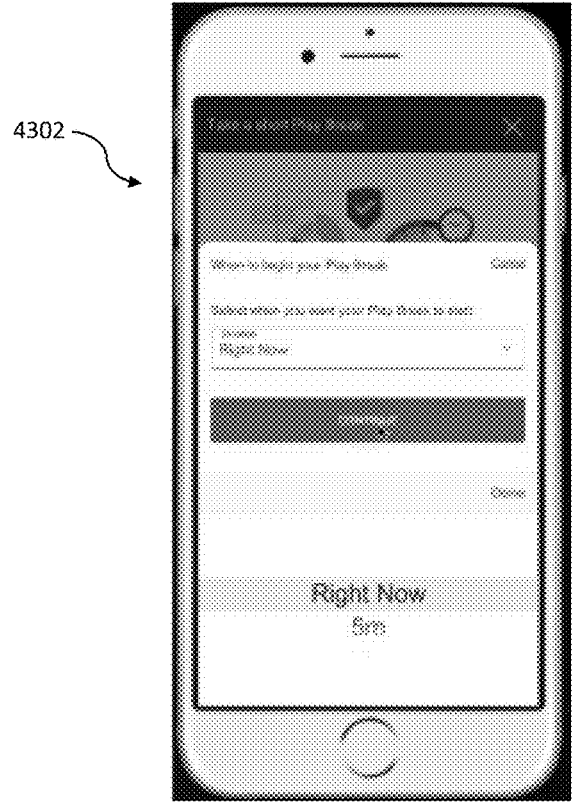
FIG. 43 shows a diagram of an exemplary interface in which a user may indicate a beginning time for a break.
Figure 44:
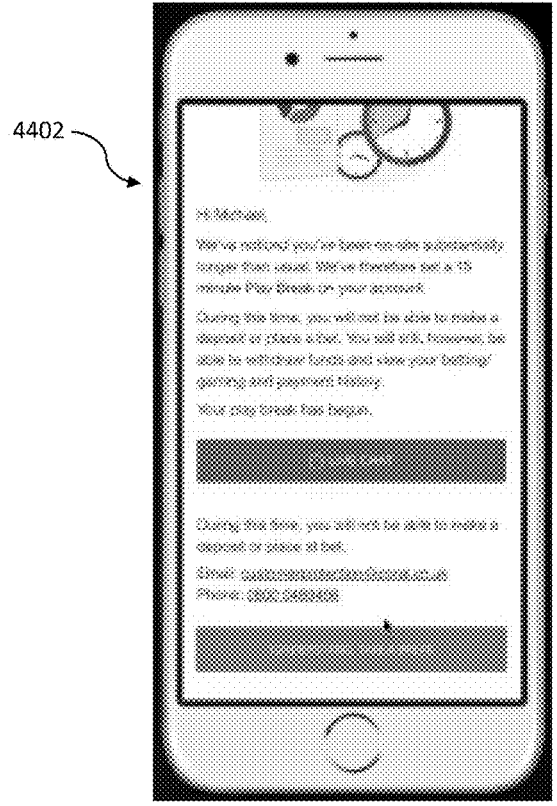
FIG. 44 shows a diagram of an exemplary interface in which a user is informed that a mandatory break has been imposed due to unusual session length and is provided with options for communicating with an agent.

FIG. 41 shows an exemplary interface 4102 in which the user is provided with a recommendation to take an optional break. FIG. 42 shows an exemplary interface 4202 in which a user may indicate a break duration (e.g., 45 minutes). FIG. 43 shows an exemplary interface 4302 in which a user may indicate a beginning time (e.g., right now) for a break. FIG. 44 shows an exemplary interface 4402 in which the user is informed that a mandatory break has been imposed due to unusual session length, and the user is provided with options, including via live chat or phone, for communicating with an agent.

In accordance with embodiments of the invention, gambling control tools and limits may be imposed at a system/account level or at a specific game/product level. The system may detect specific factors that contribute to a player's involvement in detrimental activity and take specific action to address those factors. For example, if the system detects that a user is likely to engage in detrimental activity in connection with casino-type games, but not sports betting activity, the system may recommend gambling control tools or impose limits only with respect to casino-type games, without applying such gambling control tools or limits to sports betting activity. Similarly, the system may cause certain potentially detrimental features to be disabled, such as "quick access" to casino-type games, "quick bet," or "quick deposit" features, thereby increasing the time and/or number of tasks a player must perform in order to engage in potentially detrimental activity. In another example, an "auto-spin" feature for a slot machine game may be disabled, requiring a player to spin manually, thereby deterring unconscientious gameplay.

In accordance with embodiments of the invention, the system may provide a user interface for a game in which promotional offers and/or links to other various games are displayed. However, the system may limit the presentation of such offers or links upon determining that they relate to features in connection with which a user is likely to engage in detrimental activity.

The gaming system 100 may also allow for additional features, according to embodiments. For example, the system may allow for the syncing of certain user preferences, settings, features, and the like, across multiple locations. A user may be subject to various responsible gaming limits which may be user-selected or may be otherwise imposed by the system. Such responsible gaming limits may include deposit limits, spending/loss limits, session time limits, wagering limits, and stake limits. The system may be configured such that when a limit is imposed on a user in one location, that limit may continue to be imposed on the user if the user attempts to use the system in a different location. For example, if a deposit limit is imposed upon a user in a first location, the system may be configured such that when a user's deposit activity has reached the deposit limit in the first location, the system may prevent the user from making further deposits if the user attempts to use the system in a different location. In other words, all deposits made by a user may count toward the user's deposit limit, regardless of the location in which a deposit is made. Similarly, spending/loss limits, session time limits, and wagering limits may be cumulative such that, when a user's spending activity has reached a spending limit in a first location, the system may prevent the user from spending additional funds if the user attempts to use the system in a different location. Alternatively, limits may be location-specific such that, for example, when a user's spending activity has reached a spending limit in a first location, the system may prevent the user from spending additional funds in the first location, but may allow the user to spend additional funds upon attempting to use the system in a different location.

The system may be configured to provide additional limits, such as service closures, in which a user may be temporarily or permanently prevented from accessing a particular type of service offered by the system. For example, a user may be prevented from accessing a poker service, but may maintain access to casino, sports, or bingo services. Service closures may be synced across multiple locations such that a user subject to a service closure in a first location may be prevented from accessing the service in a different location. Alternatively, service closures may be location-specific.

Additional preferences, settings, features, and the like that may be synced across locations include communication preferences by which a user may opt in to (or out of) receiving certain communications regarding, for example, promotions, special offers, or other marketing information. A user's preference to select a level of authentication, or to opt in to (or out of) using strong authentication within the system may also be synced across locations.

The system may be made available in a location in which certain users have been excluded or ejected from gaming activities. Such exclusion or ejection may be the result of a user being named on an exclusion list maintained by a local government or other authority, or may be a result of a user's self-exclusion, which may be voluntarily initiated within the system or by other means such as registration with a local government or other authority. The system may maintain a universal exclusion list that includes the names of users that have been excluded or ejected from gaming activities in a particular location. The system may be configured such that any user identified on the universal exclusion list is prohibited from engaging in gaming activities via the system in some or all locations. The system may be configured to provide a timeout or cool off period in which a user is temporarily prevented from accessing certain system features. Timeout or cool off periods may be self-imposed by a user or otherwise imposed by the system. The system may be configured such that a user subject to a timeout or cool off period in a first location may be automatically subject to a timeout or cool off period in some or all other locations.

In some instances, due to various reasons, a user may not be allowed to participate in gaming activities in a particular location in which the system is available. In such instances, if the user attempts to use the system while in the particular location, the system may cause the user's funds to be transferred to that location, and the user may, for example, withdraw or otherwise access those funds. However, the system may prevent the user from participating in gaming activities while in the particular location.

The system may be configured such that a user's payment instrument data is replicated across some or all locations in which the system is available. Accordingly, a user who has previously entered payment instrument data may not be required to reenter the payment instrument data when the user attempts to use the system in different locations. The system may be configured to prevent a user from using a certain payment instrument in a location in which that payment instrument is illegal or otherwise not acceptable, while still allowing the user to use that payment instrument in a location in which it is legal and acceptable. The system may be configured such that once a payment method is blocked in a first location, that payment method may be blocked in some or all of the other locations in which the system is available.

In some instances, a user may have an amount owed in a first location as a result of, for example, a chargeback or bet resettlement. In such instances, the system may be configured such that any amount owed is recovered from the user's available balance. Should the user's available balance be insufficient to cover the amount owed, the system may be configured such that if the user makes a deposit in a different location, the deposited amount is automatically transferred to the first location and applied toward the amount owed.

Each location in which the system is available may have location-specific requirements for reporting the gaming activities of each user within the location. The system may be configured to provide for the reporting of gaming activity within the location in which the activity occurred.

It should be recognized that certain components or elements of the embodiments described above, or in the claims that follow, are numbered to allow ease of reference to them or to help distinguish between them, but order should not be implied from such numbering, unless such order is expressly recited. It should also be understood that certain benefits will flow from the above-described systems and methods. For example, the distributed nature of the systems described above may contribute to a more robust or stable system that provides users across different jurisdictions similar experiences while taking into account the jurisdictional requirements where each user is located. Additionally, using principles described above, the various systems described above may be readily and easily expanded to include additional functionality, such as new games available to the user, as that functionality become available to the user (e.g., because new games are developed or because new gaming activity is permitted via regulatory changes). Using the distributed systems and the principles described above, the user is able to access his or her account and wallet funds and other items, regardless of the jurisdiction in which the user is located. Thus, while these items the user accesses may be duplicated across various datacenters, in the manner described above, the user's experience will be consistent with having a single wallet and a single account that appear to travel with the user. The above description and drawings are only to be considered illustrative of specific embodiments, which achieve the features and advantages described herein. Modifications and substitutions to specific process conditions can be made. Accordingly, the embodiments in this patent document are not considered as being limited by the foregoing description and drawings.

What is claimed is:

1. A distributed gaming system configured to encourage responsible gameplay, comprising:
   a database configured to store historical gaming data corresponding to one or more users, wherein the historical gaming data comprises data related to gameplay activity of a user in multiple geographic locations;
   a database configured to store information about responsible gaming risk and information about tools to reduce gaming risk;
   a machine learning component configured to:
      receive a real-time gaming action from a user device associated with the user via a gaming application of the gaming system in communication with the machine learning component;
      detect risks associated with the user based on the stored information about responsible gaming and a comparison of the historical gaming data corresponding to the user with the real-time gaming action of the user;
      generate a recommendation of one or more tools to reduce gaming risk based on the historical gaming data;
      and provide the user access to the one or more tools via the gaming application to reduce gaming risk; and
   a gaming application server for providing the user device access to the functionality of one or more tools to reduce gaming risk.

2. The distributed gaming system of claim 1, wherein the machine learning component is configured to determine a level of gaming risk associated with the user.

3. The distributed gaming system of claim 2, wherein the machine learning component classifies four categories of gaming risk comprising a low risk user category, medium risk user category, high risk user category, and a particularly high risk user category, and wherein the machine learning component is configured to determine a level of gaming risk associated with the user by determining that the user is one of: a low risk user, a medium risk user, a high risk user, and a particularly high risk user.

4. The distributed gaming system of claim 3, wherein the machine learning component determines that a user is a low risk user and the server is configured to notify the user of the availability of gambling control tools and to provide the user options for accessing and controlling those gambling tools.

5. The distributed gaming system of claim 3, wherein the machine learning component determines that a user is a medium risk user and the server is configured to present the user with a questionnaire in response to the medium risk determination and to determine a level of concern associated with the user's responses to the questionnaire, and the system takes appropriate action based on that determination.

6. The distributed gaming system of claim 5, wherein the machine learning component determines that the level of concern associated with the user's responses to the questionnaire is one of: no concern, low concern, medium concern, and high concern.

7. The distributed gaming system of claim 3, wherein the machine learning component determines that a user is a high risk user and the server is configured to present the user with a gambling control tool.

8. The distributed gaming system of claim 3, wherein the machine learning component determines that a user is a particularly high risk user and the server is configured to place a restriction on the user's account.

9. The distributed gaming system of claim 2, wherein the server is configured to provide the user with the ability to communicate with an agent via a communication channel.

10. The distributed gaming system of claim 2, wherein the machine learning component is configured to determine that a user is depositing amounts that are greater than usual for the user.

11. The distributed gaming system of claim 2, wherein the machine learning component is configured to determine that a user is playing for a longer time than usual by a predetermined amount.

12. The distributed gaming system of claim 6, wherein the machine learning component determines that the level of concern associated with the user's responses to the questionnaire is of medium concern, and wherein the machine learning component generates a recommendation for a gambling control tool.

13. The distributed gaming system of claim 6, wherein the machine learning component determines that the level of concern associated with the user's responses to the questionnaire is of high concern, and wherein the machine learning component generates a restriction on the user's account.

14. The distributed gaming system of claim 4, wherein the gambling control tools comprise a tool configured to control spending of the user, a tool configured for management of time available for the user to access the gaming application, and a tool configured to control closure of a gaming application account associated with the user.

15. The distributed gaming system of claim 1, wherein generating a recommendation of one or more tools to reduce gaming risk further comprises generating a recommendation based on a current location of the user.

16. The distributed gaming system of claim 8, wherein the restriction on the user's account comprises a requirement for the user to complete an activity before the user may perform an additional gaming action via the gaming application.

17. A distributed gaming system configured to encourage responsible gameplay, comprising:
   a user database configured to store a user gaming characteristic, the user gaming characteristic comprising historical gaming data and profile information of a user;

a risk database configured to store information about gaming risk; and a gaming application server in communication with the user database and risk database configured to:

provide a gaming application to a user device associated with the user;

receive a gaming action associated with the user from the user device via the gaming application;

evaluate, via a machine learning system, the gaming action associated with the user to determine that the user has exceeded a risk threshold based on the user gaming characteristic and the gaming risk information; and modifying the gaming application to provide a tool to the user device configured to mitigate gaming risk of the user.

18. A distributed gaming system configured to encourage responsible gameplay, comprising:

a database configured to store historical gaming data corresponding to one or more users, wherein the historical gaming data comprises data related to gameplay activity of a user in multiple geographic locations;

a database configured to store information about responsible gaming risk and information about tools to reduce gaming risk;

a processor configured to:

receive a real-time gaming action from a user device associated with the user via a gaming application of the gaming system in communication with the processor;

detect risks associated with the user based on the stored information about responsible gaming and a comparison of the historical gaming data corresponding to the user with the real-time gaming action of the user;

generate a recommendation of one or more tools to reduce gaming risk based on the historical gaming data;

and provide the user access to the one or more tools via the gaming application to reduce gaming risk; and a gaming application server for providing the user device access to the functionality of one or more tools to reduce gaming risk.

19. The distributed gaming system of claim 18, wherein detecting risks associated with the user comprises:

classifying four categories of gaming risk comprising a low risk user category, medium risk user category, high risk user category, and a particularly high risk user category; and determining a level of gaming risk associated with the user by determining that the user is one of: a low risk user, a medium risk user, a high risk user, and a particularly high risk user.

20. The distributed gaming system of claim 18, wherein the one or more tools comprise a tool configured to control spending of the user, a tool configured for management of time available for the user to access the gaming application, and a tool configured to control closure of a gaming application account associated with the user.

* * * * *